(12) United States Patent
Venkataraman et al.

(10) Patent No.: US 9,031,343 B2
(45) Date of Patent: *May 12, 2015

(54) SYSTEMS AND METHODS FOR ENCODING LIGHT FIELD IMAGE FILES HAVING A DEPTH MAP

(71) Applicant: Pelican Imaging Corporation, Santa Clara, CA (US)

(72) Inventors: Kartik Venkataraman, San Jose, CA (US); Semyon Nisenzon, Palo Alto, CA (US); Dan Lelescu, Morgan Hill, CA (US)

(73) Assignee: Pelican Imaging Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/504,684

(22) Filed: Oct. 2, 2014

(65) Prior Publication Data
US 2015/0055884 A1 Feb. 26, 2015

Related U.S. Application Data

(63) Continuation of application No. 14/477,396, filed on Sep. 4, 2014, which is a continuation of application No. 13/631,731, filed on Sep. 28, 2012.

(60) Provisional application No. 61/540,188, filed on Sep. 28, 2011.

(51) Int. Cl.
*G06K 9/36* (2006.01)
*H04N 19/136* (2014.01)
(Continued)

(52) U.S. Cl.
CPC ............ *H04N 19/136* (2014.11); *G06K 9/36* (2013.01); *G06T 9/00* (2013.01); *G06T 9/20* (2013.01);
(Continued)

(58) Field of Classification Search
USPC ................ 382/100, 103, 154, 232, 233, 312; 348/218.1, 355, 340
See application file for complete search history.

(56) References Cited

U.S. PATENT DOCUMENTS 4,124,798 A 11/1978 Thompson
4,198,646 A 4/1980 Alexander et al.
(Continued)

FOREIGN PATENT DOCUMENTS

EP 840502 A2 5/1998
EP 2336816 A2 6/2011
(Continued)

OTHER PUBLICATIONS

International Preliminary Report on Patentability for International Application PCT/US2013/024987, Mailed Aug. 21, 2014, 13 Pgs.
(Continued)

*Primary Examiner* — Duy M Dang
(74) *Attorney, Agent, or Firm* — KPPB LLP

(57) ABSTRACT

Systems and methods configured to store images synthesized from light field image data and metadata describing the images in electronic files and render images using the stored image and the metadata in accordance with embodiments of the invention are disclosed. One embodiment includes a processor and memory containing an encoding application and light field image data, where the light field image data comprises a plurality of low resolution images of a scene captured from different viewpoints. In addition, the encoding application configures the processor to: synthesize a higher resolution image of the scene from a reference viewpoint using the low resolution images, where synthesizing the higher resolution image involves creating a depth map that specifies depths from the reference viewpoint for pixels in the higher resolution image; encode the higher resolution image; and create a light field image file including the encoded image and metadata including the depth map.

23 Claims, 23 Drawing Sheets

(51) Int. Cl.

| | | |
|---|---|---|
| G06T 9/00 | (2006.01) | |
| G06T 9/20 | (2006.01) | |
| H04N 19/597 | (2014.01) | |
| H04N 13/00 | (2006.01) | |
| H04N 13/02 | (2006.01) | |
| H04N 19/625 | (2014.01) | |
| G06T 7/00 | (2006.01) | |

(52) U.S. Cl.
CPC ......... *H04N 19/597* (2014.11); *H04N 13/0022* (2013.01); *H04N 2013/0081* (2013.01); *H04N 13/0048* (2013.01); *H04N 13/0242* (2013.01); *H04N 13/0271* (2013.01); *H04N 19/625* (2014.11); *G06T 7/0051* (2013.01)

(56) References Cited

U.S. PATENT DOCUMENTS

| | | | |
|---|---|---|---|
| 4,323,925 | A | 4/1982 | Abell et al. |
| 4,460,449 | A | 7/1984 | Montalbano |
| 4,467,365 | A | 8/1984 | Murayama et al. |
| 5,005,083 | A | 4/1991 | Grage |
| 5,070,414 | A | 12/1991 | Tsutsumi |
| 5,144,448 | A | 9/1992 | Hornbaker |
| 5,327,125 | A | 7/1994 | Iwase et al. |
| 5,629,524 | A | 5/1997 | Stettner et al. |
| 5,808,350 | A | 9/1998 | Jack et al. |
| 5,832,312 | A | 11/1998 | Rieger et al. |
| 5,880,691 | A | 3/1999 | Fossum et al. |
| 5,933,190 | A | 8/1999 | Dierickx et al. |
| 5,973,844 | A | 10/1999 | Burger |
| 6,002,743 | A | 12/1999 | Telymonde |
| 6,005,607 | A | 12/1999 | Uomori et al. |
| 6,034,690 | A | 3/2000 | Gallery et al. |
| 6,069,351 | A | 5/2000 | Mack |
| 6,069,365 | A | 5/2000 | Chow et al. |
| 6,097,394 | A | 8/2000 | Levoy et al. |
| 6,124,974 | A | 9/2000 | Burger |
| 6,137,535 | A | 10/2000 | Meyers |
| 6,141,048 | A | 10/2000 | Meyers |
| 6,160,909 | A | 12/2000 | Melen |
| 6,163,414 | A | 12/2000 | Kikuchi et al. |
| 6,175,379 | B1 | 1/2001 | Uomori et al. |
| 6,205,241 | B1 | 3/2001 | Melen |
| 6,239,909 | B1 | 5/2001 | Hayashi et al. |
| 6,358,862 | B1 | 3/2002 | Ireland et al. |
| 6,477,260 | B1 | 11/2002 | Shimomura |
| 6,525,302 | B2 | 2/2003 | Dowski, Jr. et al. |
| 6,563,537 | B1 | 5/2003 | Kawamura et al. |
| 6,603,513 | B1 | 8/2003 | Berezin |
| 6,611,289 | B1 | 8/2003 | Yu |
| 6,627,896 | B1 | 9/2003 | Hashimoto et al. |
| 6,628,330 | B1 | 9/2003 | Lin |
| 6,635,941 | B2 | 10/2003 | Suda |
| 6,657,218 | B2 | 12/2003 | Noda |
| 6,671,399 | B1 | 12/2003 | Berestov |
| 6,750,904 | B1 | 6/2004 | Lambert |
| 6,765,617 | B1 | 7/2004 | Tangen et al. |
| 6,771,833 | B1 | 8/2004 | Edgar |
| 6,774,941 | B1 | 8/2004 | Boisvert et al. |
| 6,795,253 | B2 | 9/2004 | Shinohara |
| 6,819,358 | B1 | 11/2004 | Kagle et al. |
| 6,879,735 | B1 | 4/2005 | Portniaguine et al. |
| 6,903,770 | B1 | 6/2005 | Kobayashi et al. |
| 6,909,121 | B2 | 6/2005 | Nishikawa |
| 6,958,862 | B1 | 10/2005 | Joseph |
| 7,085,409 | B2 | 8/2006 | Sawhney et al. |
| 7,161,614 | B1 | 1/2007 | Yamashita et al. |
| 7,199,348 | B2 | 4/2007 | Olsen et al. |
| 7,262,799 | B2 | 8/2007 | Suda |
| 7,292,735 | B2 | 11/2007 | Blake et al. |
| 7,295,697 | B1 | 11/2007 | Satoh |
| 7,369,165 | B2 | 5/2008 | Bosco et al. |
| 7,391,572 | B2 | 6/2008 | Jacobowitz et al. |
| 7,408,725 | B2 | 8/2008 | Sato |
| 7,606,484 | B1 | 10/2009 | Richards et al. |
| 7,633,511 | B2 | 12/2009 | Shum et al. |
| 7,646,549 | B2 | 1/2010 | Zalevsky et al. |
| 7,657,090 | B2 | 2/2010 | Omatsu et al. |
| 7,675,080 | B2 | 3/2010 | Boettiger |
| 7,675,681 | B2 | 3/2010 | Tomikawa et al. |
| 7,706,634 | B2 | 4/2010 | Schmitt et al. |
| 7,723,662 | B2 | 5/2010 | Levoy et al. |
| 7,782,364 | B2 | 8/2010 | Smith |
| 7,840,067 | B2 | 11/2010 | Shen et al. |
| 7,912,673 | B2 | 3/2011 | Hébert et al. |
| 7,986,018 | B2 | 7/2011 | Rennie |
| 7,990,447 | B2 | 8/2011 | Honda et al. |
| 8,000,498 | B2 | 8/2011 | Shih et al. |
| 8,013,904 | B2 | 9/2011 | Tan et al. |
| 8,027,531 | B2 | 9/2011 | Wilburn et al. |
| 8,044,994 | B2 | 10/2011 | Vetro et al. |
| 8,077,245 | B2 | 12/2011 | Adamo et al. |
| 8,098,304 | B2 | 1/2012 | Pinto et al. |
| 8,106,949 | B2 | 1/2012 | Tan et al. |
| 8,126,279 | B2 | 2/2012 | Marcellin et al. |
| 8,130,120 | B2 | 3/2012 | Kawabata et al. |
| 8,131,097 | B2 | 3/2012 | Lelescu et al. |
| 8,164,629 | B1 | 4/2012 | Zhang |
| 8,180,145 | B2 | 5/2012 | Wu et al. |
| 8,189,089 | B1 | 5/2012 | Georgiev |
| 8,212,914 | B2 | 7/2012 | Chiu |
| 8,213,711 | B2 | 7/2012 | Tam |
| 8,231,814 | B2 | 7/2012 | Duparre |
| 8,242,426 | B2 | 8/2012 | Ward et al. |
| 8,244,027 | B2 | 8/2012 | Takahashi |
| 8,254,668 | B2 | 8/2012 | Mashitani et al. |
| 8,279,325 | B2 | 10/2012 | Pitts et al. |
| 8,280,194 | B2 | 10/2012 | Wong et al. |
| 8,289,409 | B2 | 10/2012 | Chang |
| 8,294,099 | B2 | 10/2012 | Blackwell, Jr. |
| 8,305,456 | B1 | 11/2012 | McMahon |
| 8,315,476 | B1 | 11/2012 | Georgiev et al. |
| 8,345,144 | B1 | 1/2013 | Georgiev et al. |
| 8,360,574 | B2 | 1/2013 | Ishak et al. |
| 8,406,562 | B2 | 3/2013 | Bassi et al. |
| 8,446,492 | B2 | 5/2013 | Nakano et al. |
| 8,514,491 | B2 | 8/2013 | Duparre |
| 8,541,730 | B2 | 9/2013 | Inuiya |
| 8,542,933 | B2 | 9/2013 | Venkataraman et al. |
| 8,553,093 | B2 | 10/2013 | Wong et al. |
| 8,559,756 | B2 | 10/2013 | Georgiev et al. |
| 8,619,082 | B1 | 12/2013 | Ciurea et al. |
| 8,655,052 | B2 | 2/2014 | Spooner et al. |
| 8,682,107 | B2 | 3/2014 | Yoon et al. |
| 8,692,893 | B2 | 4/2014 | McMahon |
| 8,773,536 | B1 | 7/2014 | Zhang |
| 8,780,113 | B1 | 7/2014 | Ciurea et al. |
| 8,804,255 | B2 | 8/2014 | Duparre |
| 8,830,375 | B2 | 9/2014 | Ludwig |
| 8,831,367 | B2 | 9/2014 | Venkataraman et al. |
| 8,854,462 | B2 | 10/2014 | Herbin et al. |
| 8,861,089 | B2 | 10/2014 | Duparre |
| 8,866,920 | B2 | 10/2014 | Venkataraman et al. |
| 8,878,950 | B2 | 11/2014 | Lelescu et al. |
| 8,885,059 | B1 | 11/2014 | Venkataraman et al. |
| 8,896,594 | B2 | 11/2014 | Xiong et al. |
| 8,896,719 | B1 | 11/2014 | Venkataraman et al. |
| 8,902,321 | B2 | 12/2014 | Venkataraman et al. |
| 2001/0005225 | A1 | 6/2001 | Clark et al. |
| 2001/0019621 | A1 | 9/2001 | Hanna et al. |
| 2001/0038387 | A1 | 11/2001 | Tomooka et al. |
| 2002/0012056 | A1 | 1/2002 | Trevino |
| 2002/0027608 | A1 | 3/2002 | Johnson |
| 2002/0039438 | A1 | 4/2002 | Mori et al. |
| 2002/0063807 | A1 | 5/2002 | Margulis |
| 2002/0087403 | A1 | 7/2002 | Meyers et al. |
| 2002/0089596 | A1 | 7/2002 | Suda |
| 2002/0094027 | A1 | 7/2002 | Sato et al. |
| 2002/0101528 | A1 | 8/2002 | Lee |
| 2002/0113867 | A1 | 8/2002 | Takigawa et al. |
| 2002/0113888 | A1 | 8/2002 | Sonoda et al. |
| 2002/0163054 | A1 | 11/2002 | Suda et al. |
| 2002/0167537 | A1 | 11/2002 | Trajkovic |

(56) References Cited

U.S. PATENT DOCUMENTS

| | | |
|---|---|---|
| 2002/0177054 A1 | 11/2002 | Saitoh et al. |
| 2003/0086079 A1 | 5/2003 | Barth et al. |
| 2003/0124763 A1 | 7/2003 | Fan et al. |
| 2003/0140347 A1 | 7/2003 | Varsa |
| 2003/0179418 A1 | 9/2003 | Wengender et al. |
| 2003/0190072 A1 | 10/2003 | Adkins et al. |
| 2003/0211405 A1 | 11/2003 | Venkataraman |
| 2004/0008271 A1 | 1/2004 | Hagimori et al. |
| 2004/0012689 A1 | 1/2004 | Tinnerino |
| 2004/0027358 A1 | 2/2004 | Nakao |
| 2004/0047274 A1 | 3/2004 | Amanai |
| 2004/0050104 A1 | 3/2004 | Ghosh et al. |
| 2004/0056966 A1 | 3/2004 | Schechner et al. |
| 2004/0066454 A1 | 4/2004 | Otani et al. |
| 2004/0100570 A1 | 5/2004 | Shizukuishi |
| 2004/0114807 A1 | 6/2004 | Lelescu et al. |
| 2004/0151401 A1 | 8/2004 | Sawhney et al. |
| 2004/0165090 A1 | 8/2004 | Ning |
| 2004/0169617 A1 | 9/2004 | Yelton et al. |
| 2004/0170340 A1 | 9/2004 | Tipping et al. |
| 2004/0174439 A1 | 9/2004 | Upton |
| 2004/0207836 A1 | 10/2004 | Chhibber et al. |
| 2004/0213449 A1 | 10/2004 | Safaee-Rad et al. |
| 2004/0218809 A1 | 11/2004 | Blake et al. |
| 2004/0234873 A1 | 11/2004 | Venkataraman |
| 2004/0240052 A1 | 12/2004 | Minefuji et al. |
| 2004/0251509 A1 | 12/2004 | Choi |
| 2004/0264806 A1 | 12/2004 | Herley |
| 2005/0006477 A1 | 1/2005 | Patel |
| 2005/0012035 A1 | 1/2005 | Miller |
| 2005/0036778 A1 | 2/2005 | DeMonte |
| 2005/0047678 A1 | 3/2005 | Jones et al. |
| 2005/0048690 A1 | 3/2005 | Yamamoto |
| 2005/0068436 A1 | 3/2005 | Fraenkel et al. |
| 2005/0132098 A1 | 6/2005 | Sonoda et al. |
| 2005/0134712 A1 | 6/2005 | Gruhlke et al. |
| 2005/0147277 A1 | 7/2005 | Higaki et al. |
| 2005/0151759 A1 | 7/2005 | Gonzalez-Banos et al. |
| 2005/0175257 A1 | 8/2005 | Kuroki |
| 2005/0185711 A1 | 8/2005 | Pfister et al. |
| 2005/0205785 A1 | 9/2005 | Hornback et al. |
| 2005/0219363 A1 | 10/2005 | Kohler |
| 2005/0225654 A1 | 10/2005 | Feldman et al. |
| 2005/0275946 A1 | 12/2005 | Choo et al. |
| 2005/0286612 A1 | 12/2005 | Takanashi |
| 2006/0002635 A1 | 1/2006 | Nestares et al. |
| 2006/0023197 A1 | 2/2006 | Joel |
| 2006/0023314 A1 | 2/2006 | Boettiger et al. |
| 2006/0033005 A1 | 2/2006 | Jerdev et al. |
| 2006/0034003 A1 | 2/2006 | Zalevsky |
| 2006/0038891 A1 | 2/2006 | Okutomi et al. |
| 2006/0049930 A1 | 3/2006 | Zruya et al. |
| 2006/0054780 A1 | 3/2006 | Garrood et al. |
| 2006/0054782 A1 | 3/2006 | Olsen et al. |
| 2006/0055811 A1 | 3/2006 | Frtiz et al. |
| 2006/0069478 A1 | 3/2006 | Iwama |
| 2006/0072029 A1 | 4/2006 | Miyatake et al. |
| 2006/0087747 A1 | 4/2006 | Ohzawa et al. |
| 2006/0098888 A1 | 5/2006 | Morishita |
| 2006/0125936 A1 | 6/2006 | Gruhike et al. |
| 2006/0138322 A1 | 6/2006 | Costello et al. |
| 2006/0152803 A1 | 7/2006 | Provitola |
| 2006/0157640 A1 | 7/2006 | Perlman et al. |
| 2006/0159369 A1 | 7/2006 | Young |
| 2006/0176566 A1 | 8/2006 | Boettiger et al. |
| 2006/0187338 A1 | 8/2006 | May et al. |
| 2006/0197937 A1 | 9/2006 | Bamji et al. |
| 2006/0203113 A1 | 9/2006 | Wada et al. |
| 2006/0210186 A1 | 9/2006 | Berkner |
| 2006/0239549 A1 | 10/2006 | Kelly et al. |
| 2006/0243889 A1 | 11/2006 | Farnworth et al. |
| 2006/0251410 A1 | 11/2006 | Trutna |
| 2006/0274174 A1 | 12/2006 | Tewinkle |
| 2006/0278948 A1 | 12/2006 | Yamaguchi et al. |
| 2006/0279648 A1 | 12/2006 | Senba et al. |
| 2007/0002159 A1 | 1/2007 | Olsen et al. |
| 2007/0024614 A1 | 2/2007 | Tam |
| 2007/0036427 A1 | 2/2007 | Nakamura et al. |
| 2007/0040828 A1 | 2/2007 | Zalevsky et al. |
| 2007/0040922 A1 | 2/2007 | McKee et al. |
| 2007/0041391 A1 | 2/2007 | Lin et al. |
| 2007/0052825 A1 | 3/2007 | Cho |
| 2007/0083114 A1 | 4/2007 | Yang et al. |
| 2007/0085917 A1 | 4/2007 | Kobayashi |
| 2007/0102622 A1 | 5/2007 | Olsen et al. |
| 2007/0126898 A1 | 6/2007 | Feldman |
| 2007/0127831 A1 | 6/2007 | Venkataraman |
| 2007/0139333 A1 | 6/2007 | Sato et al. |
| 2007/0146511 A1 | 6/2007 | Kinoshita et al. |
| 2007/0158427 A1 | 7/2007 | Zhu et al. |
| 2007/0159541 A1 | 7/2007 | Sparks et al. |
| 2007/0160310 A1 | 7/2007 | Tanida et al. |
| 2007/0165931 A1 | 7/2007 | Higaki |
| 2007/0171290 A1 | 7/2007 | Kroger |
| 2007/0211164 A1 | 9/2007 | Olsen et al. |
| 2007/0216765 A1 | 9/2007 | Wong et al. |
| 2007/0228256 A1 | 10/2007 | Mentzer |
| 2007/0257184 A1 | 11/2007 | Olsen et al. |
| 2007/0258006 A1 | 11/2007 | Olsen et al. |
| 2007/0258706 A1 | 11/2007 | Raskar et al. |
| 2007/0263114 A1 | 11/2007 | Gurevich et al. |
| 2007/0268374 A1 | 11/2007 | Robinson |
| 2007/0296835 A1 | 12/2007 | Olsen et al. |
| 2008/0019611 A1 | 1/2008 | Larkin |
| 2008/0025649 A1 | 1/2008 | Liu et al. |
| 2008/0030597 A1 | 2/2008 | Olsen et al. |
| 2008/0043095 A1 | 2/2008 | Vetro et al. |
| 2008/0043096 A1 | 2/2008 | Vetro et al. |
| 2008/0062164 A1 | 3/2008 | Bassi et al. |
| 2008/0079805 A1 | 4/2008 | Takagi et al. |
| 2008/0080028 A1 | 4/2008 | Bakin et al. |
| 2008/0084486 A1 | 4/2008 | Enge et al. |
| 2008/0088793 A1 | 4/2008 | Sverdrup et al. |
| 2008/0112635 A1 | 5/2008 | Kondo et al. |
| 2008/0118241 A1 | 5/2008 | Tekolste et al. |
| 2008/0131019 A1 | 6/2008 | Ng |
| 2008/0131107 A1 | 6/2008 | Ueno |
| 2008/0151097 A1 | 6/2008 | Chen et al. |
| 2008/0152215 A1 | 6/2008 | Horie et al. |
| 2008/0152296 A1 | 6/2008 | Oh et al. |
| 2008/0158259 A1 | 7/2008 | Kempf et al. |
| 2008/0158375 A1 | 7/2008 | Kakkori et al. |
| 2008/0158698 A1 | 7/2008 | Chang et al. |
| 2008/0187305 A1 | 8/2008 | Raskar et al. |
| 2008/0193026 A1 | 8/2008 | Horie et al. |
| 2008/0218610 A1 | 9/2008 | Chapman et al. |
| 2008/0219654 A1 | 9/2008 | Border et al. |
| 2008/0240598 A1 | 10/2008 | Hasegawa |
| 2008/0247638 A1 | 10/2008 | Tanida et al. |
| 2008/0247653 A1 | 10/2008 | Moussavi et al. |
| 2008/0272416 A1 | 11/2008 | Yun |
| 2008/0273751 A1 | 11/2008 | Yuan et al. |
| 2008/0278591 A1 | 11/2008 | Barna et al. |
| 2008/0298674 A1 | 12/2008 | Baker et al. |
| 2009/0050946 A1 | 2/2009 | Duparre et al. |
| 2009/0052743 A1 | 2/2009 | Techmer |
| 2009/0060281 A1 | 3/2009 | Tanida et al. |
| 2009/0086074 A1 | 4/2009 | Li et al. |
| 2009/0091806 A1 | 4/2009 | Inuiya |
| 2009/0096050 A1 | 4/2009 | Park |
| 2009/0102956 A1 | 4/2009 | Georgiev |
| 2009/0109306 A1 | 4/2009 | Shan et al. |
| 2009/0128833 A1 | 5/2009 | Yahav |
| 2009/0152664 A1 | 6/2009 | Klem et al. |
| 2009/0167922 A1 | 7/2009 | Perlman et al. |
| 2009/0179142 A1 | 7/2009 | Duparre et al. |
| 2009/0180021 A1 | 7/2009 | Kikuchi et al. |
| 2009/0200622 A1 | 8/2009 | Tai et al. |
| 2009/0201371 A1 | 8/2009 | Matsuda et al. |
| 2009/0207235 A1 | 8/2009 | Francini et al. |
| 2009/0225203 A1 | 9/2009 | Tanida et al. |
| 2009/0237520 A1 | 9/2009 | Kaneko et al. |
| 2009/0263017 A1 | 10/2009 | Tanbakuchi |
| 2009/0268192 A1 | 10/2009 | Koenck et al. |

(56) References Cited

U.S. PATENT DOCUMENTS

| | | |
|---|---|---|
| 2009/0268970 A1 | 10/2009 | Babacan et al. |
| 2009/0268983 A1 | 10/2009 | Stone |
| 2009/0274387 A1 | 11/2009 | Jin |
| 2009/0284651 A1 | 11/2009 | Srinivasan |
| 2009/0297056 A1 | 12/2009 | Lelescu et al. |
| 2009/0302205 A9 | 12/2009 | Olsen et al. |
| 2009/0323195 A1 | 12/2009 | Hembree et al. |
| 2009/0323206 A1 | 12/2009 | Oliver et al. |
| 2009/0324118 A1 | 12/2009 | Maslov et al. |
| 2010/0002126 A1 | 1/2010 | Wenstrand et al. |
| 2010/0002313 A1 | 1/2010 | Duparre et al. |
| 2010/0002314 A1 | 1/2010 | Duparre |
| 2010/0013927 A1 | 1/2010 | Nixon |
| 2010/0053342 A1 | 3/2010 | Hwang et al. |
| 2010/0053600 A1 | 3/2010 | Tanida et al. |
| 2010/0060746 A9 | 3/2010 | Olsen et al. |
| 2010/0085425 A1 | 4/2010 | Tan |
| 2010/0086227 A1 | 4/2010 | Sun et al. |
| 2010/0091389 A1 | 4/2010 | Henriksen et al. |
| 2010/0097491 A1 | 4/2010 | Farina et al. |
| 2010/0103259 A1 | 4/2010 | Tanida et al. |
| 2010/0103308 A1 | 4/2010 | Butterfield et al. |
| 2010/0111444 A1 | 5/2010 | Coffman |
| 2010/0118127 A1 | 5/2010 | Nam et al. |
| 2010/0133230 A1 | 6/2010 | Henriksen et al. |
| 2010/0133418 A1 | 6/2010 | Sargent et al. |
| 2010/0141802 A1 | 6/2010 | Knight et al. |
| 2010/0142839 A1 | 6/2010 | Lakus-Becker |
| 2010/0157073 A1 | 6/2010 | Kondo et al. |
| 2010/0165152 A1 | 7/2010 | Lim |
| 2010/0177411 A1 | 7/2010 | Hegde et al. |
| 2010/0194901 A1 | 8/2010 | van Hoorebeke et al. |
| 2010/0195716 A1 | 8/2010 | Klein et al. |
| 2010/0201834 A1 | 8/2010 | Maruyama et al. |
| 2010/0208100 A9 | 8/2010 | Olsen et al. |
| 2010/0220212 A1 | 9/2010 | Perlman et al. |
| 2010/0231285 A1 | 9/2010 | Boomer et al. |
| 2010/0244165 A1 | 9/2010 | Lake et al. |
| 2010/0265385 A1 | 10/2010 | Knight et al. |
| 2010/0281070 A1 | 11/2010 | Chan et al. |
| 2010/0302423 A1 | 12/2010 | Adams, Jr. et al. |
| 2011/0001037 A1 | 1/2011 | Tewinkle |
| 2011/0018973 A1 | 1/2011 | Takayama |
| 2011/0032370 A1 | 2/2011 | Ludwig |
| 2011/0043661 A1 | 2/2011 | Podoleanu |
| 2011/0043665 A1 | 2/2011 | Ogasahara |
| 2011/0043668 A1 | 2/2011 | McKinnon et al. |
| 2011/0069189 A1 | 3/2011 | Venkataraman et al. |
| 2011/0080487 A1 | 4/2011 | Venkataraman et al. |
| 2011/0108708 A1 | 5/2011 | Olsen et al. |
| 2011/0121421 A1 | 5/2011 | Charbon et al. |
| 2011/0122308 A1 | 5/2011 | Duparre |
| 2011/0128412 A1 | 6/2011 | Milnes et al. |
| 2011/0149408 A1 | 6/2011 | Hahgholt et al. |
| 2011/0149409 A1 | 6/2011 | Haugholt et al. |
| 2011/0153248 A1 | 6/2011 | Gu et al. |
| 2011/0157321 A1 | 6/2011 | Nakajima et al. |
| 2011/0176020 A1 | 7/2011 | Chang |
| 2011/0211824 A1 | 9/2011 | Georgiev et al. |
| 2011/0221599 A1 | 9/2011 | Högasten |
| 2011/0221658 A1 | 9/2011 | Haddick et al. |
| 2011/0221939 A1 | 9/2011 | Jerdev |
| 2011/0234841 A1 | 9/2011 | Akeley et al. |
| 2011/0241234 A1 | 10/2011 | Duparre |
| 2011/0242342 A1 | 10/2011 | Goma et al. |
| 2011/0242355 A1 | 10/2011 | Goma et al. |
| 2011/0242356 A1 | 10/2011 | Aleksic et al. |
| 2011/0255592 A1 | 10/2011 | Sung et al. |
| 2011/0255745 A1 | 10/2011 | Hodder et al. |
| 2011/0267348 A1 | 11/2011 | Lin et al. |
| 2011/0273531 A1 | 11/2011 | Ito et al. |
| 2011/0274366 A1 | 11/2011 | Tardif |
| 2011/0279721 A1 | 11/2011 | McMahon |
| 2011/0285866 A1 | 11/2011 | Bhrugumalla et al. |
| 2011/0298917 A1 | 12/2011 | Yanagita |
| 2011/0300929 A1 | 12/2011 | Tardif et al. |
| 2011/0310980 A1 | 12/2011 | Mathew |
| 2011/0317766 A1 | 12/2011 | Lim et al. |
| 2012/0012748 A1 | 1/2012 | Pain et al. |
| 2012/0026297 A1 | 2/2012 | Sato |
| 2012/0026342 A1 | 2/2012 | Yu et al. |
| 2012/0039525 A1 | 2/2012 | Tian et al. |
| 2012/0044249 A1 | 2/2012 | Mashitani et al. |
| 2012/0044372 A1 | 2/2012 | Côté et al. |
| 2012/0069235 A1 | 3/2012 | Imai |
| 2012/0105691 A1 | 5/2012 | Waqas et al. |
| 2012/0113413 A1 | 5/2012 | Miahczylowicz-Wolski et al. |
| 2012/0147139 A1 | 6/2012 | Li et al. |
| 2012/0147205 A1 | 6/2012 | Lelescu et al. |
| 2012/0153153 A1 | 6/2012 | Chang et al. |
| 2012/0154551 A1 | 6/2012 | Inoue |
| 2012/0170134 A1 | 7/2012 | Bolis et al. |
| 2012/0176479 A1 | 7/2012 | Mayhew et al. |
| 2012/0188634 A1 | 7/2012 | Kubala et al. |
| 2012/0198677 A1 | 8/2012 | Duparre |
| 2012/0200734 A1 | 8/2012 | Tang |
| 2012/0229628 A1 | 9/2012 | Ishiyama et al. |
| 2012/0249550 A1 | 10/2012 | Akeley et al. |
| 2012/0262607 A1 | 10/2012 | Shimura et al. |
| 2012/0287291 A1 | 11/2012 | McMahon et al. |
| 2012/0293695 A1 | 11/2012 | Tanaka |
| 2012/0314033 A1 | 12/2012 | Lee et al. |
| 2012/0327222 A1 | 12/2012 | Ng et al. |
| 2013/0002828 A1 | 1/2013 | Ding et al. |
| 2013/0003184 A1 | 1/2013 | Duparre |
| 2013/0010073 A1 | 1/2013 | Do |
| 2013/0022111 A1 | 1/2013 | Chen et al. |
| 2013/0027580 A1 | 1/2013 | Olsen et al. |
| 2013/0033579 A1 | 2/2013 | Wajs |
| 2013/0050504 A1 | 2/2013 | Safaee-Rad et al. |
| 2013/0050526 A1 | 2/2013 | Keelan |
| 2013/0057710 A1 | 3/2013 | McMahon |
| 2013/0070060 A1 | 3/2013 | Chatterjee |
| 2013/0077880 A1 | 3/2013 | Venkataraman et al. |
| 2013/0077882 A1 | 3/2013 | Venkataraman et al. |
| 2013/0088637 A1 | 4/2013 | Duparre |
| 2013/0113899 A1 | 5/2013 | Morohoshi et al. |
| 2013/0120605 A1 | 5/2013 | Georgiev et al. |
| 2013/0128068 A1 | 5/2013 | Georgiev et al. |
| 2013/0128069 A1 | 5/2013 | Georgiev et al. |
| 2013/0128087 A1 | 5/2013 | Georgiev et al. |
| 2013/0128121 A1 | 5/2013 | Agarwala et al. |
| 2013/0147979 A1 | 6/2013 | McMahon et al. |
| 2013/0215108 A1 | 8/2013 | McMahon et al. |
| 2013/0222556 A1 | 8/2013 | Shimada |
| 2013/0229540 A1 | 9/2013 | Farina et al. |
| 2013/0259317 A1 | 10/2013 | Gaddy |
| 2013/0265459 A1 | 10/2013 | Duparre et al. |
| 2014/0009586 A1 | 1/2014 | McNamer et al. |
| 2014/0076336 A1 | 3/2014 | Clayton et al. |
| 2014/0079336 A1 | 3/2014 | Venkataraman et al. |
| 2014/0092281 A1 | 4/2014 | Nisenzon et al. |
| 2014/0104490 A1 | 4/2014 | Hsieh et al. |
| 2014/0118493 A1 | 5/2014 | Sali et al. |
| 2014/0132810 A1 | 5/2014 | McMahon |
| 2014/0176592 A1 | 6/2014 | Wilburn et al. |
| 2014/0192253 A1 | 7/2014 | Laroia |
| 2014/0198188 A1 | 7/2014 | Izawa |
| 2014/0218546 A1 | 8/2014 | McMahon |
| 2014/0232822 A1 | 8/2014 | Venkataraman et al. |
| 2014/0240528 A1 | 8/2014 | Venkataraman et al. |
| 2014/0240529 A1 | 8/2014 | Venkataraman et al. |
| 2014/0253738 A1 | 9/2014 | Mullis |
| 2014/0267243 A1 | 9/2014 | Venkataraman et al. |
| 2014/0267286 A1 | 9/2014 | Duparre |
| 2014/0267633 A1 | 9/2014 | Venkataraman et al. |
| 2014/0267762 A1 | 9/2014 | Mullis et al. |
| 2014/0267890 A1 | 9/2014 | Lelescu et al. |
| 2014/0285675 A1 | 9/2014 | Mullis |
| 2014/0321712 A1 | 10/2014 | Ciurea et al. |
| 2014/0333731 A1 | 11/2014 | Venkataraman et al. |
| 2014/0333764 A1 | 11/2014 | Venkataraman et al. |
| 2014/0333787 A1 | 11/2014 | Venkataraman et al. |
| 2014/0340539 A1 | 11/2014 | Venkataraman et al. |

(56) References Cited

U.S. PATENT DOCUMENTS

| | | |
|---|---|---|
| 2014/0347509 A1 | 11/2014 | Venkataraman et al. |
| 2014/0354773 A1 | 12/2014 | Venkataraman et al. |
| 2014/0354843 A1 | 12/2014 | Venkataraman et al. |
| 2014/0354844 A1 | 12/2014 | Venkataraman et al. |
| 2014/0354853 A1 | 12/2014 | Venkataraman et al. |
| 2014/0354854 A1 | 12/2014 | Venkataraman et al. |
| 2014/0354855 A1 | 12/2014 | Venkataraman et al. |
| 2014/0355870 A1 | 12/2014 | Venkataraman et al. |
| 2014/0368662 A1 | 12/2014 | Venkataraman et al. |
| 2014/0368683 A1 | 12/2014 | Venkataraman et al. |
| 2014/0368684 A1 | 12/2014 | Venkataraman et al. |
| 2014/0368685 A1 | 12/2014 | Venkataraman et al. |
| 2014/0368686 A1 | 12/2014 | Duparre |
| 2014/0369612 A1 | 12/2014 | Venkataraman et al. |
| 2014/0369615 A1 | 12/2014 | Venkataraman et al. |
| 2014/0376825 A1 | 12/2014 | Venkataraman et al. |
| 2014/0376826 A1 | 12/2014 | Venkataraman et al. |
| 2015/0003752 A1 | 1/2015 | Venkataraman et al. |
| 2015/0003753 A1 | 1/2015 | Venkataraman et al. |
| 2015/0009353 A1 | 1/2015 | Venkataraman et al. |
| 2015/0009354 A1 | 1/2015 | Venkataraman et al. |
| 2015/0009362 A1 | 1/2015 | Venkataraman et al. |
| 2015/0015669 A1 | 1/2015 | Venkataraman et al. |
| 2015/0036014 A1 | 2/2015 | Lelescu et al. |
| 2015/0036015 A1 | 2/2015 | Lelescu et al. |
| 2015/0042766 A1 | 2/2015 | Ciurea et al. |
| 2015/0042767 A1 | 2/2015 | Ciurea et al. |
| 2015/0042833 A1 | 2/2015 | Lelescu et al. |
| 2015/0049915 A1 | 2/2015 | Ciurea et al. |
| 2015/0049916 A1 | 2/2015 | Ciurea et al. |
| 2015/0049917 A1 | 2/2015 | Ciurea et al. |

FOREIGN PATENT DOCUMENTS

| | | |
|---|---|---|
| JP | 2006033493 A | 2/2006 |
| JP | 2007520107 A | 7/2007 |
| JP | 2011109484 A | 6/2011 |
| JP | 2013526801 A | 6/2013 |
| JP | 2014521117 A | 8/2014 |
| KR | 1020110097647 A | 8/2011 |
| WO | 2007083579 A1 | 7/2007 |
| WO | 2008108271 A1 | 9/2008 |
| WO | 2009151903 A2 | 12/2009 |
| WO | 2011063347 A2 | 5/2011 |
| WO | 2011116203 A1 | 9/2011 |
| WO | 2011063347 A3 | 10/2011 |
| WO | 2011143501 A1 | 11/2011 |
| WO | 2012057619 A1 | 5/2012 |
| WO | 2012057620 A2 | 5/2012 |
| WO | 2012057621 A1 | 5/2012 |
| WO | 2012057622 A1 | 5/2012 |
| WO | 2012057623 A1 | 5/2012 |
| WO | 2012057620 A3 | 6/2012 |
| WO | 2012074361 A1 | 6/2012 |
| WO | 2012078126 A1 | 6/2012 |
| WO | 2012082904 A1 | 6/2012 |
| WO | 2012155119 A1 | 11/2012 |
| WO | 2013003276 A1 | 1/2013 |
| WO | 2013043751 A1 | 3/2013 |
| WO | 2013043761 A1 | 3/2013 |
| WO | 2013049699 A1 | 4/2013 |
| WO | 2013055960 A1 | 4/2013 |
| WO | 2013119706 A1 | 8/2013 |
| WO | 2013126578 A1 | 8/2013 |
| WO | 2014052974 A2 | 4/2014 |
| WO | 2014032020 A3 | 5/2014 |
| WO | 2014078443 A1 | 5/2014 |
| WO | 2014130849 A1 | 8/2014 |
| WO | 2014133974 A1 | 9/2014 |
| WO | 2014138695 A1 | 9/2014 |
| WO | 2014138697 A1 | 9/2014 |
| WO | 2014144157 A1 | 9/2014 |
| WO | 2014145856 A1 | 9/2014 |
| WO | 2014149403 A1 | 9/2014 |
| WO | 2014150856 A1 | 9/2014 |
| WO | 2014159721 A1 | 10/2014 |
| WO | 2014159779 A1 | 10/2014 |
| WO | 2014160142 A1 | 10/2014 |
| WO | 2014164550 A2 | 10/2014 |
| WO | 2014164909 A1 | 10/2014 |
| WO | 2014165244 A1 | 10/2014 |

OTHER PUBLICATIONS

International Preliminary Report on Patentability for International Application PCT/US2013/027146, Report Completed Apr. 2, 2013, Mailed Sep. 4, 2014, 10 Pages.
International Search Report and Written Opinion for International Application No. PCT/US13/46002, Search Completed Nov. 13, 2013, Mailed Nov. 29, 2013, 7 pgs.
International Search Report and Written Opinion for International Application No. PCT/US13/48772, Search Completed Oct. 21, 2013, Mailed Nov. 8, 2013, 6 pgs.
International Search Report and Written Opinion for International Application No. PCT/US13/56065, Search Completed Nov. 25, 2013, Mailed Nov. 26, 2013, 8 pgs.
International Search Report and Written Opinion for International Application No. PCT/US13/59991, Search Completed Feb. 6, 2014, Mailed Feb. 26, 2014, 8 pgs.
International Search Report and Written Opinion for International Application No. PCT/US2009/044687, date completed Jan. 5, 2010, date mailed Jan. 13, 2010, 9 pgs.
International Search Report and Written Opinion for International Application No. PCT/US2013/024987, Search Completed Mar. 27, 2013, Mailed Apr. 15, 2013, 14 pgs.
International Search Report and Written Opinion for International Application No. PCT/US2013/056502, Search Completed Feb. 18, 2014, Mailed Mar. 19, 2014, 7 pgs.
International Search Report and Written Opinion for International Application No. PCT/US2013/069932, International Filing Date Nov. 13, 2013, Search Completed Mar. 14, 2014, Mailed Apr. 14, 2014, 12 pgs.
International Search Report and Written Opinion for International Application PCT/US13/62720, report completed Mar. 25, 2014, Mailed Apr. 21, 2014, 9 Pgs.
International Search Report and Written Opinion for International Application PCT/US14/024903 report completed Jun. 12, 2014, Mailed, Jun. 27, 2014, 13 pgs.
International Search Report and Written Opinion for International Application PCT/US14/17766, report completed May 28, 2014, Mailed Jun. 18, 2014, 9 Pgs.
International Search Report and Written Opinion for International Application PCT/US14/18084, report completed May 23, 2014, Mailed Jun. 10, 2014, 12 Pgs.
International Search Report and Written Opinion for International Application PCT/US14/24407, report completed Jun. 11, 2014, Mailed Jul. 8, 2014, 9 Pgs.
International Search Report and Written Opinion for International Application PCT/US14/25100, report completed Jul. 7, 2014, Mailed Aug. 7, 2014 5 Pgs.
International Search Report and Written Opinion for International Application PCT/US14/25904 report completed Jun. 10, 2014, Mailed Jul. 10, 2014, 6 Pgs.
International Search Report and Written Opinion for International Application PCT/US2014/022123, report completed Jun. 9, 2014, Mailed Jun. 25, 2014, 5 pgs.
International Search Report and Written Opinion for International Application PCT/US2014/024947, Report Completed Jul. 8, 2014, Mailed Aug. 5, 2014, 8 Pgs.
International Search Report and Written Opinion for International Application PCT/US2014/028447, report completed Jun. 30, 2014, Mailed Jul. 21, 2014, 8 Pgs.
International Search Report and Written Opinion for International Application PCT/US2014/030692, report completed Jul. 28, 2014, Mailed Aug. 27, 2014, 7 Pages.

(56) References Cited

OTHER PUBLICATIONS

International Search Report and Written Opinion for International Application PCT/US2014/23762, Report Completed May 30, 2014, Mailed Jul. 3, 2014, 6 Pgs.
IPRP for International Application No. PCT/US2012/059813, International Filing Date Oct. 11, 2012, Search Completed Apr. 15, 2014, 7 pgs.
Search Report and Written Opinion for International Application PCT/US11/36349, mailed Aug. 22, 2011, 12 pgs.
International Search Report and Written Opinion for International Application No. PCT/US2011/64921, Report Completed Feb. 25, 2011, mailed Mar. 6, 2012, 17 pgs.
International Search Report and Written Opinion for International Application No. PCT/US2013/027146, completed Apr. 2, 2013, 12 pgs.
International Search Report and Written Opinion for International Application PCT/US14/18116, completed May 13, 2014, 12 pgs.
International Search Report and Written Opinion for International Application PCT/US14/22118, report completed Jun. 9, 2014, Mailed, Jun. 25, 2014, 5 pgs.
International Search Report and Written Opinion for International Application PCT/US2010/057661, completed Mar. 9, 2011, 14 pgs.
International Search Report and Written Opinion for International Application PCT/US2012/044014, completed Oct. 12, 2012, 15 pgs.
International Search Report and Written Opinion for International Application PCT/US2012/056151, completed Nov. 14, 2012, 10 pgs.
International Search Report and Written Opinion for International Application PCT/US2012/059813, completed Dec. 17, 2012, 8 pgs.
International Search Report and Written Opinion for International Application PCT/US2012/37670, Mailed Jul. 18, 2012, Search Completed Jul. 5, 2012, 9 pgs.
International Search Report and Written Opinion for International Application PCT/US2012/58093, completed Nov. 15, 2012, 12 pgs.
Office Action for U.S. Appl. No. 12/952,106, dated Aug. 16, 2012, 12 pgs.
Baker et al., "Limits on Super-Resolution and How to Break Them", IEEE Transactions on Pattern Analysis and Machine Intelligence, Sep. 2002, vol. 24, No. 9, pp. 1167-1183.
Bertero et al., "Super-resolution in computational imaging", Micron, 2003, vol. 34, Issues 6-7, 17 pgs.
Bishop et al., "Full-Resolution Depth Map Estimation from an Aliased Plenoptic Light Field", ACCV 2010, Part II, LNCS 6493, pp. 186-200.
Bishop et al., "The Light Field Camera: Extended Depth of Field, Aliasing, and Superresolution", IEEE Transactions on Pattern Analysis and Machine Intelligence, May 2012, vol. 34, No. 5, pp. 972-986.
Borman, "Topics in Multiframe Superresolution Restoration", Thesis of Sean Borman, Apr. 2004, 282 pgs.
Borman et al, "Image Sequence Processing", Source unknown, Oct. 14, 2002, 81 pgs.
Borman et al., "Block-Matching Sub-Pixel Motion Estimation from Noisy, Under-Sampled Frames—An Empirical Performance Evaluation", Proc SPIE, Dec. 1998, 3653, 10 pgs.
Borman et al., "Image Resampling and Constraint Formulation for Multi-Frame Super-Resolution Restoration", Proc. SPIE, Jun. 2003, 5016, 12 pgs.
Borman et al., "Linear models for multi-frame super-resolution restoration under non-affine registration and spatially varying PSF", Proc. SPIE, May 2004, vol. 5299, 12 pgs.
Borman et al., "Nonlinear Prediction Methods for Estimation of Clique Weighting Parameters in NonGaussian Image Models", Proc. SPIE, 1998. 3459, 9 pgs.
Borman et al., "Simultaneous Multi-Frame MAP Super-Resolution Video Enhancement Using Spatio-Temporal Priors", Image Processing, 1999, ICIP 99 Proceedings, vol. 3, pp. 469-473.
Borman et al., "Super-Resolution from Image Sequences—A Review", Circuits & Systems, 1998, pp. 374-378.
Bruckner et al., "Artificial compound eye applying hyperacuity", Optics Express, Dec. 11, 2006, vol. 14, No. 25, pp. 12076-12084.
Bruckner et al., "Driving microoptical imaging systems towards miniature camera applications", Proc. SPIE, Micro-Optics, 2010, 11 pgs.
Bruckner et al., "Thin wafer-level camera lenses inspired by insect compound eyes", Optics Express, Nov. 22, 2010, vol. 18, No. 24, pp. 24379-24394.
Capel, "Image Mosaicing and Super-resolution", [online], Retrieved on Nov. 10, 2012. Retrieved from the Internet at URL:<http://citeseerx.ist.psu.edu/viewdoc/download?doi=10.1.1.226.2643&rep=rep1&type=pdf>, Title pg., abstract, table of contents, pp. 1-263 (269 total pages).
Chan et al., "Extending the Depth of Field in a Compound-Eye Imaging System with Super-Resolution Reconstruction", Proceedings—International Conference on Pattern Recognition, 2006, vol. 3, pp. 623-626.
Chan et al., "Super-resolution reconstruction in a computational compound-eye imaging system", Multidim Syst Sign Process, 2007, vol. 18, pp. 83-101.
Chan et al., "Super-resolution reconstruction in a computational compound-eye imaging system", Multidim. Syst. Sign Process, 2007, vol. 18, pp. 83-101.
Chen et al., "Interactive deformation of light fields", In Proceedings of SIGGRAPH I3D 2005, pp. 139-146.
Drouin et al., "Fast Multiple-Baseline Stereo with Occlusion", Proceedings of the Fifth International Conference on 3-D Digital Imaging and Modeling, 2005, 8 pgs.
Drouin et al., "Geo-Consistency for Wide Multi-Camera Stereo", Proceedings of the 2005 IEEE Computer Society Conference on Computer Vision and Pattern Recognition, 2005, 8 pgs.
Drouin et al., "Improving Border Localization of Multi-Baseline Stereo Using Border-Cut", International Journal of Computer Vision, Jul. 2009, vol. 83, Issue 3, 8 pgs.
Duparre et al., "Artificial apposition compound eye fabricated by micro-optics technology", Applied Optics, Aug. 1, 2004, vol. 43, No. 22, pp. 4303-4310.
Duparre et al., "Artificial compound eye zoom camera", Bioinspiration & Biomimetics, 2008, vol. 3, pp. 1-6.
Duparre et al., "Artificial compound eyes—different concepts and their application to ultra flat image acquisition sensors", MOEMS and Miniaturized Systems IV, Proc. SPIE 5346, Jan. 2004, pp. 89-100.
Duparre et al., "Chirped arrays of refractive ellipsoidal microlenses for aberration correction under oblique incidence", Optics Express, Dec. 26, 2005, vol. 13, No. 26, pp. 10539-10551.
Duparre et al., "Micro-optical artificial compound eyes", Bioinspiration & Biomimetics, 2006, vol. 1, pp. R1-R16.
Duparre et al., "Microoptical Artificial Compound Eyes—Two Different Concepts for Compact Imaging Systems", 11th Microoptics Conference, Oct. 30-Nov. 2, 2005, 2 pgs.
Duparre et al., "Microoptical telescope compound eye", Optics Express, Feb. 7, 2005, vol. 13, No. 3, pp. 889-903.
Duparre et al., "Micro-optically fabricated artificial apposition compound eye", Electronic Imaging—Science and Technology, Prod. SPIE 5301, Jan. 2004, pp. 25-33.
Duparre et al., "Novel Optics/Micro-Optics for Miniature Imaging Systems", Proc. of SPIE, 2006, vol. 6196, pp. 619607-1-619607-15.
Duparre et al., "Theoretical analysis of an artificial superposition compound eye for application in ultra flat digital image acquisition devices", Optical Systems Design, Proc. SPIE 5249, Sep. 2003, pp. 408-418.
Duparre et al., "Thin compound-eye camera", Applied Optics, May 20, 3005, vol. 44, No. 15, pp. 2949-2956.
Duparre et al., "Ultra-Thin Camera Based on Artificial Apposition Compound Eyes", 10th Microoptics Conference, Sep. 1-3, 2004, 2 pgs.
Fanaswala, "Regularized Super-Resolution of Multi-View Images", Retrieved on Nov. 10, 2012. Retrieved from the Internet at URL:<http://www.site.uottawa.ca/-edubois/theses/Fanaswala_thesis.pdf>, 163 pgs.
Farrell et al., "Resolution and Light Sensitivity Tradeoff with Pixel Size", Proceedings of the SPIE Electronic Imaging 2006 Conference, 2006, vol. 6069, 8 pgs.

(56) References Cited

OTHER PUBLICATIONS

Farsiu et al., "Advances and Challenges in Super-Resolution", International Journal of Imaging Systems and Technology, 2004, vol. 14, pp. 47-57.
Farsiu et al., "Fast and Robust Multiframe Super Resolution", IEEE Transactions on Image Processing, Oct. 2004, vol. 13, No. 10, pp. 1327-1344.
Farsiu et al., "Multiframe Demosaicing and Super-Resolution of Color Images", IEEE Transactions on Image Processing, Jan. 2006, vol. 15, No. 1, pp. 141-159.
Feris et al., "Multi-Flash Stereopsis: Depth Edge Preserving Stereo with Small Baseline Illumination", IEEE Trans on PAMI, 2006, 31 pgs.
Fife et al., "A 3D Multi-Aperture Image Sensor Architecture", Custom Integrated Circuits Conference, 2006, CICC '06, IEEE, pp. 281-284.
Fife et al., "A 3MPixel Multi-Aperture Image Sensor with 0.7Mu Pixels in 0.11Mu CMOS", ISSCC 2008, Session 2, Image Sensors & Technology, 2008, pp. 48-50.
Goldman et al., "Video Object Annotation, Navigation, and Composition", In Proceedings of UIST 2008, pp. 3-12.
Gortler et al., "The Lumigraph", In Proceedings of SIGGRAPH 1996, pp. 43-54.
Hacohen et al., "Non-Rigid Dense Correspondence with Applications for Image Enhancement", ACM Transactions on Graphics, 30, 4, 2011, pp. 70:1-70:10.
Hamilton, "JPEG File Interchange Format, Version 1.02", Sep. 1, 1992, 9 pgs.
Hardie, "A Fast Image Super-Algorithm Using an Adaptive Wiener Filter", IEEE Transactions on Image Processing, Dec. 2007, vol. 16, No. 12, pp. 2953-2964.
Hasinoff et al., "Search-and-Replace Editing for Personal Photo Collections", Computational Photography (ICCP) 2010, pp. 1-8.
Horisaki et al., "Irregular Lens Arrangement Design to Improve Imaging Performance of Compound-Eye Imaging Systems", Applied Physics Express, 2010, vol. 3, pp. 022501-1-022501-3.
Horisaki et al., "Superposition Imaging for Three-Dimensionally Space-Invariant Point Spread Functions", Applied Physics Express, 2011, vol. 4, pp. 112501-1-112501-3.
Horn et al., "LightShop: Interactive Light Field Manipulation and Rendering", In Proceedings of I3D 2007, pp. 121-128.
Isaksen et al., "Dynamically Reparameterized Light Fields", In Proceedings of SIGGRAPH 2000, pp. 297-306.
Jarabo et al., "Efficient Propagation of Light Field Edits", In Proceedings of SIACG 2011, pp. 75-80.
Joshi et al., "Synthetic Aperture Tracking: Tracking Through Occlusions", I CCV IEEE 11th International Conference on Computer Vision; Publication [online]. Oct. 2007 [retrieved Jul. 28, 2014]. Retrieved from the Internet: <URL: http:l/ieeexplore.ieee.org/stamp/stamp.jsp?tp=&arnumber=4409032&isnumber=4408819>; pp. 1-8.
Kang et al., "Handling Occlusions inn Dense Multi-View Stereo", Computer Vision and Pattern Recognition, 2001, vol. 1, pp. I-103-I-110.
Kitamura et al., "Reconstruction of a high-resolution image on a compound-eye image-capturing system", Applied Optics, Mar. 10, 2004, vol. 43, No. 8, pp. 1719-1727.
Krishnamurthy et al., "Compression and Transmission of Depth Maps for Image-Based Rendering", Image Processing, 2001, pp. 828-831.
Kutulakos et al., "Occluding Contour Detection Using Affine Invariants and Purposive Viewpoint Control", Proc., Cavpr 94, 8 pgs.
Lensvector, "How LensVector Autofocus Works", printed Nov. 2, 2012 from http://www.lensvector.com/overview.html, 1 pg.
Levoy, "Light Fields and Computational Imaging", IEEE Computer Society, Aug. 2006, pp. 46-55.
Levoy et al., "Light Field Rendering", Proc. ADM SIGGRAPH '96, pp. 1-12.
Li et al., "A Hybrid Camera for Motion Deblurring and Depth Map Super-Resolution," Jun. 23-28, 2008, IEEE Conference on Computer Vision and Pattern Recognition, 8 pgs. Retrieved from www.eecis.udel.edu/~jye/lab_research/08/deblur-feng.pdf on Feb. 5, 2014.
Liu et al., "Virtual View Reconstruction Using Temporal Information", 2012 IEEE International Conference on Multimedia and Expo, 2012, pp. 115-120.
Lo et al., "Stereoscopic 3D Copy & Paste", ACM Transactions on Graphics, vol. 29, No. 6, Article 147, Dec. 2010, pp. 147:1-147:10.
Muehlebach, "Camera Auto Exposure Control for VSLAM Applications", Studies on Mechatronics, Swiss Federal Institute of Technology Zurich, Autumn Term 2010 course, 67 pgs.
Nayar, "Computational Cameras: Redefining the Image", IEEE Computer Society, Aug. 2006, pp. 30-38.
Ng, "Digital Light Field Photography", Thesis, Jul. 2006, 203 pgs.
Ng et al., "Super-Resolution Image Restoration from Blurred Low-Resolution Images", Journal of Mathematical Imaging and Vision, 2005, vol. 23, pp. 367-378.
Nitta et al., "Image reconstruction for thin observation module by bound optics by using the iterative backprojection method", Applied Optics, May 1, 2006, vol. 45, No. 13, pp. 2893-2900.
Nomura et al., "Scene Collages and Flexible Camera Arrays", Proceedings of Eurographics Symposium on Rendering, 2007, 12 pgs.
Park et al., "Super-Resolution Image Reconstruction", IEEE Signal Processing Magazine, May 2003, pp. 21-36.
Pham et al., "Robust Super-Resolution without Regularization", Journal of Physics: Conference Series 124, 2008, pp. 1-19.
Protter et al., "Generalizing the Nonlocal-Means to Super-Resolution Reconstruction", IEEE Transactions on Image Processing, Jan. 2009, vol. 18, No. 1, pp. 36-51.
Radtke et al., "Laser lithographic fabrication and characterization of a spherical artificial compound eye", Optics Express, Mar. 19, 2007, vol. 15, No. 6, pp. 3067-3077.
Rander et al., "Virtualized Reality: Constructing Time-Varying Virtual Worlds From Real World Events", Proc. of IEEE Visualization '97, Phoenix, Arizona, Oct. 19-24, 1997, pp. 277-283, 552.
Rhemann et al, "Fast Cost-Volume Filtering for Visual Correspondence and Beyond", IEEE Trans. Pattern Anal. Mach. Intell, 2013, vol. 35, No. 2, pp. 504-511.
Robertson et al., "Dynamic Range Improvement Through Multiple Exposures", In Proc. of the Int. Conf. on Image Processing, 1999, 5 pgs.
Robertson et al., "Estimation-theoretic approach to dynamic range enhancement using multiple exposures", Journal of Electronic Imaging, Apr. 2003, vol. 12, No. 2, pp. 219-228.
Roy et al., "Non-Uniform Hierarchical Pyramid Stereo for Large Images", Computer and Robot Vision, 2007, pp. 208-215.
Sauer et al., "Parallel Computation of Sequential Pixel Updates in Statistical Tomographic Reconstruction", ICIP 1995, pp. 93-96.
Shum et al., "Pop-Up Light Field: An Interactive Image-Based Modeling and Rendering System," Apr. 2004, ACM Transactions on Graphics, vol. 23, No. 2, pp. 143-162. Retrieved from http://131.107.65.14/enus/um/people/jiansun/papers/PopupLightField_TOG.pdf on Feb. 5.
Stollberg et al., "The Gabor superlens as an alternative wafer-level camera approach inspired by superposition compound eyes of nocturnal insects", Optics Express, Aug. 31, 2009, vol. 17, No. 18, pp. 15747-15759.
Takeda et al., "Super-resolution Without Explicit Subpixel Motion Estimation", IEEE Transaction on Image Processing, Sep. 2009, vol. 18, No. 9, pp. 1958-1975.
Tanida et al., "Color imaging with an integrated compound imaging system", Optics Express, Sep. 8, 2003, vol. 11, No. 18, pp. 2109-2117.
Tanida et al., "Thin observation module by bound optics (TOMBO): concept and experimental verification", Applied Optics, Apr. 10, 2001, vol. 40, No. 11, pp. 1806-1813.
Vaish et al., "Reconstructing Occluded Surfaces Using Synthetic Apertures: Stereo, Focus and Robust Measures", Proceeding, CVPR '06 Proceedings of the 2006 IEEE Computer Society Conference on Computer Vision and Pattern Recognition—vol. 2, pp. 2331-2338.
Vaish et al., "Synthetic Aperture Focusing Using a Shear-Warp Factorization of the Viewing Transform", IEEE Workshop on A3DISS, CVPR, 2005, 8 pgs.

(56) References Cited

OTHER PUBLICATIONS

Vaish et al., "Using Plane + Parallax for Calibrating Dense Camera Arrays", IEEE Conference on Computer Vision and Pattern Recognition (CVPR), 2004, 8 pgs.
Veilleux, "CCD Gain Lab: The Theory", University of Maryland, College Park-Observational Astronomy (ASTR 310), Oct. 19, 2006, pp. 1-5 (online), [retrieved on May 13, 2014]. Retrieved from the Internet <URL: http://www.astro.umd.edu/~veilleux/ASTR310/fall06/ccd_theory.pdf, 5 pgs.
Vuong et al., A New Auto Exposure and Auto White-Balance Algorithm to Detect High Dynamic Range Conditions Using CMOS Technology, Proceedings of the World Congress on Engineering and Computer Science 2008, WCECS 2008, Oct. 22-24, 2008.
Wetzstein et al., "Computational Plenoptic Imaging", Computer Graphics Forum, 2011, vol. 30, No. 8, pp. 2397-2426.
Wheeler et al., "Super-Resolution Image Synthesis Using Projections Onto Convex Sets in the Frequency Domain", Proc. SPIE, 2005, 5674, 12 pgs.
Wilburn, "High Performance Imaging Using Arrays of Inexpensive Cameras", Thesis of Bennett Wilburn, Dec. 2004, 128 pgs.
Wilburn et al., "High Performance Imaging Using Large Camera Arrays", ACM Transactions on Graphics, Jul. 2005, vol. 24, No. 3, pp. 765-776.
Wilburn et al., "High-Speed Videography Using a Dense Camera Array", Proceeding, CVPR'04 Proceedings of the 2004 IEEE Computer Society Conference on Computer Vision and Pattern Recognition, pp. 294-301.
Wilburn et al., "The Light Field Video Camera", Proceedings of Media Processors 2002, Spie Electronic Imaging, 2002, 8 pgs.
Wippermann et al., "Design and fabrication of a chirped array of refractive ellipsoidal micro-lenses for an apposition eye camera objective", Proceedings of SPIE, Optical Design and Engineering II, Oct. 15, 2005, 59622C-1-59622C1-1.
Yang et al., "A Real-Time Distributed Light Field Camera", Eurographics Workshop on Rendering (2002), pp. 1-10.
Zhang et al., "A Self-Reconfigurable Camera Array", Eurographics Symposium on Rendering, 2004, 12 pgs.
Zomet et al., "Robust Super-Resolution", IEEE, 2001, pp. 1-6.
International Preliminary Report on Patentability for International Application PCT/US2013/048772, Report completed Dec. 31, 2014, Mailed Jan. 8, 2015, 8 Pgs.
International Preliminary Report on Patentability for International Application PCT/US2013/039155, report completed Nov. 4, 2014, Mailed Nov. 13, 2014, 10 Pgs.
Extended European Search Report for European Application EP12835041.0, Report Completed Jan. 28, 2015, Mailed Feb. 4, 2015, 6 Pgs.
International Preliminary Report on Patentability for International Application PCT/US2014/023762, Report Issued Mar. 2, 2015, Mailed Mar. 9, 2015, 19 Pgs.
International Preliminary Report on Patentability for International Application PCT/US13/56065, Report Issued Feb. 24, 2015, Mailed Mar 5, 2015, 4 Pgs.
International Preliminary Report on Patentability for International Application PCT/US2013/056502, Report Issued Feb 24, 2015, Mailed Mar 5, 2015, 7 Pgs.
Chen et al., "KNN Matting", IEEE Transactions on Pattern Analysis and Machine Intelligence, Sep. 2013, vol. 35, No. 9, pp. 2175-2188.
Lai et al., "A Large-Scale Hierarchical Multi-View Rgb-D Object Dataset", 8 pgs. Robotics and Automation (ICRA), 2011 IEEE International Conference on. May 2011.
Levin et al., "A Closed Form Solution to Natural Image Matting", Pattern Analysis and Machine Intelligence, Feb. 2008, vol. 30, 8 pgs.
Perwass et al., "Single Lens 3D-Camera with Extended Depth-of-Field", printed from www.raytrix.de, 15 pgs. SPIE Proceedings, vol. 8291, Feb. 9, 2012.
Tallon et al., "Upsampling and Denoising of Depth Maps Via Joint-Segmentation", 20th European Signal Processing Conference, Aug. 27-31, 2012, 5 pgs.
Zhang et al., "Depth estimation, spatially variant image registration, and super-resolution using a multi-lenslet camera", Proceedings of SPIE, vol. 7705, Apr. 23, 2010, pp. 770505-770505-8, XP055113797 ISSN: 0277-786X, DOI: 10.1117/12.852171.
US 8,957,977, 02/2015, Venkataraman et al. (withdrawn)
US 8,964,053, 02/2015, Venkataraman et al. (withdrawn)
US 8,965,058, 02/2015, Venkataraman et al. (withdrawn)

| Name | Byte number | Comments |
|---|---|---|
| Reserved for future extensions | Byte 3 | |
| Number of Auxiliary Maps | Byte 2 | Describes total number of Auxiliary maps present in the file |
| Depth Map Camera Array and Auxiliary Maps compression | Byte 1 | See detailed description in Figure 6 |
| Depth Map, Camera Array and Auxiliary Maps Selection | Byte 0 | See detailed description in Figure 7 |

| Data Type | Bit number | Selection values |
|---|---|---|
| Reserved for Future extensions | Bit 7 | |
| Confidence Map | Bit 7 | 0: Map is not included<br>1: Map is Present |
| Silhouette Edge Map | Bit 5 | 0: Map is not included<br>1: Map is Present |
| Regular Edge Map | Bit 4 | 0: Map is not included<br>1: Map is Present |
| Missing Pixel Map | Bit 3 | 0: Map is not included<br>1: Map is Present |
| Virtual View Point | Bit 2 | 0: No Virtual View Point<br>1: Virtual View Point is Present |
| Camera Array and Per camera Occlusion Data | Bit 1 | 0: Data is not included<br>1: Data are Present |
| Depth Map | Bit 0 | 0: Data is not included<br>1: Data is Present |

FIG. 6

| Reserved for Future extensions | Bit 7 | 0: Not Compressed<br>1: Compressed |
|---|---|---|
| Confidence Map | Bit 7 | 0: Not Compressed<br>1: Compressed |
| Silhouette Edge Map | Bit 5 | 0: Not Compressed<br>1: Compressed |
| Regular Edge Map | Bit 4 | 0: Not Compressed<br>1: Compressed |
| Missing Pixel Map | Bit 3 | 0: Not Compressed<br>1: Compressed |
| Virtual View Point | Bit 2 | 0: Not Present<br>1: Present |
| Camera Array and Per camera Occlusion Data | Bit 1 | 0: Not Compressed<br>1: Compressed |
| Depth Map | Bit 0 | 0: Regular JPEG compression<br>1: Lossless JPEG LS compression |

FIG. 7

| Attribute name | Attribute Tag ID (4Byte) | Attribute Description |
|---|---|---|
| Reserved for future extensions | 2-127 | |
| In Focus Plane | 1 | Define central in focus Depth Plane |
| F# | 0 | Defines Synthetic Aperture |

FIG. 8

| Name | Byte Number | Description | Comments |
|---|---|---|---|
| Reserved for future extensions | 9-15 | | |
| Version | 7-8 | The most significant byte is used for major revisions, the least significant byte for minor revisions. Version 1.00 is the current revision. | Initial version must support Regular JPEG 8-bit grayscale compression |
| Identifier | 0-6 | Zero terminated string "PIDZDH" uniquely identifies this descriptor | |

FIG. 9

| Name | Byte Numbers | Description | Comments |
|---|---|---|---|
| Compressed Depth Map Data | 16 to 16 + Length | Compressed Depth Map Data for Current Segment | |
| Reserved for future extensions | 13-15 | | |
| Offset to the next Marker | 9-12 | Number of bites from current Marker to the next Marker excluding the APP9 marker itself | Next Marker could be either Depth Map Data Segment Marker, Camera Array Marker or Auxiliary Map Marker |
| Length | 7-8 | Total APP9 field byte count, including the byte count value (2 bytes), but excluding the APP9 marker itself. | A JPEG marker is limited to 65533 bytes. To represent the whole map multiple depth map markers with the same ID will be following each other |
| Identifier | 0-6 | Zero terminated string "PIDZDD" uniquely identifies this descriptor | |

*FIG. 10*

| Attribute name | Attribute Tag ID (4Byte) | Bytes | Attribute Description | Comments |
|---|---|---|---|---|
| Horizontal dimension | 0 | 4 | Number of cameras in horizontal direction N | We assume two dimensional Camera Array |
| Vertical dimension | 1 | 4 | Number of cameras in horizontal direction M | |
| Reference camera position | 2 | 4 | Camera number (row major) | |
| Virtual View Position | 3 | 8 | Two floating point numbers Px and Py defining Horizontal and Vertical position of Virtual View point | Constrains:<br>$0 <= Px <= N$<br>$0 <= Py <= M$ |
| Number of cameras with occlusion data | 4 | 4 | Number of cameras in camera array with occlusion data | |

*FIG. 11*

| Name | Byte Number | Description | Comments |
|---|---|---|---|
| Reserved for future extensions | 9-15 | | |
| Version | 7-8 | The most significant byte is used for major revisions, the least significant byte for minor revisions. Version 1.00 is the current revision. | Initial version must support Regular JPEG 8-bit grayscale compression |
| Identifier | 0-6 | Zero terminated string "PIDZAH" uniquely identifies this descriptor | |

*FIG. 12*

| Name | Byte Numbers | Description | Comments |
| --- | --- | --- | --- |
| Reserved for future extensions | 14-15 | | |
| Offset to the next Marker | 12-13 | Number of bites from current Marker to the next Marker excluding the APP9 marker itself | Next Marker could be either Depth Map Data Segment Marker, Camera Array Marker or Auxiliary Map Marker |
| Length | 10-11 | Total APP9 field byte count, including the byte count value (2 bytes), but excluding the APP9 marker itself. | A JPEG marker is limited to 65533 bytes. To represent the whole map multiple depth map markers with the same ID will be following each other |
| Number of Occluded pixels | 8-9 | Total Number of Occluded Pixels in this Camera | Currently Camera Array Data is not compressed |
| Camera Number | 7 | Camera Number (row major) | |
| Identifier | 0-6 | Zero terminated string "PIDZCD" uniquely identifies this descriptor | |

FIG. 13

| Name | Byte Numbers | Description | Comments |
|---|---|---|---|
| Individual Camera Data for Current Segment | 16 to 16 + Length | Occlusion Data | Occlusion Data in current revision is not compressed |
| Reserved for future extensions | 12-15 | | |
| Offset to the next Marker | 10-11 | Number of bites from current Marker to the next Marker excluding the APP9 marker itself | Next Marker could be either Depth Map Data Segment Marker, Camera Array Marker or Auxiliary Map Marker |
| Length | 8-9 | Total APP9 field byte count, including the byte count value (2 bytes), but excluding the APP9 marker itself. | A JPEG marker is limited to 65533 bytes. To represent the whole map multiple depth map markers with the same ID will be following each other |
| Number of Pixels | 7-8 | Number of occluded pixels in current segment | |
| Identifier | 0-6 | Zero terminated string "PIDZCD" uniquely identifies this descriptor | |

*FIG. 14*

| Name | Number of Bytes | Attribute Description | Comments |
|---|---|---|---|
| Depth | 1 | Depth value | |
| RGB Color | 3 | Pixel color | |
| Pixel coordinates | 8 | Two integer numbers defining x an y Pixel coordinates | |

*FIG. 15*

| Name | Byte Number | Description | Comments |
|---|---|---|---|
| Reserved for future extensions | 11-15 | | |
| Number of bits per Map | 10 | Number of bits per pixel for current Auxiliary Map | |
| Auxiliary Map Type | 9 | Type of Auxiliary maps | The following types of Auxiliary Maps have been currently defined:<br>0 = Missing Pixel<br>1 = Regular Edge<br>2 = Silhouette Edge<br>3 = Confidence |
| Version | 7-8 | The most significant byte is used for major revisions, the least significant byte for minor revisions. Version 1.00 is the currentrevision. | Initial version must support Regular JPEG 8-bit grayscale compression |
| Identifier | 0-6 | Zero terminated string "PIDZAM" uniquely identifies this descriptor | |

*FIG. 16*

| Name | Byte Numbers | Description | Comments |
|---|---|---|---|
| Auxiliary Map Data | 16 to 16 + Length | Auxiliary data | Not compressed in current revision |
| Reserved for future extensions | 15 | | |
| Offset to the next Marker | 11-14 | Number of bites from current Marker to the next Marker excluding the APP9 marker itself | Next Marker could be either Depth Map Data Segment Marker, Camera Array Marker or Auxiliary Map Marker |
| Length | 9-10 | Total APP9 field byte count, including the byte count value (2 bytes), but excluding the APP9 marker itself. | A JPEG marker is limited to 65533 bytes. To represent the whole map multiple depth map markers with the same ID will be following each other |
| Number of pixels | 7-8 | Number of pixels in current segment | |
| Identifier | 0-6 | Zero terminated string "PIDZAD" uniquely identifies this descriptor | |

FIG. 17

SYSTEMS AND METHODS FOR ENCODING LIGHT FIELD IMAGE FILES HAVING A DEPTH MAP

CROSS-REFERENCE TO RELATED APPLICATION

The present invention is a continuation of U.S. patent application Ser. No. 14/477,396, filed Sep. 4, 2014, which is a continuation of U.S. patent application Ser. No. 13/631,731, filed Sep. 28, 2012, which claims priority to U.S. Provisional Application No. 61/540,188 entitled "JPEG-DX: A Backwards-compatible, Dynamic Focus Extension to JPEG", to Venkataraman et al. and filed Sep. 28, 2011, the disclosures of which are incorporated herein by reference in their entirety.

FIELD OF THE INVENTION

The present invention relates to encoding of image files and more specifically to the encoding of light field image files.

BACKGROUND

The ISO/IEC 10918-1 standard, more commonly referred to as the JPEG standard after the Joint Photographic Experts Group that developed the standard, establishes a standard process for digital compression and coding of still images. The JPEG standard specifies a codec for compressing an image into a bitstream and for decompressing the bitstream back into an image.

A variety of container file formats including the JPEG File Interchange Format (JFIF) specified in ISO/IEC 10918-5 and the Exchangeable Image File Format (Exif) and can be used to store a JPEG bitstream. JFIF can be considered a minimal file format that enables JPEG bitstreams to be exchanged between a wide variety of platforms and applications. The color space used in JFIF files is YCbCr as defined by CCIR Recommendation 601, involving 256 levels. The Y, Cb, and Cr components of the image file are converted from R, G, and B, but are normalized so as to occupy the full 256 levels of an 8-bit binary encoding. YCbCr is one of the compression formats used by JPEG. Another popular option is to perform compression directly on the R, G and B color planes. Direct RGB color plane compression is also popular when lossless compression is being applied.

A JPEG bitstream stores 16-bit word values in big-endian format. JPEG data in general is stored as a stream of blocks, and each block is identified by a marker value. The first two bytes of every JPEG bitstream are the Start Of Image (SOI) marker values FFh D8h. In a JFIF-compliant file there is a JFIF APP0 (Application) marker, immediately following the SOI, which consists of the marker code values FFh E0h and the characters JFIF in the marker data, as described in the next section. In addition to the JFIF marker segment, there may be one or more optional JFIF extension marker segments, followed by the actual image data.

Overall the JFIF format supports sixteen "Application markers" to store metadata. Using application markers makes it is possible for a decoder to parse a JFIF file and decode only required segments of image data. Application markers are limited to 64K bytes each but it is possible to use the same maker ID multiple times and refer to different memory segments.

An APP0 marker after the SOI marker is used to identify a JFIF file. Additional APP0 marker segments can optionally be used to specify JFIF extensions. When a decoder does not support decoding a specific JFIF application marker, the decoder can skip the segment and continue decoding.

One of the most popular file formats used by digital cameras is Exif. When Exif is employed with JPEG bitstreams, an APP1 Application marker is used to store the Exif data. The Exif tag structure is borrowed from the Tagged Image File Format (TIFF) maintained by Adobe Systems Incorporated of San Jose, Calif.

SUMMARY OF THE INVENTION

Systems and methods in accordance with embodiments of the invention are configured to store images synthesized from light field image data and metadata describing the images in electronic files. One embodiment of the invention includes a processor and memory containing an encoding application and light field image data, where the light field image data comprises a plurality of low resolution images of a scene captured from different viewpoints. In addition, the encoding application configures the processor to: synthesize a higher resolution image of the scene from a reference viewpoint using the low resolution images, where synthesizing the higher resolution image involves creating a depth map that specifies depths from the reference viewpoint for pixels in the higher resolution image; encode the higher resolution image; and create a light field image file including the encoded image and metadata describing the encoded image, where the metadata includes the depth map.

In a further embodiment, the encoding application configures the processor to encode the depth map and the depth map included in the metadata describing the encoded image is the encoded depth map.

In another embodiment, synthesizing the higher resolution image involves identifying pixels in the plurality of low resolution images of the scene that are occluded in the reference viewpoint, and the metadata describing the encoded image in the light field image file includes descriptions of the occluded pixels.

In a still further embodiment, the descriptions of the occluded pixels include colors, locations, and depths of the occluded pixels.

In still another embodiment, synthesizing the higher resolution image involves creating a confidence map for the depth map, where the confidence map indicates the reliability of the depth value for a pixel in the depth map, and the metadata describing the encoded image in the light field image file includes the confidence map.

In a yet further embodiment, the encoding application configures the processor to encode the confidence map.

In yet another embodiment, the encoding application configures the processor to generate an edge map that indicates pixels in the synthesized image that lie on a discontinuity, and the metadata describing the encoded image in the light field image file includes the edge map.

In a further embodiment again, the edge map identifies whether a pixel lies on an intensity discontinuity.

In another embodiment again, the edge map identifies whether a pixel lies on an intensity and depth discontinuity.

In a further additional embodiment, the encoding application configures the processor to encode the edge map.

In another additional embodiment, the encoding application configures the processor to generate a missing pixel map that indicates pixels in the synthesized image that do not correspond to a pixel from the plurality of low resolution images of the scene and that are generated by interpolating pixel values from adjacent pixels in the synthesized image, and the metadata describing the encoded image in the light field image file includes the missing pixels map.

In a still yet further embodiment, the encoding application configures the processor to encode the missing pixels map.

In still yet another embodiment, the metadata also includes a focal plane.

In a still further embodiment again, the light field image file conforms to the JFIF standard.

In still another embodiment again, the high resolution image is encoded in accordance with the JPEG standard.

In a still further additional embodiment, the metadata is located within an Application marker segment within the light field image file.

In still another additional embodiment, the Application marker segment is identified using the APP9 marker.

In a yet further embodiment again, the encoding application configures the processor to encode the depth map in accordance with the JPEG standard using lossless compression and the encoded depth map is stored within the Application marker segment containing the metadata.

In yet another embodiment again, synthesizing the higher resolution images involves identifying pixels from the plurality of low resolution images of the scene that are occluded in the reference viewpoint, and descriptions of the occluded pixels are stored within the Application marker segment containing the metadata.

In a yet further additional embodiment, the descriptions of the occluded pixels include colors, locations, and depths of the occluded pixels.

In yet another additional embodiment, synthesizing the higher resolution image involves creating a confidence map for the depth map, where the confidence map indicates the reliability of the depth value for a pixel in the depth map, and the confidence map is stored within the Application marker segment containing the metadata.

In a further additional embodiment again, the encoding application configures the processor to encode the confidence map in accordance with the JPEG standard using lossless compression.

In another additional embodiment again, the encoding application configures the processor to generate an edge map that indicates pixels in the synthesized image that lie on a discontinuity, and the edge map is stored within the Application marker segment containing the metadata.

In a still yet further embodiment again, the edge map identifies whether a pixel lies on an intensity discontinuity.

In still yet another embodiment again, the edge map identifies whether a pixel lies on an intensity and depth discontinuity.

In a still yet further additional embodiment, the encoding application configures the processor to encode the edge map in accordance with the JPEG standard using lossless compression.

In still yet another additional embodiment, the encoding application configures the processor to generate a missing pixel map that indicates pixels in the synthesized image that do not correspond to a pixel from the plurality of low resolution images of the scene and that are generated by interpolating pixel values from adjacent pixels in the synthesized image, and the missing pixel map is stored within the Application marker segment containing the metadata.

In a yet further additional embodiment again, the encoding application configures the processor to encode the missing pixels map in accordance with the JPEG standard using lossless compression.

An embodiment of the method of the invention includes synthesize a higher resolution image of a scene from a reference viewpoint and a depth map that describes depths of pixels in the synthesized image using an encoding device and light field image data, where the light field image data comprises a plurality of low resolution images of a scene captured from different viewpoints and synthesizing the higher resolution image includes creating a depth map that specifies depths from the reference viewpoint for pixels in the higher resolution image, encoding the higher resolution image using the encoding device, and creating a light field image file including the encoded image and metadata describing the encoded image using the encoding device, where the metadata includes the depth map.

Another embodiment of the invention includes a machine readable medium containing processor instructions, where execution of the instructions by a processor causes the processor to perform a process involving: synthesizing a higher resolution image of a scene from a reference viewpoint using light field image data, where the light field image data comprises a plurality of low resolution images of a scene captured from different viewpoints and synthesizing the higher resolution image includes creating a depth map that specifies depths from the reference viewpoint for pixels in the higher resolution image; encoding the higher resolution image; and creating a light field image file including the encoded image and metadata describing the encoded image, where the metadata includes the depth map.

BRIEF DESCRIPTION OF THE DRAWINGS

FIG. 6 illustrates a "Depth Map, Camera Array and Auxiliary Maps Selection Descriptor" contained within an APP9 Application marker segment of a light field image file that conforms to the JFIF standard in accordance with an embodiment of the invention.

FIG. 7 illustrates a "Depth Map, Camera Array and Auxiliary Maps Compression Descriptor" contained within an APP9 Application marker segment of a light field image file that conforms to the JFIF standard in accordance with an embodiment of the invention.

FIG. 8 illustrates a "Depth Map Attributes" field within a "Depth Map Header" contained within an APP9 Application marker segment of a light field image file that conforms to the JFIF standard in accordance with an embodiment of the invention.

FIG. 9 illustrates a "Depth Map Descriptor" field within a "Depth Map Header" contained within an APP9 Application marker segment of a light field image file that conforms to the JFIF standard in accordance with an embodiment of the invention.

FIG. 10 illustrates a "Depth Map Data Descriptor" contained within an APP9 Application marker segment of a light field image file that conforms to the JFIF standard in accordance with an embodiment of the invention.

FIG. 11 illustrates a "Camera Array Attributes" field within a "Camera Array Header" contained within an APP9 Application marker segment of a light field image file that conforms to the JFIF standard in accordance with an embodiment of the invention.

FIG. 12 illustrates a "Camera Array Descriptor" field within a "Camera Array Header" contained within an APP9 Application marker segment of a light field image file that conforms to the JFIF standard in accordance with an embodiment of the invention.

FIG. 13 illustrates an "Individual Camera Descriptor" contained within an APP9 Application marker segment of a light field image file that conforms to the JFIF standard in accordance with an embodiment of the invention.

FIG. 14 illustrates "Individual Camera Data" within an APP9 Application marker segment of a light field image file that conforms to the JFIF standard in accordance with an embodiment of the invention.

FIG. 15 illustrates an "Individual Pixel Data Structure" within an APP9 Application marker segment of a light field image file that conforms to the JFIF standard in accordance with an embodiment of the invention.

FIG. 16 illustrates an "Auxiliary Map Descriptor" within an "Auxiliary Map Header" contained within an APP9 Application marker segment of a light field image file that conforms to the JFIF standard in accordance with an embodiment of the invention.

FIG. 17 illustrates an "Auxiliary Map Data Descriptor" within an APP9 Application marker segment of a light field image file that conforms to the JFIF standard in accordance with an embodiment of the invention.

DETAILED DESCRIPTION

Figure 1:
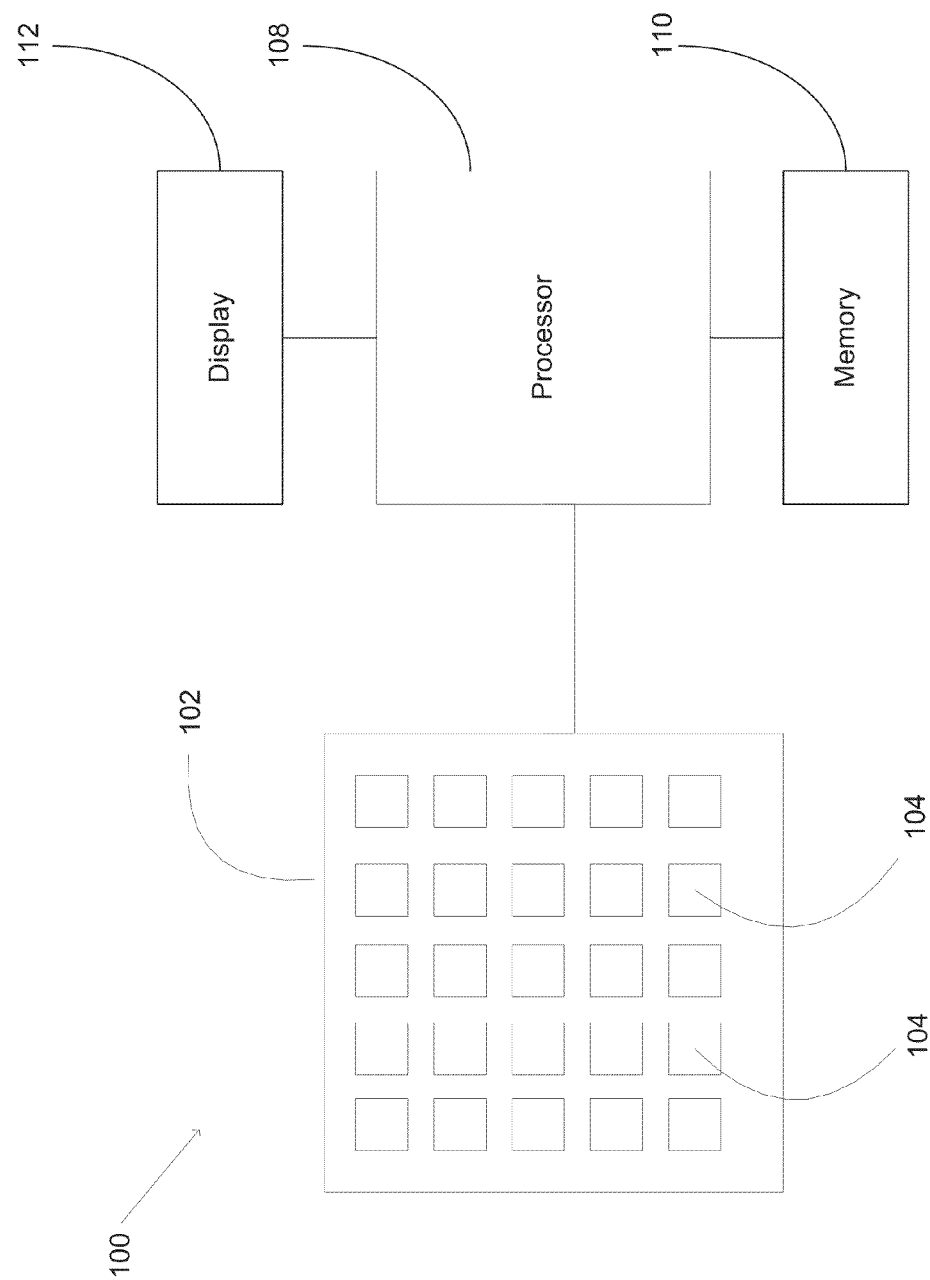
FIG. 1 conceptually illustrates the architecture of an array camera configured to generate light field image files in accordance with embodiments of the invention.

Turning now to the drawings, systems and methods for storing images synthesized from light field image data and metadata describing the images in electronic files and for rendering images using the stored images and metadata in accordance with embodiments of the invention are illustrated. A file containing an image synthesized from light field image data and metadata derived from the light field image data can be referred to as a light field image file. As is discussed further below, the encoded image in a light field image file is typically synthesized using a super resolution process from a number of lower resolution images. The light field image file can also include metadata describing the synthesized image derived from the light field image data that enables post processing of the synthesized image. In many embodiments, a light field image file is created by encoding an image synthesized from light field image data and combining the encoded image with a depth map derived from the light field image data. In several embodiments, the encoded image is synthesized from a reference viewpoint and the metadata includes information concerning pixels in the light field image that are occluded from the reference viewpoint. In a number of embodiments, the metadata can also include additional information including (but not limited to) auxiliary maps such as confidence maps, edge maps, and missing pixel maps that can be utilized during post processing of the encoded image to improve the quality of an image rendered using the light field image data file.

In many embodiments, the light field image file is compatible with the JPEG File Interchange Format (JFIF). The synthesized image is encoded as a JPEG bitstream and stored within the file. The accompanying depth map, occluded pixels and/or any appropriate additional information including (but not limited to) auxiliary maps are then stored within the JFIF file as metadata using an Application marker to identify the metadata. A legacy rendering device can simply display the synthesized image by decoding the JPEG bitstream. Rendering devices in accordance with embodiments of the invention can perform additional post-processing on the decoded JPEG bitstream using the depth map and/or any available auxiliary maps. In many embodiments, the maps included in the metadata can also be compressed using lossless JPEG encoding and decoded using a JPEG decoder. Although much of the discussion that follows references the JFIF and JPEG standards, these standards are simply discussed as examples and it should be appreciated that similar techniques can be utilized to embed metadata derived from light field image data used to synthesize the encoded image within a variety of standard file formats, where the synthesized image and/or maps are encoded using any of a variety of standards based image encoding processes.

By transmitting a light field image file including an encoded image, and metadata describing the encoded image, a rendering device (i.e. a device configured to generate an image rendered using the information within the light field image file) can render new images using the information within the file without the need to perform super resolution processing on the original light field image data. In this way, the amount of data transmitted to the rendering device and the computational complexity of rendering an image is reduced. In several embodiments, rendering devices are configured to perform processes including (but not limited to) refocusing the encoded image based upon a focal plane specified by the user, synthesizing an image from a different viewpoint, and generating a stereo pair of images. The capturing of light field image data and the encoding and decoding of light field image files in accordance with embodiments of the invention are discussed further below.

Capturing Light Field Image Data

A light field, which is often defined as a 4D function characterizing the light from all direction at all points in a scene, can be interpreted as a two-dimensional (2D) collection of 2D images of a scene. Array cameras, such as those described in U.S. patent application Ser. No. 12/935,504 entitled "Capturing and Processing of Images using Monolithic Camera Array with Heterogeneous Imagers" to Venkataraman et al., can be utilized to capture light field images. In a number of embodiments, super resolution processes such as those described in U.S. patent application Ser. No. 12/967,807 entitled "Systems and Methods for Synthesizing High Resolution Images Using Super-Resolution Processes" to Lelescu et al., are utilized to synthesize a higher resolution 2D image or a stereo pair of higher resolution 2D images from the lower resolution images in the light field captured by an array camera. The terms high or higher resolution and low or lower resolution are used here in a relative sense and not to indicate the specific resolutions of the images captured by the array camera. The disclosures of U.S. patent application Ser. No. 12/935,504 and U.S. patent application Ser. No. 12/967,807 are hereby incorporated by reference in their entirety.

Array Cameras

Embodiments relate to using a distributed approach to capturing images using a plurality of imagers of different imaging characteristics. Each imager may be spatially shifted from another imager in such a manner that an imager captures an image that us shifted by a sub-pixel amount with respect to another imager captured by another imager. Each imager may also include separate optics with different filters and operate with different operating parameters (e.g., exposure time). Distinct images generated by the imagers are processed to obtain an enhanced image. Each imager may be associated with an optical element fabricated using wafer level optics (WLO) technology.

A sensor element or pixel refers to an individual light sensing element in a camera array. The sensor element or pixel includes, among others, traditional CIS (CMOS Image Sensor), CCD (charge-coupled device), high dynamic range pixel, multispectral pixel and various alternatives thereof.

An imager refers to a two dimensional array of pixels. The sensor elements of each imager have similar physical properties and receive light through the same optical component. Further, the sensor elements in the each imager may be associated with the same color filter.

A camera array refers to a collection of imagers designed to function as a unitary component. The camera array may be fabricated on a single chip for mounting or installing in various devices.

An array of camera arrays refers to an aggregation of two or more camera arrays. Two or more camera arrays may operate in conjunction to provide extended functionality over a single camera array.

Image characteristics of an imager refer to any characteristics or parameters of the imager associated with capturing of images. The imaging characteristics may include, among others, the size of the imager, the type of pixels included in the imager, the shape of the imager, filters associated with the imager, the exposure time of the imager, aperture size associated with the imager, the configuration of the optical element associated with the imager, gain of the imager, the resolution of the imager, and operational timing of the imager.

Structure of Camera Array

Figure 25:
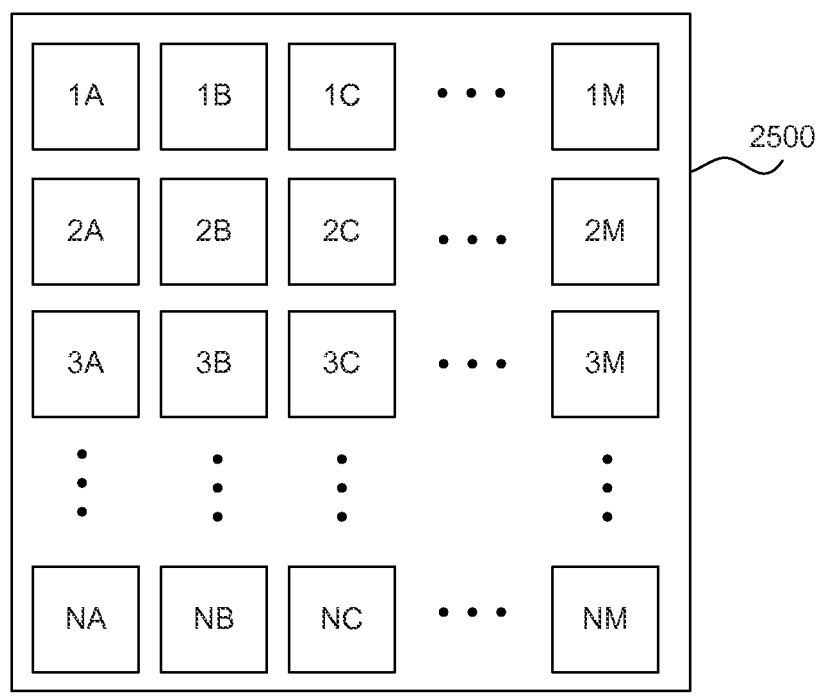
FIG. 25 is a plan view of a camera array with a plurality of imagers, according to one embodiment.

FIG. 25 is a plan view of a camera array 2500 with imagers 1A through NM, according to one embodiment. The camera array 2500 is fabricated on a semiconductor chip to include a plurality of imagers 1A through NM. Each of the imagers 1A through NM may include a plurality of pixels (e.g., 0.32 Mega pixels). In one embodiment, the imagers 1A through NM are arranged into a grid format as illustrated in FIG. 25. In other embodiments, the imagers are arranged in a non-grid format. For example, the imagers may be arranged in a circular pattern, zigzagged pattern or scattered pattern.

The camera array may include two or more types of heterogeneous imagers, each imager including two or more sensor elements or pixels. Each one of the imagers may have different imaging characteristics. Alternatively, there may be two or more different types of imagers where the same type of imagers shares the same imaging characteristics.

In one embodiment, each imager 1A through NM has its own filter and/or optical element (e.g., lens). Specifically, each of the imagers 1A through NM or a group of imagers may be associated with spectral color filters to receive certain wavelengths of light. Example filters include a traditional filter used in the Bayer pattern (R, G, B or their complements C, M, Y), an IR-cut filter, a near-IR filter, a polarizing filter, and a custom filter to suit the needs of hyper-spectral imaging. Some imagers may have no filter to allow reception of both the entire visible spectra and near-IR, which increases the imager's signal-to-noise ratio. The number of distinct filters may be as large as the number of imagers in the camera array. Further, each of the imagers 1A through NM or a group of imagers may receive light through lens having different optical characteristics (e.g., focal lengths) or apertures of different sizes.

In one embodiment, the camera array includes other related circuitry. The other circuitry may include, among others, circuitry to control imaging parameters and sensors to sense physical parameters. The control circuitry may control imaging parameters such as exposure times, gain, and black level offset. The sensor may include dark pixels to estimate dark current at the operating temperature. The dark current may be measured for on-the-fly compensation for any thermal creep that the substrate may suffer from.

In one embodiment, the circuit for controlling imaging parameters may trigger each imager independently or in a synchronized manner. The start of the exposure periods for the various imagers in the camera array (analogous to opening a shutter) may be staggered in an overlapping manner so that the scenes are sampled sequentially while having several imagers being exposed to light at the same time. In a conventional video camera sampling a scene at N exposures per second, the exposure time per sample is limited to 1/N seconds. With a plurality of imagers, there is no such limit to the exposure time per sample because multiple imagers may be operated to capture images in a staggered manner.

Each imager can be operated independently. Entire or most operations associated with each individual imager may be individualized. In one embodiment, a master setting is programmed and deviation (i.e., offset or gain) from such master setting is configured for each imager. The deviations may reflect functions such as high dynamic range, gain settings, integration time settings, digital processing settings or combinations thereof. These deviations can be specified at a low level (e.g., deviation in the gain) or at a higher level (e.g., difference in the ISO number, which is then automatically translated to deltas for gain, integration time, or otherwise as specified by context/master control registers) for the particular camera array. By setting the master values and deviations from the master values, higher levels of control abstraction can be achieved to facilitate simpler programming model for many operations. In one embodiment, the parameters for the imagers are arbitrarily fixed for a target application. In another embodiment, the parameters are configured to allow a high degree of flexibility and programmability.

In one embodiment, the camera array is designed as a drop-in replacement for existing camera image sensors used in cell phones and other mobile devices. For this purpose, the camera array may be designed to be physically compatible with conventional image sensors of approximately the same resolution although the achieved resolution of the camera array may exceed conventional image sensors in many photographic situations. Taking advantage of the increased performance, the camera array of the embodiment may include fewer pixels to obtain equal or better quality images compared to conventional image sensors. Alternatively, the size of the pixels in the imager may be reduced compared to pixels in conventional image sensors while achieving comparable results.

In order to match the raw pixel count of a conventional image sensor without increasing silicon area, the logic overhead for the individual imagers is preferably constrained in the silicon area. In one embodiment, much of the pixel control logic is a single collection of functions common to all or most of the imagers with a smaller set of functions applicable each imager. In this embodiment, the conventional external interface for the imager may be used because the data output does not increase significantly for the imagers.

The number of imagers in the camera array may be determined based on, among other factors, (i) resolution, (ii) parallax, (iii) sensitivity, and (iv) dynamic range. A first factor for the size of imager is the resolution. From a resolution point of view, the preferred number of the imagers ranges from 2×2 to 6×6 because an array size of larger than 6×6 is likely to destroy frequency information that cannot be recreated by the super-resolution process. For example, 8 Megapixel resolution with 2×2 imager will require each imager to have 2 Megapixels. Similarly, 8 Megapixel resolution with a 5×5 array will require each imager to have 0.32 Megapixels.

A second factor that may constrain the number of imagers is the issue of parallax and occlusion. With respect to an object captured in an image, the portion of the background scene that is occluded from the view of the imager is called as "occlusion set." When two imagers capture the object from two different locations, the occlusion set of each imager is different. Hence, there may be scene pixels captured by one imager but not the other. To resolve this issue of occlusion, it is desirable to include a certain minimal set of imagers for a given type of imager.

A third factor that may put a lower bound on the number of imagers is the issue of sensitivity in low light conditions. To improve low light sensitivity, imagers for detecting near-IR spectrum may be needed. The number of imagers in the camera array may need to be increased to accommodate such near-IR imagers.

A fourth factor in determining the size of the imager is dynamic range. To provide dynamic range in the camera array, it is advantageous to provide several imagers of the same filter type (chroma or luma). Each imager of the same filter type may then be operated with different exposures simultaneously. The images captured with different exposures may be processed to generate a high dynamic range image.

Based on these factors, the preferred number of imagers is 2×2 to 6×6. 4×4 and 5×5 configurations are more preferable than 2×2 and 3×3 configurations because the former are likely to provide sufficient number of imagers to resolve occlusion issues, increase sensitivity and increase the dynamic range. At the same time, the computational load required to recover resolution from these array sizes will be modest in comparison to that required in the 6×6 array. Arrays larger than 6×6 may, however, be used to provide additional features such as optical zooming and multispectral imaging.

Another consideration is the number of imagers dedicated to luma sampling. By ensuring that the imagers in the array dedicated to near-IR sampling do not reduce the achieved resolution, the information from the near-IR images is added to the resolution captured by the luma imagers. For this purpose, at least 50% of the imagers may be used for sampling the luma and/or near-IR spectra. In one embodiment with 4×4 imagers, 4 imagers samples luma, 4 imagers samples near-IR, and the remaining 8 imagers samples two chroma (Red and Blue). In another embodiment with 5×5 imagers, 9 imagers samples luma, 8 imagers samples near-IR, and the remaining 8 imagers samples two chroma (Red and Blue). Further, the imagers with these filters may be arranged symmetrically within the camera array to address occlusion due to parallax.

In one embodiment, the imagers in the camera array are spatially separated from each other by a predetermined distance. By increasing the spatial separation, the parallax between the images captured by the imagers may be increased. The increased parallax is advantageous where more accurate distance information is important. Separation between two imagers may also be increased to approximate the separation of a pair of human eyes. By approximating the separation of human eyes, a realistic stereoscopic 3D image may be provided to present the resulting image on an appropriate 3D display device.

In one embodiment, multiple camera arrays are provided at different locations on a device to overcome space constraints. One camera array may be designed to fit within a restricted space while another camera array may be placed in another restricted space of the device. For example, if a total of 20 imagers are required but the available space allows only a camera array of 1×10 imagers to be provided on either side of a device, two camera arrays each including 10 imagers may be placed on available space at both sides of the device. Each camera array may be fabricated on a substrate and be secured to a motherboard or other parts of a device. The images collected from multiple camera arrays may be processed to generate images of desired resolution and performance.

A design for a single imager may be applied to different camera arrays each including other types of imagers. Other variables in the camera array such as spatial distances, color filters and combination with the same or other sensors may be modified to produce a camera array with differing imaging characteristics. In this way, a diverse mix of camera arrays may be produced while maintaining the benefits from economies of scale.

FIGS. 26A through 26E illustrate various configurations of imagers for obtaining a high resolution image through a super-resolution process, according to embodiments of the present invention. In FIGS. 26A through 26E, "R" represents an imager having a red filter, "G" represents a imager having a green filter, "B" represents an imager having a blue filter, "P" represents a polychromatic imager having sensitivity across the entire visible spectra and near-IR spectrum, and "I" represents an imager having a near-IR filter. The polychromatic imager may sample image from all parts of the visible spectra and the near-IR region (i.e., from 650 nm to 800 nm).

Figure 26A:
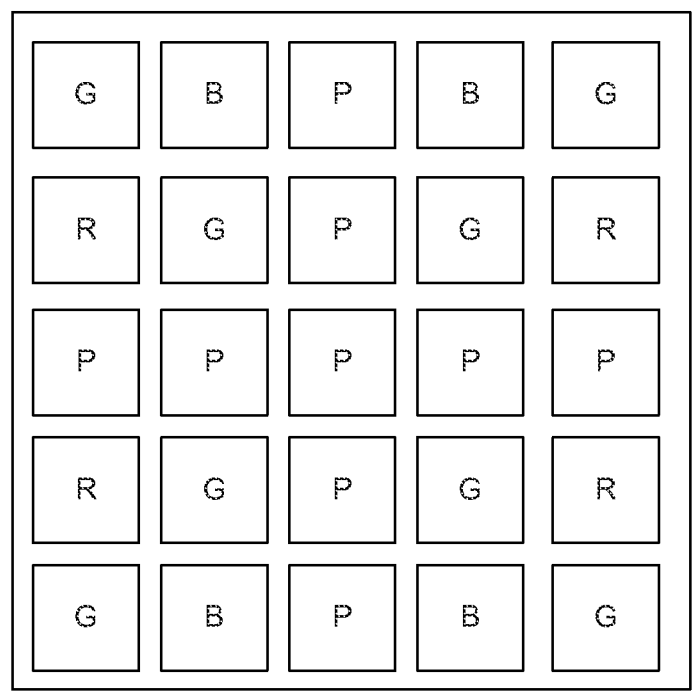
FIGS. 26A through 26E are plan views of camera arrays having different layouts of heterogeneous imagers, according to embodiments of the invention.

In the embodiment of FIG. 26A, the center columns and rows of the imagers include polychromatic imagers. The remaining areas of the camera array are filled with imagers having green filters, blue filters, and red filters. The embodiment of FIG. 26A does not include any imagers for detecting near-IR spectrum alone.

Figure 26B:
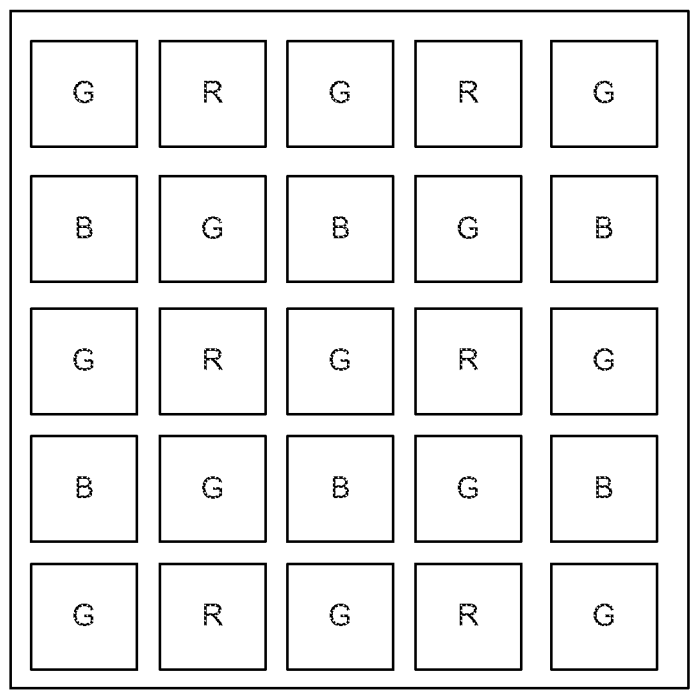

The embodiment of FIG. 26B has a configuration similar to conventional Bayer filter mapping. This embodiment does not include any polychromatic imagers or near-IR imagers. As described above in detail with reference to FIG. 25, the embodiment of FIG. 26B is different from conventional Bayer filter configuration in that each color filter is mapped to each imager instead of being mapped to an individual pixel.

Figure 26C:
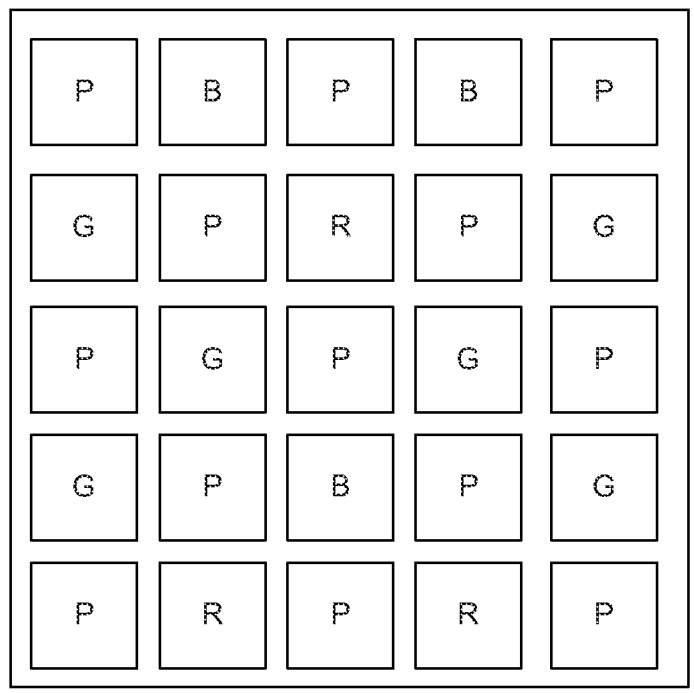
Figure 26D:
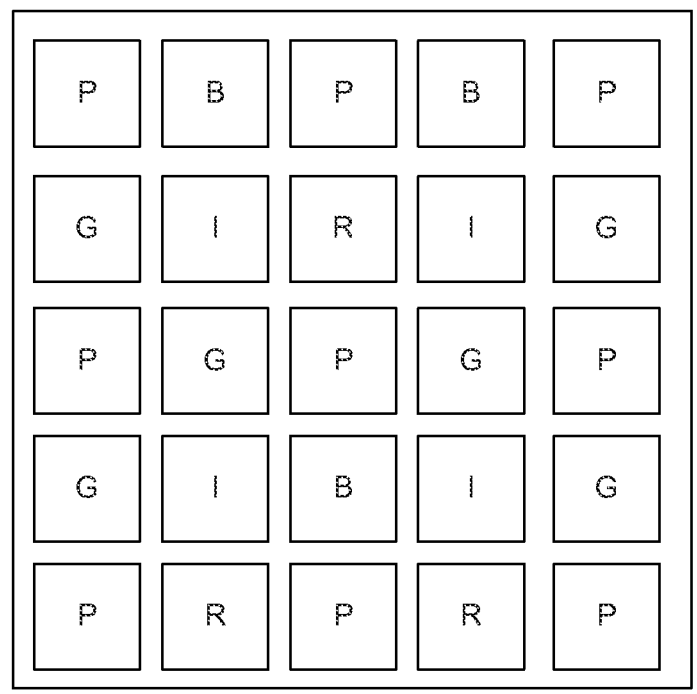
Figure 26E:
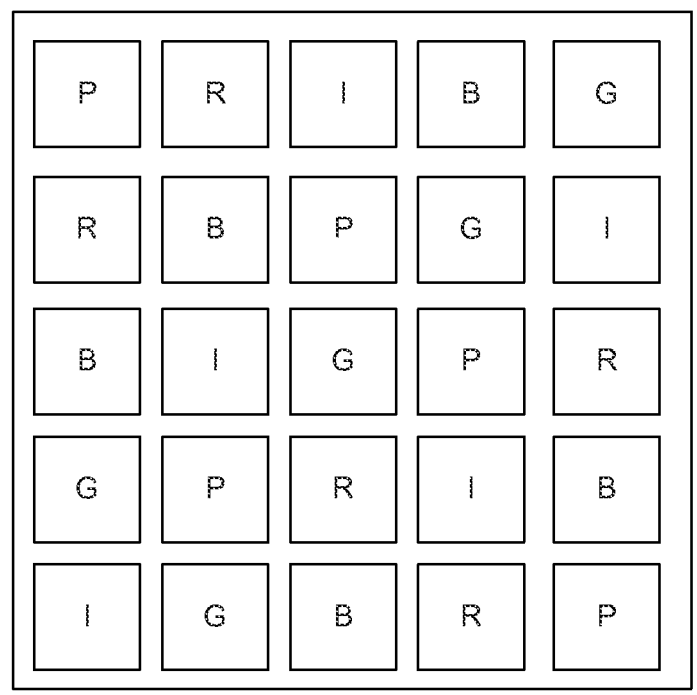

FIG. 26C illustrates an embodiment where the polychromatic imagers form a symmetric checkerboard pattern. FIG. 26D illustrates an embodiment where four near-IR imagers are provided. FIG. 26E illustrates an embodiment with irregular mapping of imagers. The embodiments of FIGS. 26A through 26E are merely illustrative and various other layouts of imagers can also be used.

The use of polychromatic imagers and near-IR imagers is advantageous because these sensors may capture high quality images in low lighting conditions. The images captured by the polychromatic imager or the near-IR imager are used to denoise the images obtained from regular color imagers.

The premise of increasing resolution by aggregating multiple low resolution images is based on the fact that the different low resolution images represent slightly different viewpoints of the same scene. If the LR images are all shifted by integer units of a pixel, then each image contains essentially the same information. Therefore, there is no new information in LR images that can be used to create the HR image. In the imagers according to embodiments, the layout of the imagers may be preset and controlled so that each imager in a row or a column is a fixed sub-pixel distance from its neighboring imagers. The wafer level manufacturing and packaging process allows accurate formation of imagers to attain the sub-pixel precisions required for the super-resolution processing.

An issue of separating the spectral sensing elements into different imagers is parallax caused by the physical separation of the imagers. By ensuring that the imagers are symmetrically placed, at least two imagers can capture the pixels around the edge of a foreground object. In this way, the pixels around the edge of a foreground object may be aggregated to increase resolution as well as avoiding any occlusions. Another issue related to parallax is the sampling of color. The issue of sampling the color may be reduced by using parallax information in the polychromatic imagers to improve the accuracy of the sampling of color from the color filtered imagers.

In one embodiment, near-IR imagers are used to determine relative luminance differences compared to a visible spectra imager. Objects have differing material reflectivity results in differences in the images captured by the visible spectra and the near-IR spectra. At low lighting conditions, the near-IR imager exhibits a higher signal to noise ratios. Therefore, the signals from the near-IR sensor may be used to enhance the luminance image. The transferring of details from the near-IR image to the luminance image may be performed before aggregating spectral images from different imagers through the super-resolution process. In this way, edge information about the scene may be improved to construct edge-preserving images that can be used effectively in the super-resolution process.

Image Fusion of Color Images with Near-IR Images

The spectral response of CMOS imagers is typically very good in the near-IR regions covering 650 nm to 800 nm and reasonably good between 800 nm and 1000 nm. Although near-IR images having no chroma information, information in this spectral region is useful in low lighting conditions because the near-IR images are relatively free of noise. Hence, the near-IR images may be used to denoise color images under the low lighting conditions.

In one embodiment, an image from a near-IR imager is fused with another image from a visible light imager. Before proceeding with the fusion, a registration is performed between the near-IR image and the visible light image to resolve differences in viewpoints. The registration process may be performed in an offline, one-time, processing step. After the registration is performed, the luminance information on the near-IR image is interpolated to grid points that correspond to each grid point on the visible light image.

After the pixel correspondence between the near-IR image and the visible light image is established, denoising and detail transfer process may be performed. The denoising process allows transfer of signal information from the near-IR image to the visible light image to improve the overall SNR of the fusion image. The detail transfer ensures that edges in the near-IR image and the visible light image are preserved and accentuated to improve the overall visibility of objects in the fused image.

In one embodiment, a near-IR flash may serve as a near-IR light source during capturing of an image by the near-IR imagers. Using the near-IR flash is advantageous, among other reasons, because (i) the harsh lighting on objects of interest may be prevented, (ii) ambient color of the object may be preserved, and (iii) red-eye effect may be prevented.

In one embodiment, a visible light filter that allows only near-IR rays to pass through is used to further optimize the optics for near-IR imaging. The visible light filter improves the near-IR optics transfer function because the light filter results in sharper details in the near-IR image. The details may then be transferred to the visible light images using a dual bilateral filter.

Dynamic Range Determination by Differing Exposures at Imagers

An auto-exposure (AE) algorithm is important to obtaining an appropriate exposure for the scene to be captured. The design of the AE algorithm affects the dynamic range of captured images. The AE algorithm determines an exposure value that allows the acquired image to fall in the linear region of the camera array's sensitivity range. The linear region is preferred because a good signal-to-noise ratio is obtained in this region. If the exposure is too low, the picture becomes under-saturated while if the exposure is too high the picture becomes over-saturated. In conventional cameras, an iterative process is taken to reduce the difference between measured picture brightness and previously defined brightness below a threshold. This iterative process requires a large amount of time for convergence, and sometimes results in an unacceptable shutter delay.

In one embodiment, the picture brightness of images captured by a plurality of imagers is independently measured. Specifically, a plurality of imagers are set to capturing images with different exposures to reduce the time for computing the adequate exposure. For example, in a camera array with 5×5 imagers where 8 luma imagers and 9 near-IR imagers are provided, each of the imagers may be set with different exposures. The near-IR imagers are used to capture low-light aspects of the scene and the luma imagers are used to capture the high illumination aspects of the scene. This results in a total of 17 possible exposures. If exposure for each imager is offset from an adjacent imager by a factor of 2, for example, a maximum dynamic range of $2^{17}$ or 102 dB can be captured. This maximum dynamic range is considerably higher than the typical 48 dB attainable in a conventional camera with 8 bit image outputs.

At each time instant, the responses (under-exposed, over-exposed or optimal) from each of the multiple imagers are analyzed based on how many exposures are needed at the subsequent time instant. The ability to query multiple exposures simultaneously in the range of possible exposures accelerates the search compared to the case where only one exposure is tested at once. By reducing the processing time for determining the adequate exposure, shutter delays and shot-to-shot lags may be reduced.

In one embodiment, the HDR image is synthesized from multiple exposures by combining the images after linearizing the imager response for each exposure. The images from the imagers may be registered before combining to account for the difference in the viewpoints of the imagers.

In one embodiment, at least one imager includes HDR pixels to generate HDR images. HDR pixels are specialized pixels that capture high dynamic range scenes. Although HDR pixels show superior performances compared to other pixels, HDR pixels show poor performance at low lighting conditions in comparison with near-IR imagers. To improve performance at low lighting conditions, signals from the near-IR imagers may be used in conjunction with the signal from the HDR imager to attain better quality images across different lighting conditions.

In one embodiment, an HDR image is obtained by processing images captured by multiple imagers by processing. The ability to capture multiple exposures simultaneously using the imager is advantageous because artifacts caused by motion of objects in the scene can be mitigated or eliminated.

Hyperspectral Imaging by Multiple Imagers

In one embodiment, a multi-spectral image is rendered by multiple imagers to facilitate the segmentation or recognition of objects in a scene. Because the spectral reflectance coefficients vary smoothly in most real world objects, the spectral reflectance coefficients may be estimated by capturing the scene in multiple spectral dimensions using imagers with different color filters and analyzing the captured images using Principal Components Analysis (PCA).

In one embodiment, half of the imagers in the camera array are devoted to sampling in the basic spectral dimensions (R, G, and B) and the other half of the imagers are devoted to sampling in a shifted basic spectral dimensions (R', G', and B'). The shifted basic spectral dimensions are shifted from the basic spectral dimensions by a certain wavelength (e.g., 10 nm).

In one embodiment, pixel correspondence and non-linear interpolation is performed to account for the sub-pixel shifted views of the scene. Then the spectral reflectance coefficients of the scene are synthesized using a set of orthogonal spectral basis functions. The basis functions are eigenvectors derived by PCA of a correlation matrix and the correlation matrix is derived from a database storing spectral reflectance coefficients measured by, for example, Munsell color chips (a total of 1257) representing the spectral distribution of a wide range of real world materials to reconstruct the spectrum at each point in the scene.

At first glance, capturing different spectral images of the scene through different imagers in the camera array appears to trade resolution for higher dimensional spectral sampling. However, some of the lost resolution may be recovered. The multiple imagers sample the scene over different spectral dimensions where each sampling grid of each imager is offset by a sub-pixel shift from the others. In one embodiment, no two sampling grid of the imager overlap. That is, the superposition of all the sampling grids from all the imagers forms a dense, possibly non-uniform, montage of points. Scattered data interpolation methods may be used to determine the spectral density at each sample point in this non-uniform montage for each spectral image. In this way, a certain amount of resolution lost in the process of sampling the scene using different spectral filters may be recovered.

As described above, image segmentation and object recognition are facilitated by determining the spectral reflectance coefficients of the object. The situation often arises in security applications wherein a network of cameras is used to track an object as it moves from the operational zone of one camera to another. Each zone may have its own unique lighting conditions (fluorescent, incandescent, D65, etc.) that may cause the object to have a different appearance in each image captured by different cameras. If these cameras capture the images in a hyper-spectral mode, all images may be converted to the same illuminant to enhance object recognition performance.

In one embodiment, camera arrays with multiple imagers are used for providing medical diagnostic images. Full spectral digitized images of diagnostic samples contribute to accurate diagnosis because doctors and medical personnel can place higher confidence in the resulting diagnosis. The imagers in the camera arrays may be provided with color filters to provide full spectral data. Such camera array may be installed on cell phones to capture and transmit diagnostic information to remote locations. Further, the camera arrays including multiple imagers may provide images with a large depth of field to enhance the reliability of image capture of wounds, rashes, and other symptoms.

In one embodiment, a small imager (including, for example, 20-500 pixels) with a narrow spectral bandpass filters is used to produce a signature of the ambient and local light sources in a scene. By using the small imager, the exposure and white balance characteristics may be determined more accurately at a faster speed. The spectral bandpass filters may be ordinary color filters or diffractive elements of a bandpass width adequate to allow the number of camera arrays to cover the visible spectrum of about 400 nm. These imagers may run at a much higher frame rate and obtain data (which may or may not be used for its pictorial content) for processing into information to control the exposure and white balance of other larger imagers in the same camera array. The small imagers may also be interspersed within the camera array.

Optical Zoom Implemented Using Multiple Imagers

In one embodiment, a subset of imagers in the camera array includes telephoto lenses. The subset of imagers may have other imaging characteristics same as imagers with non-telephoto lenses. Images from this subset of imagers are combined and super-resolution processed to form a super-resolution telephoto image. In another embodiment, the camera array includes two or more subsets of imagers equipped with lenses of more than two magnifications to provide differing zoom magnifications.

Embodiments of the camera arrays may achieve its final resolution by aggregating images through super-resolution. Taking an example of providing 5×5 imagers with a 3× optical zoom feature, if 17 imagers are used to sample the luma (G) and 8 imagers are used to sample the chroma (R and B), 17 luma imagers allow a resolution that is four times higher than what is achieved by any single imager in the set of 17 imagers. If the number of the imager is increased from 5×5 to 6×6, an addition of 11 extra imagers becomes available. In comparison with the 8 Megapixel conventional image sensor fitted with a 3× zoom lens, a resolution that is 60% of the conventional image sensor is achieved when 8 of the additional 11 imagers are dedicated to sampling luma (G) and the remaining 3 imagers are dedicated to chroma (R and B) and near-IR sampling at 3× zoom. This considerably reduces the chroma sampling (or near-IR sampling) to luma sampling ratio. The reduced chroma to luma sampling ratio is somewhat offset by using the super-resolved luma image at 3× zoom as a recognition prior on the chroma (and near-IR) image to resample the chroma image at a higher resolution.

With 6×6 imagers, a resolution equivalent to the resolution of conventional image sensor is achieved at 1× zoom. At 3× zoom, a resolution equivalent to about 60% of conventional image sensor outfitted with a 3× zoom lens is obtained by the same imagers. Also, there is a decrease in luma resolution at 3× zoom compared with conventional image sensors with resolution at 3× zoom. The decreased luma resolution, however, is offset by the fact that the optics of conventional image sensor has reduced efficiency at 3× zoom due to crosstalk and optical aberrations.

The zoom operation achieved by multiple imagers has the following advantages. First, the quality of the achieved zoom is considerably higher than what is achieved in the conventional image sensor due to the fact that the lens elements may be tailored for each change in focal length. In conventional image sensors, optical aberrations and field curvature must be corrected across the whole operating range of the lens, which is considerably harder in a zoom lens with moving elements than in a fixed lens element where only aberrations for a fixed focal length need to be corrected. Additionally, the fixed lens in the imagers has a fixed chief ray angle for a given height, which is not the case with conventional image sensor with a moving zoom lens. Second, the imagers allow simulation of zoom lenses without significantly increasing the optical track height. The reduced height allows implementation of thin modules even for camera arrays with zooming capability.

The overhead required to support a certain level of optical zoom in camera arrays according to some embodiments is tabulated in Table 2.

TABLE 2

| No. of Imagers in Camera array | No. of Luma Imagers at different Zoom levels | | | No. of Chroma Imagers at different Zoom Levels | | |
|---|---|---|---|---|---|---|
| | 1× | 2× | 3× | 1× | 2× | 3× |
| 25 | 17 | 0 | 0 | 8 | 0 | 0 |
| 36 | 16 | 0 | 8 | 8 | 0 | 4 |

In one embodiment, the pixels in the images are mapped onto an output image with a size and resolution corresponding to the amount of zoom desired in order to provide a smooth zoom capability from the widest-angle view to the greatest-magnification view. Assuming that the higher magnification lenses have the same center of view as the lower magnification lenses, the image information available is such that a center area of the image has a higher resolution available than the outer area. In the case of three or more distinct magnifications, nested regions of different resolution may be provided with resolution increasing toward the center.

An image with the most telephoto effect has a resolution determined by the super-resolution ability of the imagers equipped with the telephoto lenses. An image with the widest field of view can be formatted in at least one of two following ways. First, the wide field image may be formatted as an image with a uniform resolution where the resolution is determined by the super-resolution capability of the set of imagers having the wider-angle lenses. Second, the wide field image is formatted as a higher resolution image where the resolution of the central part of the image is determined by the super-resolution capability of the set of imagers equipped with telephoto lenses. In the lower resolution regions, information from the reduced number of pixels per image area is interpolated smoothly across the larger number of "digital" pixels. In such an image, the pixel information may be processed and interpolated so that the transition from higher to lower resolution regions occurs smoothly.

In one embodiment, zooming is achieved by inducing a barrel-like distortion into some, or all, of the array lens so that a disproportionate number of the pixels are dedicated to the central part of each image. In this embodiment, every image has to be processed to remove the barrel distortion. To generate a wide angle image, pixels closer to the center are sub-sampled relative to outer pixels are super-sampled. As zooming is performed, the pixels at the periphery of the imagers are progressively discarded and the sampling of the pixels nearer the center of the imager is increased.

In one embodiment, mipmap filters are built to allow images to be rendered at a zoom scale that is between the specific zoom range of the optical elements (e.g., 1× and 3× zoom scales of the camera array). Mipmaps are a precalculated optimized set of images that accompany a baseline image. A set of images associated with the 3× zoom luma image can be created from a baseline scale at 3× down to 1×. Each image in this set is a version of the baseline 3× zoom image but at a reduced level of detail. Rendering an image at a desired zoom level is achieved using the mipmap by (i) taking the image at 1× zoom, and computing the coverage of the scene for the desired zoom level (i.e., what pixels in the baseline image needs to be rendered at the requested scale to produce the output image), (ii) for each pixel in the coverage set, determine if the pixel is in the image covered by the 3× zoom luma image, (iii) if the pixel is available in the 3× zoom luma image, then choose the two closest mipmap images and interpolate (using smoothing filter) the corresponding pixels from the two mipmap images to produce the output image, and (iv) if the pixel is unavailable in the 3× zoom luma image, then choose the pixel from the baseline 1× luma image and scale up to the desired scale to produce the output pixel. By using mipmaps, smooth optical zoom may be simulated at any point between two given discrete levels (i.e., 1× zoom and 3× zoom).

Capturing Video Images

In one embodiment, the camera array generates high frame image sequences. The imagers in the camera array can operate independently to capture images. Compared to conventional image sensors, the camera array may capture images at the frame rate up to N time (where N is the number of imagers). Further, the frame period for each imager may overlap to improve operations under low-light conditions. To increase the resolution, a subset of imagers may operate in a synchronized manner to produce images of higher resolution. In this case, the maximum frame rate is reduced by the number of imagers operating in a synchronized manner. The high-speed video frame rates can enables slow-motion video playback at a normal video rate.

In one example, two luma imagers (green imagers or near-IR imagers), two blue imagers and two green imagers are used to obtain high-definition 1080p images. Using permutations of four luma imagers (two green imagers and two near-IR imagers or three green imagers and one near-IR imager)

together with one blue imager and one red imager, the chroma imagers can be upsampled to achieve 120 frames/sec for 1080p video. For higher frame rate imaging devices, the number of frame rates can be scaled up linearly. For Standard-Definition (480p) operation, a frame rate of 240 frames/sec may be achieved using the same camera array.

Conventional imaging devices with a high-resolution image sensor (e.g., 8 Megapixels) use binning or skipping to capture lower resolution images (e.g., 1080p30, 720p30 and 480p30). In binning, rows and columns in the captured images are interpolated in the charge, voltage or pixel domains in order to achieve the target video resolutions while reducing the noise. In skipping, rows and columns are skipped in order to reduce the power consumption of the sensor. Both of these techniques result in reduced image quality.

In one embodiment, the imagers in the camera arrays are selectively activated to capture a video image. For example, 9 imagers (including one near-IR imager) may be used to obtain 1080p (1920×1080 pixels) images while 6 imagers (including one near-IR imager) may be used to obtain 720p (1280×720 pixels) images or 4 imagers (including one near-IR imager) may be used to obtain 480p (720×480 pixels) images. Because there is an accurate one-to-one pixel correspondence between the imager and the target video images, the resolution achieved is higher than traditional approaches. Further, since only a subset of the imagers is activated to capture the images, significant power savings can also be achieved. For example, 60% reduction in power consumption is achieved in 1080p and 80% of power consumption is achieved in 480p.

Using the near-IR imager to capture video images is advantageous because the information from the near-IR imager may be used to denoise each video image. In this way, the camera arrays of embodiments exhibit excellent low-light sensitivity and can operate in extremely low-light conditions. In one embodiment, super-resolution processing is performed on images from multiple imagers to obtain higher resolution video imagers. The noise-reduction characteristics of the super-resolution process along with fusion of images from the near-IR imager results in a very low-noise images.

In one embodiment, high-dynamic-range (HDR) video capture is enabled by activating more imagers. For example, in a 5×5 camera array operating in 1080p video capture mode, there are only 9 cameras active. A subset of the 16 cameras may be overexposed and underexposed by a stop in sets of two or four to achieve a video output with a very high dynamic range.

Other Applications for Multiple Imagers

In one embodiment, the multiple imagers are used for estimating distance to an object in a scene. Since information regarding the distance to each point in an image is available in the camera array along with the extent in x and y coordinates of an image element, the size of an image element may be determined. Further, the absolute size and shape of physical items may be measured without other reference information. For example, a picture of a foot can be taken and the resulting information may be used to accurately estimate the size of an appropriate shoe.

In one embodiment, reduction in depth of field is simulated in images captured by the camera array using distance information. The camera arrays according to the present invention produce images with greatly increased depth of field. The long depth of field, however, may not be desirable in some applications. In such case, a particular distance or several distances may be selected as the "in best focus" distance(s) for the image and based on the distance (z) information from parallax information, the image can be blurred pixel-by-pixel using, for example, a simple Gaussian blur. In one embodiment, the depth map obtained from the camera array is utilized to enable a tone mapping algorithm to perform the mapping using the depth information to guide the level, thereby emphasizing or exaggerating the 3D effect.

In one embodiment, apertures of different sizes are provided to obtain aperture diversity. The aperture size has a direct relationship with the depth of field. In miniature cameras, however, the aperture is generally made as large as possible to allow as much light to reach the camera array. Different imagers may receive light through apertures of different sizes. For imagers to produce a large depth of field, the aperture may be reduced whereas other imagers may have large apertures to maximize the light received. By fusing the images from sensor images of different aperture sizes, images with large depth of field may be obtained without sacrificing the quality of the image.

In one embodiment, the camera array according to the present invention refocuses based on images captured from offsets in viewpoints. Unlike a conventional plenoptic camera, the images obtained from the camera array of the present invention do not suffer from the extreme loss of resolution. The camera array according to the present invention, however, produces sparse data points for refocusing compared to the plenoptic camera. In order to overcome the sparse data points, interpolation may be performed to refocus data from the spare data points.

In one embodiment, each imager in the camera array has a different centroid. That is, the optics of each imager are designed and arranged so that the fields of view for each imager slightly overlap but for the most part constitute distinct tiles of a larger field of view. The images from each of the tiles are panoramically stitched together to render a single high-resolution image.

In one embodiment, camera arrays may be formed on separate substrates and mounted on the same motherboard with spatial separation. The lens elements on each imager may be arranged so that the corner of the field of view slightly encompasses a line perpendicular to the substrate. Thus, if four imagers are mounted on the motherboard with each imager rotated 90 degrees with respect to another imager, the fields of view will be four slightly overlapping tiles. This allows a single design of WLO lens array and imager chip to be used to capture different tiles of a panoramic image.

In one embodiment, one or more sets of imagers are arranged to capture images that are stitched to produce panoramic images with overlapping fields of view while another imager or sets of imagers have a field of view that encompasses the tiled image generated. This embodiment provides different effective resolution for imagers with different characteristics. For example, it may be desirable to have more luminance resolution than chrominance resolution. Hence, several sets of imagers may detect luminance with their fields of view panoramically stitched. Fewer imagers may be used to detect chrominance with the field of view encompassing the stitched field of view of the luminance imagers.

In one embodiment, the camera array with multiple imagers is mounted on a flexible motherboard such that the motherboard can be manually bent to change the aspect ratio of the image. For example, a set of imagers can be mounted in a horizontal line on a flexible motherboard so that in the quiescent state of the motherboard, the fields of view of all of the imagers are approximately the same. If there are four imagers, an image with double the resolution of each individual imager is obtained so that details in the subject image that are half the dimension of details that can be resolved by an individual imager. If the motherboard is bent so that it forms part of a vertical cylinder, the imagers point outward. With a partial bend, the width of the subject image is doubled while the detail that can be resolved is reduced because each point in the subject image is in the field of view of two rather than four imagers. At the maximum bend, the subject image is four times wider while the detail that can be resolved in the subject is further reduced.

Each two-dimensional (2D) image in a captured light field is from the viewpoint of one of the cameras in the array camera. A high resolution image synthesized using super resolution processing is synthesized from a specific viewpoint that can be referred to as a reference viewpoint. The reference viewpoint can be from the viewpoint of one of the cameras in a camera array. Alternatively, the reference viewpoint can be an arbitrary virtual viewpoint.

Due to the different viewpoint of each of the cameras, parallax results in variations in the position of foreground objects within the images of the scene. Processes for performing parallax detection are discussed in U.S. Provisional Patent Application Ser. No. 61/691,666 entitled "Systems and Methods for Parallax Detection and Correction in Images Captured Using Array Cameras" to Venkataraman et al., the disclosure of which is incorporated by reference herein in its entirety. As is disclosed in U.S. Provisional Patent Application Ser. No. 61/691,666, a depth map from a reference viewpoint can be generated by determining the disparity between the pixels in the images within a light field due to parallax. A depth map indicates the distance of the surfaces of scene objects from a reference viewpoint. In a number of embodiments, the computational complexity of generating depth maps is reduced by generating an initial low resolution depth map and then increasing the resolution of the depth map in regions where additional depth information is desirable such as (but not limited to) regions involving depth transitions and/or regions containing pixels that are occluded in one or more images within the light field.

During super resolution processing, a depth map can be utilized in a variety of ways. U.S. patent application Ser. No. 12/967,807 describes how a depth map can be utilized during super resolution processing to dynamically refocus a synthesized image to blur the synthesized image to make portions of the scene that do not lie on the focal plane to appear out of focus. U.S. patent application Ser. No. 12/967,807 also describes how a depth map can be utilized during super resolution processing to generate a stereo pair of higher resolution images for use in 3D applications. A depth map can also be utilized to synthesize a high resolution image from one or more virtual viewpoints. In this way, a rendering device can simulate motion parallax and a dolly zoom (i.e. virtual viewpoints in front or behind the reference viewpoint). In addition to utilizing a depth map during super-resolution processing, a depth map can be utilized in a variety of post processing processes to achieve effects including (but not limited to) dynamic refocusing, generation of stereo pairs, and generation of virtual viewpoints without performing super-resolution processing. Light field image data captured by array cameras, storage of the light field image data in a light field image file, and the rendering of images using the light field image file in accordance with embodiments of the invention are discussed further below.

Array Camera Architecture

Array cameras in accordance with embodiments of the invention are configured so that the array camera software can control the capture of light field image data and can capture the light field image data into a file that can be used to render one or more images on any of a variety of appropriately configured rendering devices. An array camera including an imager array in accordance with an embodiment of the invention is illustrated in FIG. 1. The array camera 100 includes a sensor 102 having an array of focal planes 104 and which is configured to communicate with a processor 108. The processor is also configured to communicate with one or more different types of memory 110 that can be utilized to store image data and/or contain machine readable instructions utilized to configure the processor to perform processes including (but not limited to) the various processes described below. The array camera 100 also includes a display 112 that can be utilized by the processor 108 to present a user interface to a user and to display an image rendered using the light field image data. Although the processor is illustrated as a single processor, array cameras in accordance with embodiments of the invention can utilize a single processor or multiple processors including (but not limited to) a graphics processing unit (GPU).

In the illustrated embodiment, the processor receives image data generated by the sensor and reconstructs the light field captured by the sensor from the image data. The processor can manipulate the light field in any of a variety of different ways including (but not limited to) determining the depth and visibility of the pixels in the light field and synthesizing higher resolution 2D images from the image data of the light field. Sensors including multiple focal planes are discussed in U.S. patent application Ser. No. 13/106,797 entitled "Architectures for System on Chip Array Cameras", to Pain et al., the disclosure of which is incorporated herein by reference in its entirety.

In the illustrated embodiment, the focal planes are configured in a 5×5 array. Each focal plane 104 on the sensor is capable of capturing an image of the scene. The sensor elements utilized in the focal planes can be individual light sensing elements such as, but not limited to, traditional CIS (CMOS Image Sensor) pixels, CCD (charge-coupled device) pixels, high dynamic range sensor elements, multispectral sensor elements and/or any other structure configured to generate an electrical signal indicative of light incident on the structure. In many embodiments, the sensor elements of each focal plane have similar physical properties and receive light via the same optical channel and color filter (where present). In other embodiments, the sensor elements have different characteristics and, in many instances, the characteristics of the sensor elements are related to the color filter applied to each sensor element.

In many embodiments, an array of images (i.e. a light field) is created using the image data captured by the focal planes in the sensor. As noted above, processors 108 in accordance with many embodiments of the invention are configured using appropriate software to take the image data within the light field and synthesize one or more high resolution images. In several embodiments, the high resolution image is synthesized from a reference viewpoint, typically that of a reference focal plane 104 within the sensor 102. In many embodiments, the processor is able to synthesize an image from a virtual viewpoint, which does not correspond to the viewpoints of any of the focal planes 104 in the sensor 102. Unless all of the objects within a captured scene are a significant distance from the array camera, the images in the light field will include disparity due to the different fields of view of the focal planes used to capture the images. Processes for detecting and correcting for disparity when performing super-resolution processing in accordance with embodiments of the invention are discussed in U.S. Provisional Patent Application Ser. No. 61/691,666 (incorporated by reference above). The detected disparity can be utilized to generate a depth map. The high resolution image and depth map can be encoded and stored in memory 110 in a light field image file. The processor 108 can use the light field image file to render one or more high resolution images. The processor 108 can also coordinate the sharing of the light field image file with other devices (e.g. via a network connection), which can use the light field image file to render one or more high resolution images.

Although a specific array camera architecture is illustrated in FIG. 1, alternative architectures can also be utilized in accordance with embodiments of the invention. Systems and methods for encoding high resolution images and depth maps for storage in electronic files in accordance with embodiments of the invention are discussed below.

Capturing and Storing Light Field Image Data

Processes for capturing and storing light field image data in accordance with many embodiments of the invention involve capturing light field image data, generating a depth map from a reference viewpoint, and using the light field image data and the depth map to synthesize an image from the reference viewpoint. The synthesized image can then be compressed for storage. The depth map and additional data that can be utilized in the post processing can also be encoded as metadata that can be stored in the same container file with the encoded image.

Figure 2:
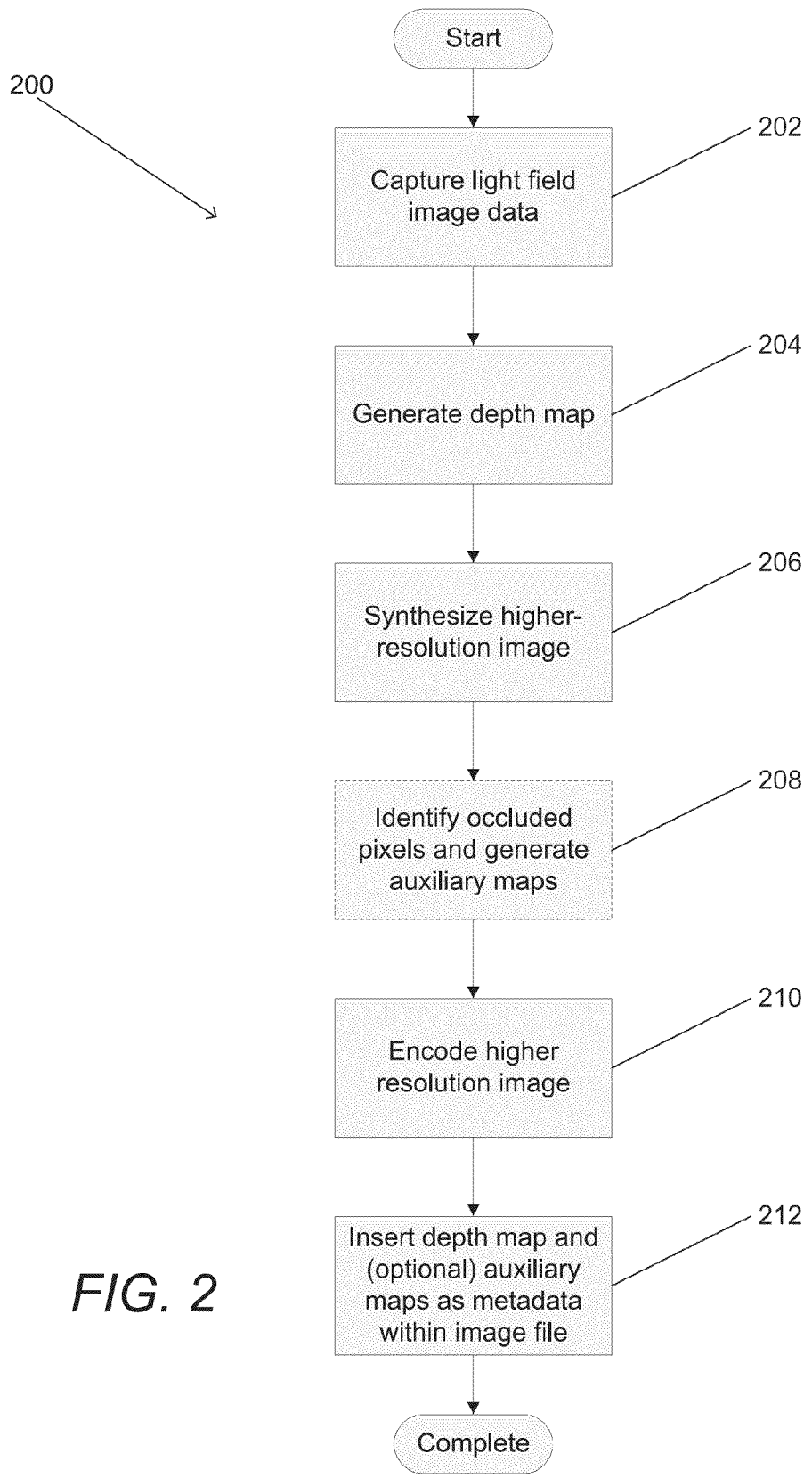
FIG. 2 is a flow chart of a process for creating a light field image file including an image synthesized from light field image data and a depth map for the synthesized image generated using the light field image data in accordance with an embodiment of the invention.

A process for capturing and storing light field image data in accordance with an embodiment of the invention is illustrated in FIG. 2. The process 200 includes capturing (202) light field image data. In several embodiments, the light field image data is captured using an array camera similar to the array cameras described above. In other embodiments, any of a variety of image capture device(s) can be utilized to capture light field image data. The light field image data is used to generate (204) a depth map. A depth map can be generated using any of a variety of techniques including (but not limited to) using any of the processes disclosed in U.S. Provisional Patent Application Ser. No. 61/691,666 or U.S. patent application Ser. No. 13/623,091 entitled "Systems and Methods for Determining Depth from Multiple Views of a Scene that Include Aliasing Using Hypothesized Fusion", to Venkataraman et al. The disclosure of U.S. patent Ser. No. 13/623,091 is incorporated by reference herein in its entirety.

The light field image data and the depth map can be utilized to synthesize (206) an image from a specific viewpoint. In many embodiments, the light field image data includes a number of low resolution images that are used to synthesize a higher resolution image using a super resolution process. In a number of embodiments, a super resolution process such as (but not limited to) any of the super resolution processes disclosed in U.S. patent application Ser. No. 12/967,807 can be utilized to synthesize a higher resolution image from the reference viewpoint.

In order to be able to perform post processing to modify the synthesized image without the original light field image data, metadata can be generated (208) from the light field image data, the synthesized image, and/or the depth map. The metadata data can be included in a light field image file and utilized during post processing of the synthesized image to perform processing including (but not limited to) refocusing the encoded image based upon a focal plane specified by the user, and synthesizing one or more images from a different viewpoint. In a number of embodiments, the auxiliary data includes (but is not limited to) pixels in the light field image data occluded from the reference viewpoint used to synthesize the image from the light field image data, one or more auxiliary maps including (but not limited to) a confidence map, an edge map, and/or a missing pixel map. Auxiliary data that is formatted as maps or layers provide information corresponding to pixel locations within the synthesized image. A confidence map is produced during the generation of a depth map and reflects the reliability of the depth value for a particular pixel. This information may be used to apply different filters in areas of the image and improve image quality of the rendered image. An edge map defines which pixels are edge pixels, which enables application of filters that refine edges (e.g. post sharpening). A missing pixel map represents pixels computed by interpolation of neighboring pixels and enables selection of post-processing filters to improve image quality. As can be readily appreciated, the specific metadata generated depends upon the post processing supported by the image data file. In a number of embodiments, no auxiliary data is included in the image data file.

In order to generate an image data file, the synthesized image is encoded (210). The encoding typically involves compressing the synthesized image and can involve lossless or lossy compression of the synthesized image. In many embodiments, the depth map and any auxiliary data are written (212) to a file with the encoded image as metadata to generate a light field image data file. In a number of embodiments, the depth map and/or the auxiliary maps are encoded. In many embodiments, the encoding involves lossless compression.

Although specific processes for encoding light field image data for storage in a light field image file are discussed above, any of a variety of techniques can be utilized to process light field image data and store the results in an image file including but not limited to processes that encode low resolution images captured by an array camera and calibration information concerning the array camera that can be utilized in super resolution processing. Storage of light field image data in JFIF files in accordance with embodiments of the invention is discussed further below.

Image Data Formats

In several embodiments, the encoding of a synthesized image and the container file format utilized to create the light field image file are based upon standards including but not limited to the JPEG standard (ISO/IEC 10918-1) for encoding a still image as a bitstream and the JFIF standard (ISO/IEC 10918-5). By utilizing these standards, the synthesized image can be rendered by any rendering device configured to support rendering of JPEG images contained within JFIF files. In many embodiments, additional data concerning the synthesized image such as (but not limited to) a depth map and auxiliary data that can be utilized in the post processing of the synthesized image can be stored as metadata associated with an Application marker within the JFIF file. Conventional rendering devices can simply skip Application markers containing this metadata. Rendering device in accordance with many embodiments of the invention can decode the metadata and utilize the metadata in any of a variety of post processing processes.

Figure 3:
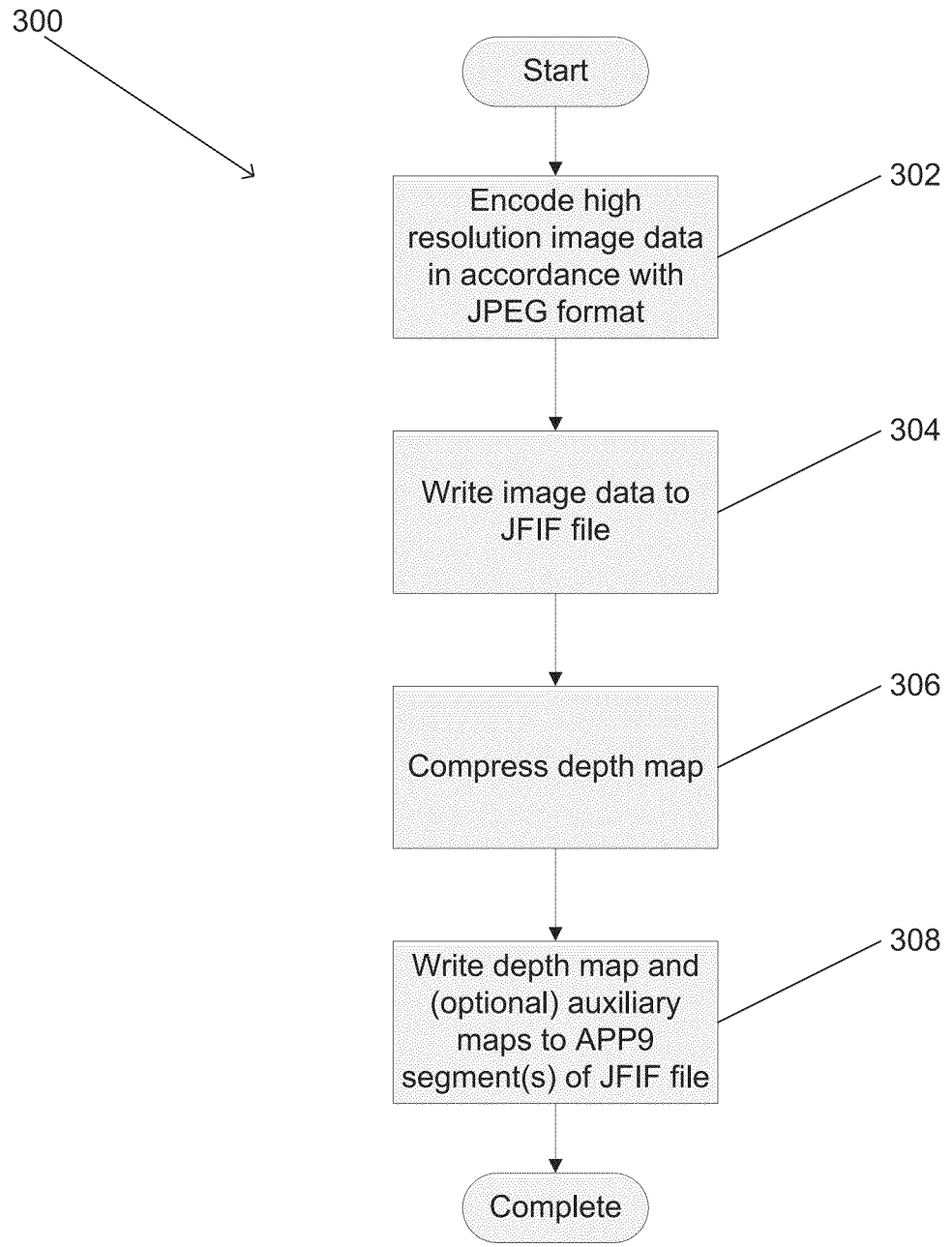
FIG. 3 is a process for creating a light field image file that conforms to the JFIF standard and that includes an image encoded in accordance with the JPEG standard in accordance with an embodiment of the invention.

A process for encoding an image synthesized using light field image data in accordance with the JPEG specification and for including the encoded image and metadata that can be utilized in the post processing of the image in a JFIF file in accordance with an embodiment of the invention is illustrated in FIG. 3. The process 300 includes encoding (302) an image synthesized from light field image data in accordance with the JPEG standard. The image data is written (304) to a JFIF file. A depth map for the synthesized image is compressed (306) and the compressed depth map and any additional auxiliary data are written (308) as metadata to an Application marker segment of the JFIF file containing the encoded image. Where the auxiliary data includes maps, the maps can also be compressed by encoding the maps in accordance with the JPEG standard. At which point, the JFIF file contains an encoded image and metadata that can be utilized to perform post processing on the encoded image in ways that utilize the additional information captured in the light field image data utilized to synthesize the high resolution image (without the need to perform super resolution processing on the underlying light field image data).

Although specific processes are discussed above for storing light field image data in JFIF files, any of a variety of processes can be utilized to encode synthesized images and additional metadata derived from the light field image data used to synthesize the encoded images in a JFIF file as appropriate to the requirements of a specific application in accordance with embodiments of the invention. The encoding of synthesized images and metadata for insertion into JFIF files in accordance with embodiments of the invention are discussed further below. Although much of the discussion that follows relates to JFIF files, synthesized images and metadata can be encoded for inclusion in a light field image file using any of a variety of proprietary or standards based encoding techniques and/or utilizing any of a variety of proprietary or standards based file formats.

Encoding Images Synthesized from Light Field Image Data

An image synthesized from light field image data using super resolution processing can be encoded in accordance with the JPEG standard for inclusion in a light field image file in accordance with embodiments of the invention. The JPEG standard is a lossy compression standard. However, the information losses typically do not impact edges of objects. Therefore, the loss of information during the encoding of the image typically does not impact the accuracy of maps generated based upon the synthesized image (as opposed to the encoded synthesized image). The pixels within images contained within files that comply with the JFIF standard are typically encoded as YCbCr values. Many array cameras synthesize images, where each pixel is expressed in terms of a Red, Green and Blue intensity value. In several embodiments, the process of encoding the synthesized image involves mapping the pixels of the image from the RGB domain to the YCbCr domain prior to encoding. In other embodiments, mechanisms are used within the file to encode the image in the RGB domain. Typically, encoding in the YCbCr domain provides better compression ratios and encoding in the RGB domain provides higher decoded image quality.

Storing Additional Metadata Derived from Light Field Image Data

The JFIF standard does not specify a format for storing depth maps or auxiliary data generated by an array camera. The JFIF standard does, however, provide sixteen Application markers that can be utilized to store metadata concerning the encoded image contained within the file. In a number of embodiments, one or more of the Application markers of a JFIF file is utilized to store an encoded depth map and/or one or more auxiliary maps that can be utilized in the post processing of the encoded image contained within the file.

Figures 4, 5:
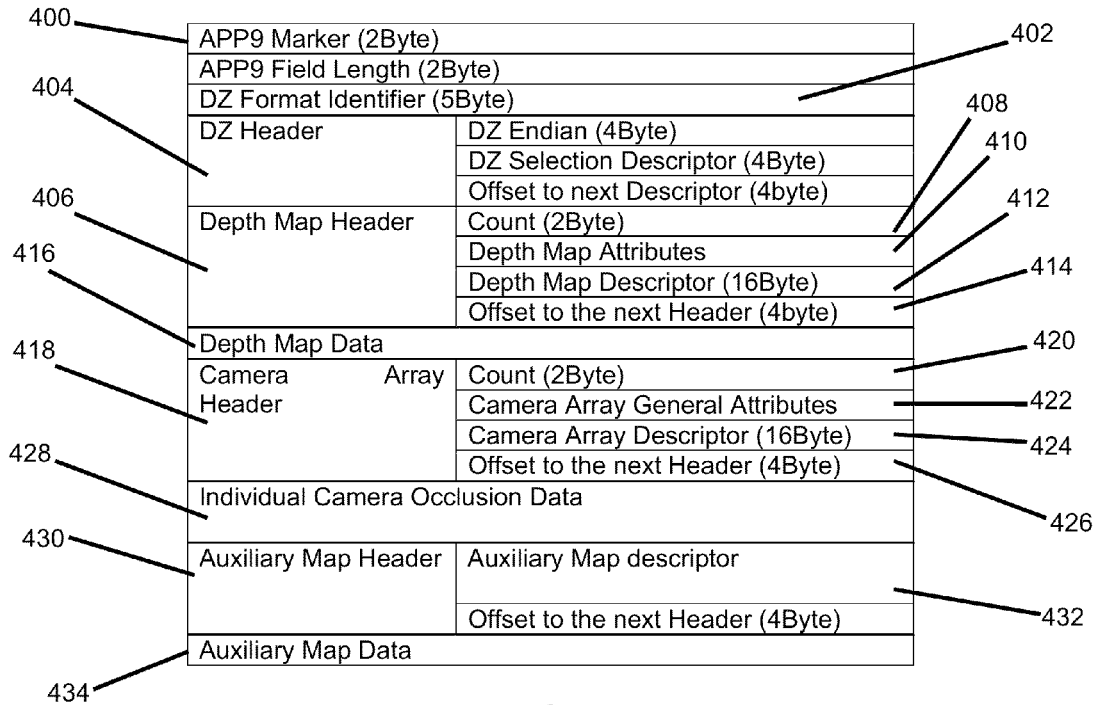
FIG. 4 illustrates an APP9 Application marker segment of a light field image file that conforms to the JFIF standard in accordance with an embodiment of the invention.
FIG. 5 illustrates a "DZ Selection Descriptor" contained within an APP9 Application marker segment of a light field image file that conforms to the JFIF standard in accordance with an embodiment of the invention.

A JFIF Application marker segment that can be utilized to store a depth map, individual camera occlusion data and auxiliary map data in accordance with an embodiment of the invention is illustrated in FIG. 4. The APPS Application marker segment 400 uses a format identifier 402 that uniquely identifies that the Application marker segment contains metadata describing an image synthesized using light field image data. In a number of embodiments, the identifier is referred to as the "DZ Format Identifier" 402 and is expressed as the zero terminated string "PIDZ0".

The Application marker segment includes a header 404 indicated as "DZ Header" that provides a description of the metadata contained within the Application marker segment.

In the illustrated embodiment, the "DZ Header" 404 includes a DZ Endian field that indicates whether the data in the "DZ Header" is big endian or little endian. The "DZ Header" 404 also includes a "DZ Selection Descriptor".

An embodiment of a "DZ Selection Descriptor" is illustrated in FIG. 5, which includes four bytes. The first two bytes (i.e. bytes 0 and 1) contain information concerning the metadata describing the encoded image that are present (see FIG. 6) and the manner in which the different pieces of metadata are compressed (see FIG. 7). In the illustrated embodiment, the types of metadata that are supported are a depth map, occluded pixel data, virtual view point data, a missing pixel map, a regular edge map, a silhouette edge map, and/or a confidence map. In other embodiments, any of a variety of metadata describing an encoded image obtained from the light field image data used to synthesize the image can be included in the metadata contained within a JFIF file in accordance with an embodiment of the invention. In many instances, the metadata describing the encoded image can include maps that can be considered to be monochrome images that can be encoded using JPEG encoding. In a number of embodiments, the maps can be compressed using lossless JPEG LS encoding. In several embodiments, the maps can be compressed using lossy JPEG encoding. Utilizing JPEG encoding to compress the maps reduces the size of the maps and enables rendering devices to leverage a JPEG decoder to both decode the image contained within the JFIF file and the maps describing the encoded image. The third byte (i.e. byte 2) of the "DZ Selection Descriptor" indicates the number of sets of metadata describing the encoded image that are contained within the Application marker segment and the fourth byte is reserved. Although specific implementations of the header 404 describing the metadata contained within the Application marker segment are illustrated in FIGS. 4-7, any of a variety of implementations can be utilized to identify the maps describing the synthesized image that are present within the metadata contained within an light field image file as appropriate to the requirements of the application in accordance with embodiments of the invention.

Depth Map

Referring back to FIG. 4, the Application marker segment also includes a "Depth Map Header" 406 that describes depth map 416 included within the Application marker segment. The "Depth Map Header" 406 includes an indication 408 of the size of "Depth Map Attributes" 410 included within the "Depth Map Header", the "Depth Map Attributes" 410, and a "Depth Map Descriptor" 412. As noted above, the depth map 416 can be considered to be a monochrome image and lossless or lossy JPEG encoding can be utilized to compress the "Depth Map Data" included in a JFIF file.

A "Depth Map Attributes" table in accordance with an embodiment of the invention is illustrated in FIG. 8 and includes information concerning the manner in which the depth map should be used to render the encoded image. In the illustrated embodiment, the information contained within the "Depth Map Attributes" table includes the focal plane and the F# of the synthetic aperture to utilize when rendering the encoded image. Although specific pieces of information related to the manner in which the depth map can be utilized to render the encoded image are illustrated in FIG. 8, any of a variety of pieces of information appropriate to the requirements of a specific application can be utilized in accordance with embodiments of the invention.

A "Depth Map Descriptor" in accordance with an embodiment of the invention is illustrated in FIG. 9 and includes metadata describing the depth map. In the illustrated embodiment, the "Depth Map Descriptor" includes a zero terminated identifier string "PIDZDH0" and version information. In other embodiments, any of a variety of pieces of information appropriate to the specific requirements of particular applications can be utilized in accordance with embodiments of the invention.

A JFIF Application marker segment is restricted to 65,533 bytes. However, an Application marker can be utilized multiple times within a JFIF file. Therefore, depth maps in accordance with many embodiments of the invention can span multiple APPS Application marker segments. The manner in which depth map data is stored within an Application marker segment in a JFIF file in accordance with an embodiment of the invention is illustrated in FIG. 10. In the illustrated embodiment, the depth map data is contained within a descriptor that is uniquely identified using the "PIDZDD0" zero terminated string. The descriptor also includes the length of the descriptor and depth map data.

Although specific implementations of a depth map and header describing a depth map within an Application marker segment of a JFIF file are illustrated in FIGS. 4, 8, 9, and 10, any of a variety of implementations can be utilized to include a depth map describing an encoded image within a JFIF file as appropriate to the requirements of the application in accordance with embodiments of the invention.

Occlusion Data

Referring back to FIG. 4, the Application marker segment also includes a "Camera Array Header" 418 that describes occlusion data 428 for individual cameras within an array camera that captured the light field image data utilized to synthesize the image contained within the light field image file. The occlusion data can be useful in a variety of post processing processes including (but not limited) to process that involve modifying the viewpoint of the encoded image. The "Camera Array Header" 418 includes an indication 420 of the size of a "Camera Array General Attributes" table 422 included within the "Camera Array Header", the "Camera Array General Attributes" table 422, and a "Camera Array Descriptor" 424.

A "Camera Array General Attributes" table in accordance with an embodiment of the invention is illustrated in FIG. 11 and includes information describing the number of cameras and dimensions of a camera array utilized to capture the light field image data utilized to synthesize the image encoded within the JFIF file. In addition, the "Camera Array General Attributes" table can indicate a reference camera position within the array and/or a virtual view position within the array. The "Camera Array General Attributes" table also provides information concerning the number of cameras within the array for which occlusion data is provided within the JFIF file.

A "Camera Array Descriptor" in accordance with an embodiment of the invention is illustrated in FIG. 12 and includes metadata describing the individual camera occlusion data contained within the JFIF file. In the illustrated embodiment, the "Camera Array Descriptor" includes a zero terminated identifier string "PIDZAH0" and version information. In other embodiments, any of a variety of pieces of information appropriate to the specific requirements of particular applications can be utilized in accordance with embodiments of the invention.

In many embodiments, occlusion data is provided on a camera by camera basis. In several embodiments, the occlusion data is included within a JFIF file using an individual camera descriptor and an associated set of occlusion data. An individual camera descriptor that identifies a camera and identifies the number of occluded pixels related to the identified camera described within the JFIF file in accordance with an embodiment of the invention is illustrated in FIG. 13. In the illustrated embodiment, the descriptor is identified using the "PIDZCD0" zero terminated string. The descriptor also includes a camera number that can be utilized to identify a camera within an array camera that captured light field image data utilized to synthesize the encoded image contained within the JFIF file. In addition, the descriptor includes the number of occluded pixels described in the JFIF file and the length (in bytes) of the data describing the occluded pixels. The manner in which the occluded pixel data can be described in accordance with embodiments of the invention is illustrated in FIG. 14. The same descriptor "PDIZCD0" is used to identify the occluded pixel data and the descriptor also includes the number of pixels of occluded data contained within the segment, the length of the data in bytes and an offset to the next marker in addition to the occluded pixel data. Due to the restriction on Application marker segments not exceeding 65,533 bytes in data, the additional information enables a rendering device to reconstruct the occluded pixel data across multiple APPS application marker segments within a JFIF file in accordance with embodiments of the invention.

A table describing an occluded pixel that can be inserted within a JFIF file in accordance with an embodiment of the invention is illustrated in FIG. 15. The table includes the depth of the occluded pixel, the pixel color of the occluded pixel and the pixel coordinates. In the illustrated embodiment, the pixel color is illustrated as being in the RGB domain. In other embodiments, the pixel color can be expressed in any domain including the YCbCr domain.

Although specific implementations for storing information describing occluded pixel depth within an Application marker segment of a JFIF file are illustrated in FIGS. 4, 13, 14, and 15, any of a variety of implementations can be utilized to include occluded pixel information within a JFIF file as appropriate to the requirements of the application in accordance with embodiments of the invention.

Auxiliary Maps

Referring back to FIG. 4, any of a variety of auxiliary maps can be included in an Application marker segment within a JFIF file in accordance with an embodiment of the invention. The total number of auxiliary maps and the types of auxiliary maps can be indicated in the Application marker segment. Each auxiliary map can be expressed using an "Auxiliary Map Descriptor" 432 and "Auxiliary Map Data" 434. In the illustrated embodiment, the "Auxiliary Map Descriptor" 432 is included in an "Auxiliary Map Header" 430 within the Application marker segment in the JFIF file.

An "Auxiliary Map Descriptor" that describes an auxiliary map contained within a light field image file in accordance with an embodiment of the invention is illustrated in FIG. 16. The "Auxiliary Map Descriptor" includes an identifier, which is the "PIDZAM0" zero terminated string and information specifying the type of auxiliary map and number of bits per pixel in the map. As noted above, any of a variety of auxiliary maps derived from light field image data used to synthesize an encoded image can be included within a JFIF file in accordance with embodiments of the invention. In the illustrated embodiment, confidence maps, silhouette edge maps, regular edge maps, and missing pixel maps are supported.

"Auxiliary Map Data" stored in a JFIF file in accordance with an embodiment of the invention is conceptually illustrated in FIG. 17. The "Auxiliary Map Data" uses the same "PDIZAD0" zero terminated string identifier and includes the number of pixels of the auxiliary map contained within the segment, the length of the data in bytes and an offset to the next marker in addition to pixels of the auxiliary map. Due to the restriction on Application marker segments not exceeding 65,533 bytes in data, the additional information enables a rendering device to reconstruct the auxiliary map describing the encoded image across multiple APPS application marker segments within a JFIF file.

Although specific implementations for storing auxiliary maps within an Application marker segment of a JFIF file are illustrated in FIGS. 4, 16, and 17, any of a variety of implementations can be utilized to include auxiliary map information within a JFIF file as appropriate to the requirements of the application in accordance with embodiments of the invention. Various examples of auxiliary maps that can be utilized to provide additional information concerning an encoded image based upon the light field image data utilized to synthesize the encoded image in accordance with embodiments of the invention are discussed below.

Confidence Maps

A confidence map can be utilized to provide information concerning the relative reliability of the information at a specific pixel location. In several embodiments, a confidence map is represented as a complimentary one bit per pixel map representing pixels within the encoded image that were visible in only a subset of the images used to synthesize the encoded image. In other embodiments, a confidence map can utilize additional bits of information to express confidence using any of a variety of metrics including (but not limited to) a confidence measure determined during super resolution processing, or the number of images in which the pixel is visible.

Edge Maps

A variety of edge maps can be provided included (but not limited to) a regular edge map and a silhouette map. A regular edge map is a map that identifies pixels that are on an edge in the image, where the edge is an intensity discontinuity. A silhouette edge maps is a map that identifies pixels that are on an edge, where the edge involves an intensity discontinuity and a depth discontinuity. In several embodiments, each can be expressed as a separate one bit map or the two maps can be combined as a map including two pixels per map. The bits simply signal the presence of a particular type of edge at a specific location to post processing processes that apply filters including (but not limited to) various edge preserving and/or edge sharpening filters.

Missing Pixel Maps

A missing pixel map indicates pixel locations in a synthesized image that do not include a pixel from the light field image data, but instead include an interpolated pixel value. In several embodiments, a missing pixel map can be represented using a complimentary one bit per pixel map. The missing pixel map enables selection of post-processing filters to improve image quality. In many embodiments, a simple interpolation algorithm can be used during the synthesis of a higher resolution from light field image data and the missing pixels map can be utilized to apply a more computationally expensive interpolation process as a post processing process. In other embodiments, missing pixel maps can be utilized in any of a variety of different post processing process as appropriate to the requirements of a specific application in accordance with embodiments of the invention.

Rendering Images Using Light Field Imaging Files

Figure 18:
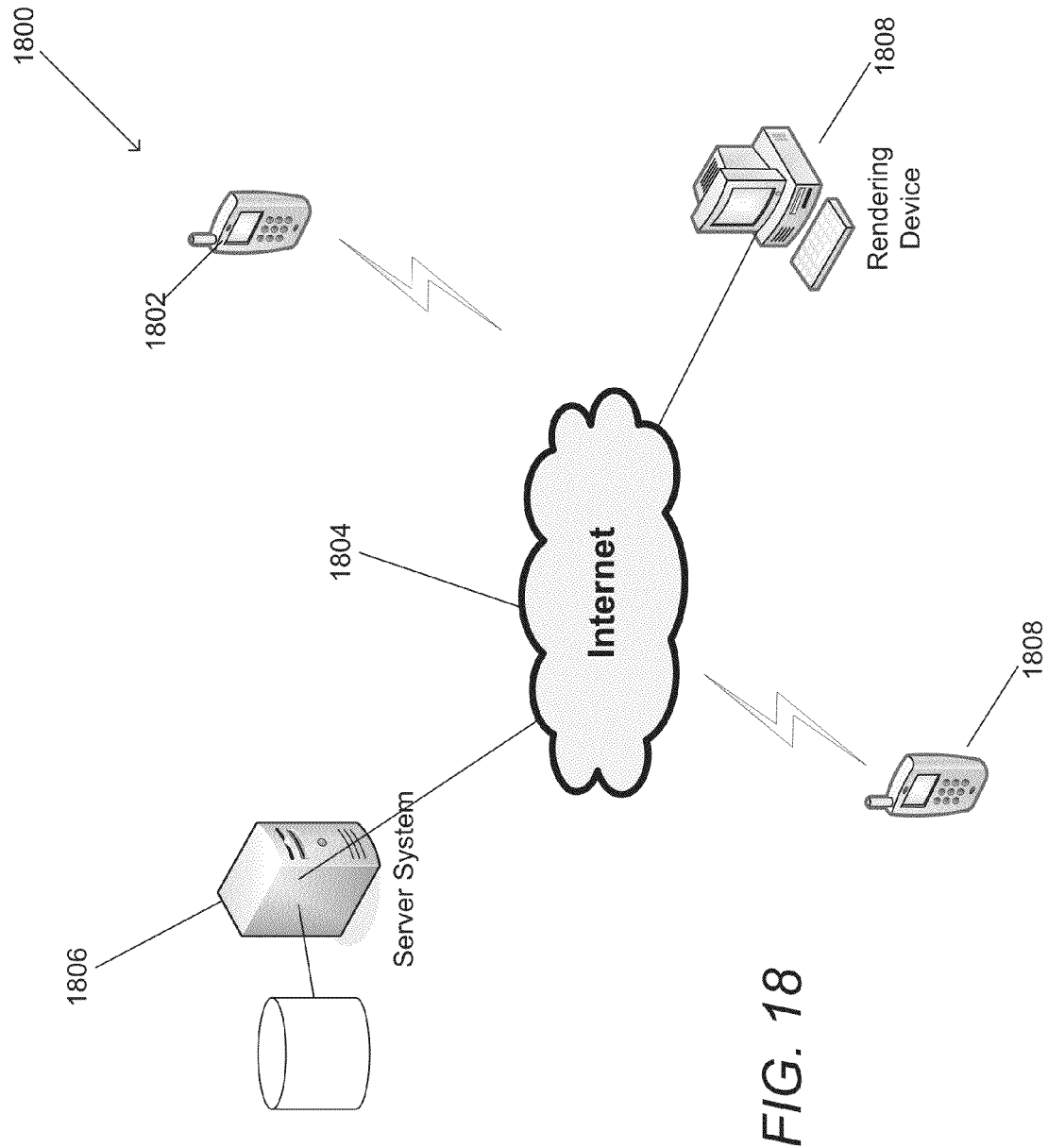
FIG. 18 illustrates a network including at least one encoding device configured to capture light field image data and encode light field image files and to share the light field image file with rendering devices via a network in accordance with an embodiment of the invention.

When light field image data is encoded in a light field image file, the light field image file can be shared with a variety of rendering devices including but not limited to cameras, mobile devices, personal computers, tablet computers, network connected televisions, network connected game consoles, network connected media players, and any other device that is connected to the Internet and can be configured to display images. A system for sharing light field image files in accordance with an embodiment of the invention is illustrated in FIG. 18. The system 1800 includes a mobile device 1802 including an array camera configured to capture light field image data and encode the light field image data in a light field image file. The mobile device 1802 also includes a network interface that enables the transfer of a light field image file to other rendering devices via the Internet 1804. In several embodiments, the light field image file is transferred with the assistance of a server system 1806 that can either store the light field image file for access by other devices or relay the light field image file to other rendering devices. In many embodiments, the server system 1806 provides a user interface that enables users to modify the rendering of the image provided to the device. In several embodiments, the server system 1806 provides the light field image file to a device for rendering. In the illustrated embodiment, a variety of network connected rendering devices 1808 are illustrated including a mobile phone and a personal computer. In other embodiments, any of a variety of network connected and/or disconnected devices can render images using a light field image file in accordance with embodiments of the invention. Rendering devices and processes for rendering images in accordance with embodiments of the invention are discussed further below.

Rendering Devices

A rendering device in accordance with embodiments of the invention typically includes a processor and a rendering application that enables the rendering of an image based upon a light field image data file. The simplest rendering is for the rendering device to decode the encoded image contained within the light field image data file. More complex renderings involve applying post processing to the encoded image using the metadata contained within the light field image file to perform manipulations including (but not limited to) modifying the viewpoint of the image and/or modifying the focal plane of the image.

Figure 19:
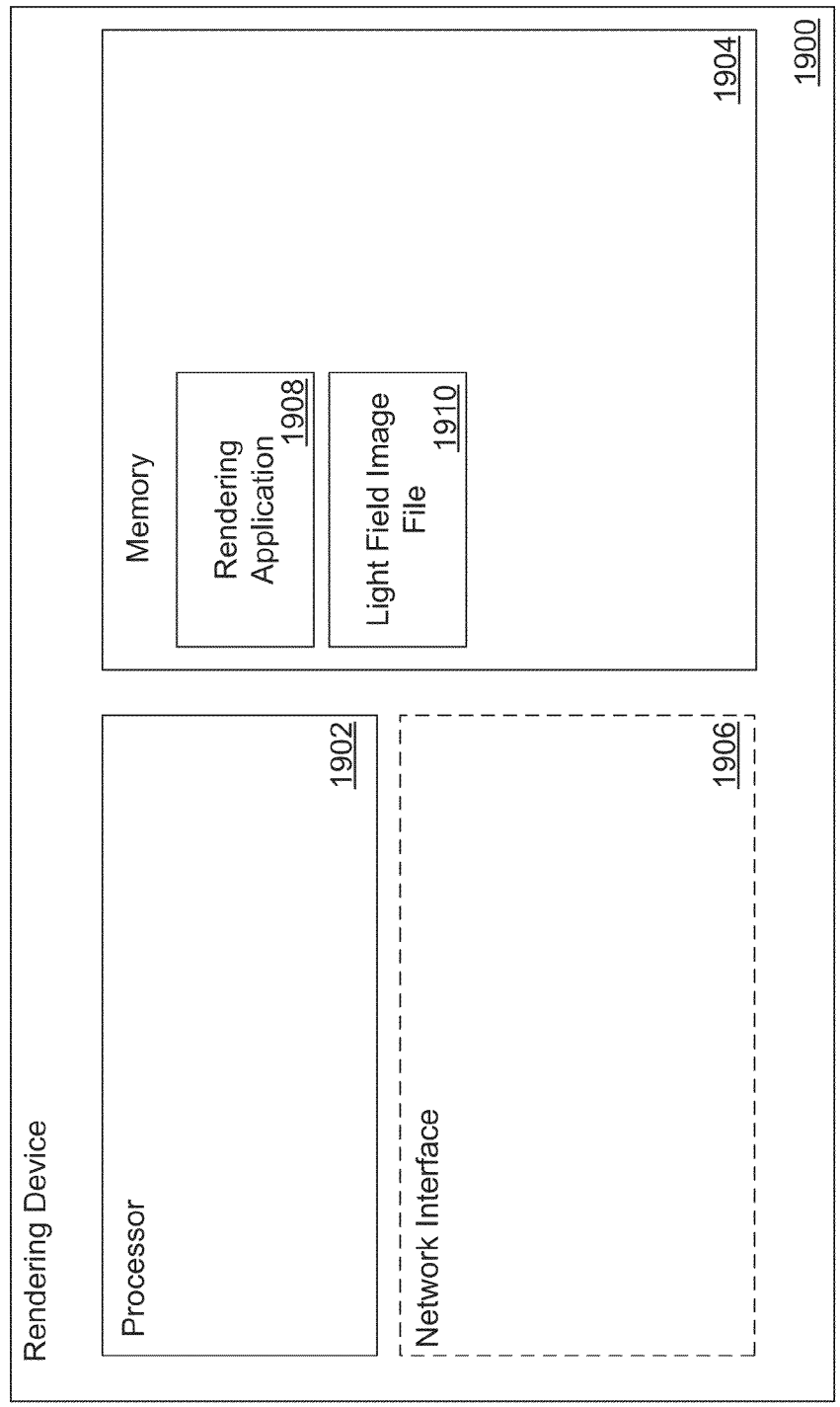
FIG. 19 conceptually illustrates a rendering device configured by a rendering application to render an image using a light field image file.

A rendering device in accordance with an embodiment of the invention is illustrated in FIG. 19. The rendering device 1900 includes a processor 1902, memory 1904, and an optional network interface 1906. The memory contains a rendering application 1908 that is used to configure the microprocessor to render images for display using a light field image file 1910. In the illustrated embodiment, the light field image file is shown stored in memory. In other embodiments, the light field image file can be stored in an external storage device. Although a specific rendering device is illustrated in FIG. 19, any of a variety of rendering devices can be utilized in accordance with embodiments of the invention including (but not limited to) the types of devices that are customarily used to display images using image files. Processes for rendering of images using light field image files in accordance with embodiments of the invention are discussed further below.

Processes for Rendering Images Using Light Field Image Files

Figure 20:
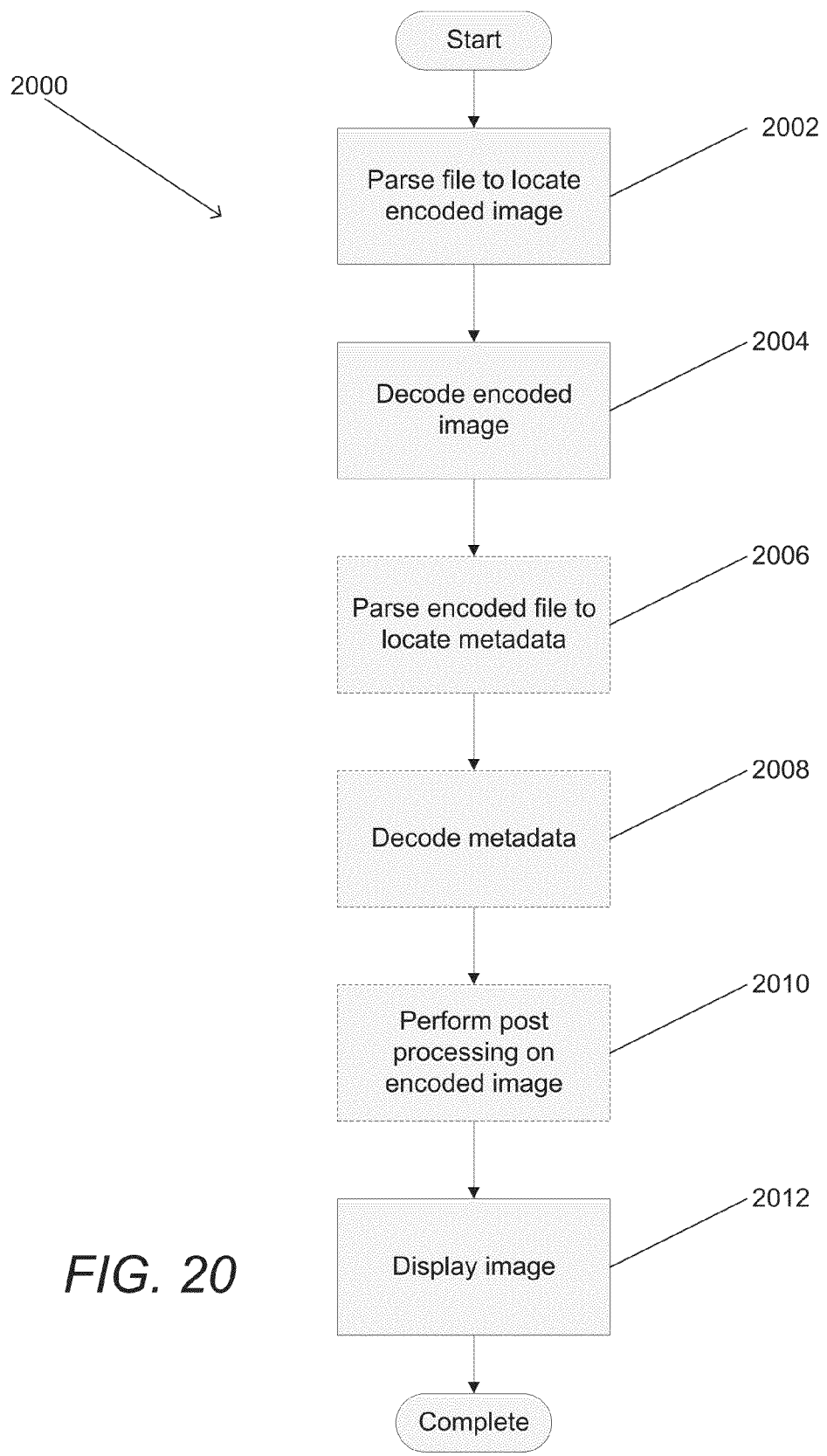
FIG. 20 is a flow chart illustrating a process for rendering an image using a light field image file in accordance with an embodiment of the invention.

As noted above, rendering a light field image file can be as simple as decoding an encoded image contained within the light field image file or can involve more complex post processing of the encoded image using metadata derived from the same light field image data used to synthesize the encoded image. A process for rendering a light field image in accordance with an embodiment of the invention is illustrated in FIG. 20. The process 2000 includes parsing (2002) the light field image file to locate the encoded image contained within the image file. The encoded image file is decoded (2004). As noted above, the image can be encoded using a standards based encoder and so the decoding process can utilize a standards based codec within a rendering device, or the image can be encoded using a proprietary encoding and a proprietary decoder is provided on the rendering device to decode the image. When the process for rendering the image simply involves rendering the image, the decoded image can be displayed. When the process for rendering the image includes post processing, the image file is parsed (2006) to locate metadata within the file that can be utilized to perform the post processing. The metadata is decoded (2008). The metadata can often take the form of maps that can be encoded using standards based image encoders and a standards based decoder present on the rendering device can be utilized to decode the metadata. In other embodiments, a proprietary decoding process is utilized to decode the metadata. The metadata can then be used to perform (2010) the post processing of the encoded image and the image can be displayed (2012). The display of the image can be local. Alternatively the image can be streamed to a remote device or encoded as an image and provided to a remote device for display.

Although specific processes for rendering an image from a light field image file are discussed with reference to FIG. 20, any of a variety of processes appropriate to the requirements of a specific application can be utilized to render an image for display using a light field image file in accordance with an embodiment of the invention. As noted above, any of a variety of standards based encoders and decoders can be utilized in the encoding and decoding of light field image files in accordance with embodiments of the invention. Processes for rendering images using light field image files that conform to the JFIF standard and include an image and/or metadata encoded in accordance with the JPEG standard are discussed further below.

Rendering Images Using JFIF Light Field Image Files

The ability to leverage deployed JPEG decoders can greatly simplify the process of rendering light field images. When a light field image file conforms to the JFIF standard and the image and/or metadata encoded within the light field image file is encoded in accordance with the JPEG standard, a rendering application can leverage an existing implementation of a JPEG decoder to render an image using the light field image file. Similar efficiencies can be obtained where the light field image file includes an image and/or metadata encoded in accordance with another popular standard for image encoding.

Figure 21:
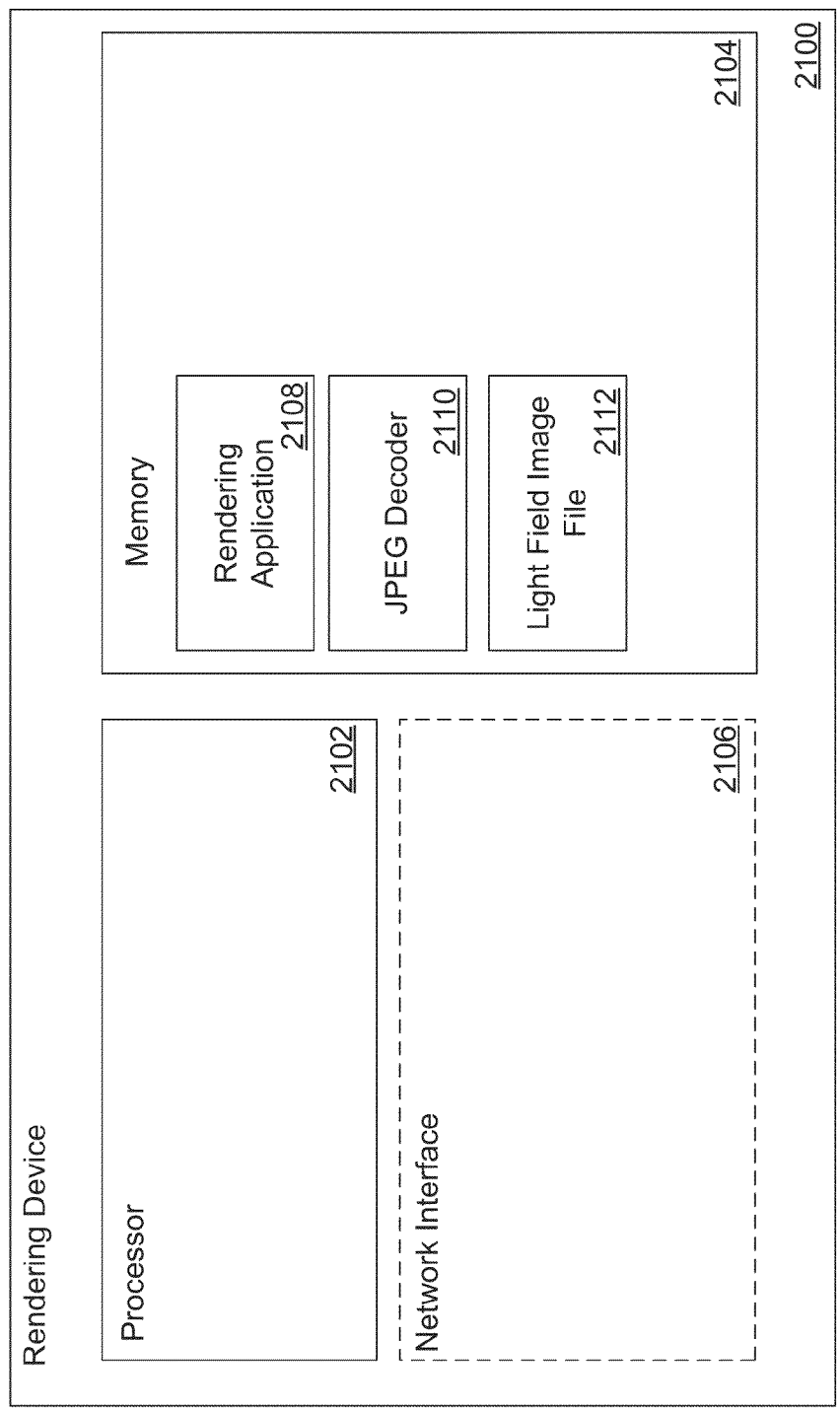
FIG. 21 conceptually illustrates a rendering device configured by a rendering application to render an image using a light field image file containing an image and/or a map encoded in accordance with the JPEG standard.

A rendering device configured by a rendering application to render an image using a light field image file in accordance with an embodiment of the invention is illustrated in FIG. 21. The rendering device 2100 includes a processor 2102, memory 2104, and an optional network interface 2106 that can be utilized to receive light field image files. In the illustrated embodiment, the memory 2104 of the rendering device 2100 includes a rendering application 2108, a JPEG decoder application 2110, and a light field image file 2112 that contains at least one image and/or metadata encoded in accordance with the JPEG standard. The rendering application 2108 configures the processor to parse the light field image file to locate an encoded image and to decode the encoded image using the JPEG decoder application 2110. Similarly, the rendering application can configure the processor to parse the light field image file to locate metadata and to decode encoded maps contained within the metadata using the JPEG decoder.

Although specific rendering devices including JPEG decoders are discussed above with reference to FIG. 21, any of a variety of rendering devices incorporating standards based decoders can be utilized to render images from appropriately encoded light field image files in accordance with embodiments of the invention. Processes for decoding light field image files that confirm with the JFIF standard and that contain at least one image and/or metadata encoded in accordance with the JPEG standard in accordance with embodiments of the invention are discussed further below.

Processes for Rendering Images from JFIF Light Field Image Files

Processes for rending images using light field image files that conform to the JFIF standard can utilize markers within the light field image file to identify encoded images and metadata. Headers within the metadata provide information concerning the metadata present in the file and can provide offset information or pointers to the location of additional metadata and/or markers within the file to assist with parsing the file. Once appropriate information is located a standard JPEG decoder implementation can be utilized to decode encoded images and/or maps within the file.

Figure 22:
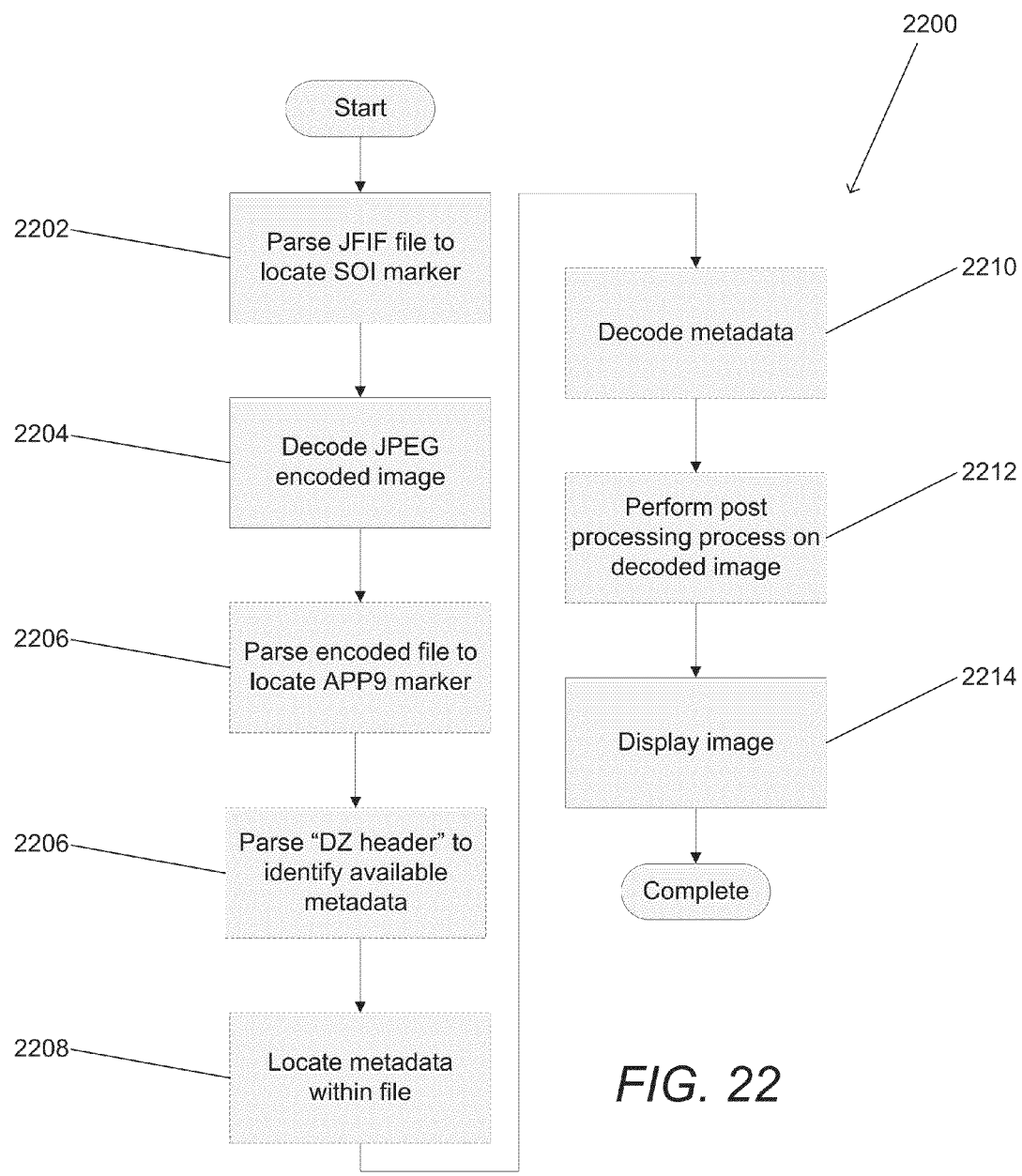
FIG. 22 is a flow chart illustrating a process for rendering an image using a light field image file that conforms to the JFIF standard and includes an image encoded in accordance with the JPEG standard and metadata describing the encoded image.

A process for displaying an image rendered using a light field image file that conforms to the JFIF standard using a JPEG decoder in accordance with an embodiment of the invention is illustrated in FIG. 22. The process 2200 involves parsing (2202) the light field image file to locate a Start of Image (SOI) Marker. The SOI marker is used to locate an image file encoded in accordance with the JPEG format. The encoded image can be decoded (2204) using a JPEG decoder. When no post processing of the decoded image is desired, the image can simply be displayed. Where post processing of the image is desired (e.g. to change the view point of the image and/or the focal plane of the image), the process parses (2206) the light field image file to locate an appropriate Application marker. In the illustrated embodiment, an APP9 marker indicates the presence of metadata within the light field image file. The specific metadata within the file can be determined by parsing (2206) a header within the APP9 Application marker segment that describes the metadata within the file. In the illustrated embodiment, the header is the "DZ Header" within the APP9 Application marker segment. The information within the metadata header can be utilized to locate (2208) specific metadata utilized in a post processing process within the light field image file. In instances where the metadata is encoded, the metadata can be decoded. In many embodiments, metadata describing an encoded image within a light field image file is in the form of a map that provides information concerning specific pixels within an encoded image contained within the light field image file and JPEG encoding is used to compress the map. Accordingly, a JPEG decoder can be utilized to decode the map. The decoded metadata can be utilized to perform (2212) a post processes the decoded image. The image can then be displayed (2214). In many embodiments, the image is displayed on a local display. In a number of embodiments, the image is streamed to a remote display or encoded as an image and forwarded to a remote device for display.

Although specific processes for displaying images rendered using light field image files are discussed above with respect to FIG. 22, any of a variety of processes for parsing a light field image file and decoding images and/or metadata encoded in accordance with the JPEG standard using a JPEG decoder can be utilized in accordance with embodiments of the invention. Much of the discussion above references the use of metadata derived from light field image data and contained within a light field image file to perform post processing processes on an encoded image synthesized from the light field image data. Post processing of images synthesized from light field image data using metadata obtained using the light field image data in accordance with embodiments of the invention are discussed further below.

Post Processing of Images Using Metadata Derived from Light Field Image Data

Images can be synthesized from light field image data in a variety of ways. Metadata included in light field image files in accordance with embodiments of the invention can enable images to be rendered from a single image synthesized from the light field image data without the need to perform super resolution processing. Advantages of rendering images in this way can include that the process of obtaining the final image is less processor intensive and less data is used to obtain the final image. However, the light field image data provides rich information concerning a captured scene from multiple viewpoints. In many embodiments, a depth map and occluded pixels from the light field image data (i.e. pixels that are not visible from the reference viewpoint of the synthesized image) can be included in a light field image file to provide some of the additional information typically contained within light field image data. The depth map can be utilized to modify the focal plane when rendering an image and/or to apply depth dependent effects to the rendered image. The depth map and the occluded pixels can be utilized to synthesize images from different viewpoints. In several embodiments, additional maps are provided (such as, but not limited to, confidence maps, edge maps, and missing pixel maps) that can be utilized when rendering alternative viewpoints to improve the resulting rendered image. The ability to render images from different viewpoints can be utilized to simply render an image from a different viewpoint. In many embodiments, the ability to render images from different viewpoints can be utilized to generate a stereo pair for 3D viewing. In several embodiments, processes similar to those described in U.S. Provisional Patent Application Ser. No. 61/707,691, entitled "Synthesizing Images From Light Fields Utilizing Virtual Viewpoints" to Jain (the disclosure of which is incorporated herein by reference in its entirety) can be utilized to modify the viewpoint based upon motion of a rendering device to create a motion parallax effect. Processes for rendering images using depth based effects and for rendering images using different viewpoints are discussed further below.

Rendering Images Using Depth Based Effects

Figure 23:
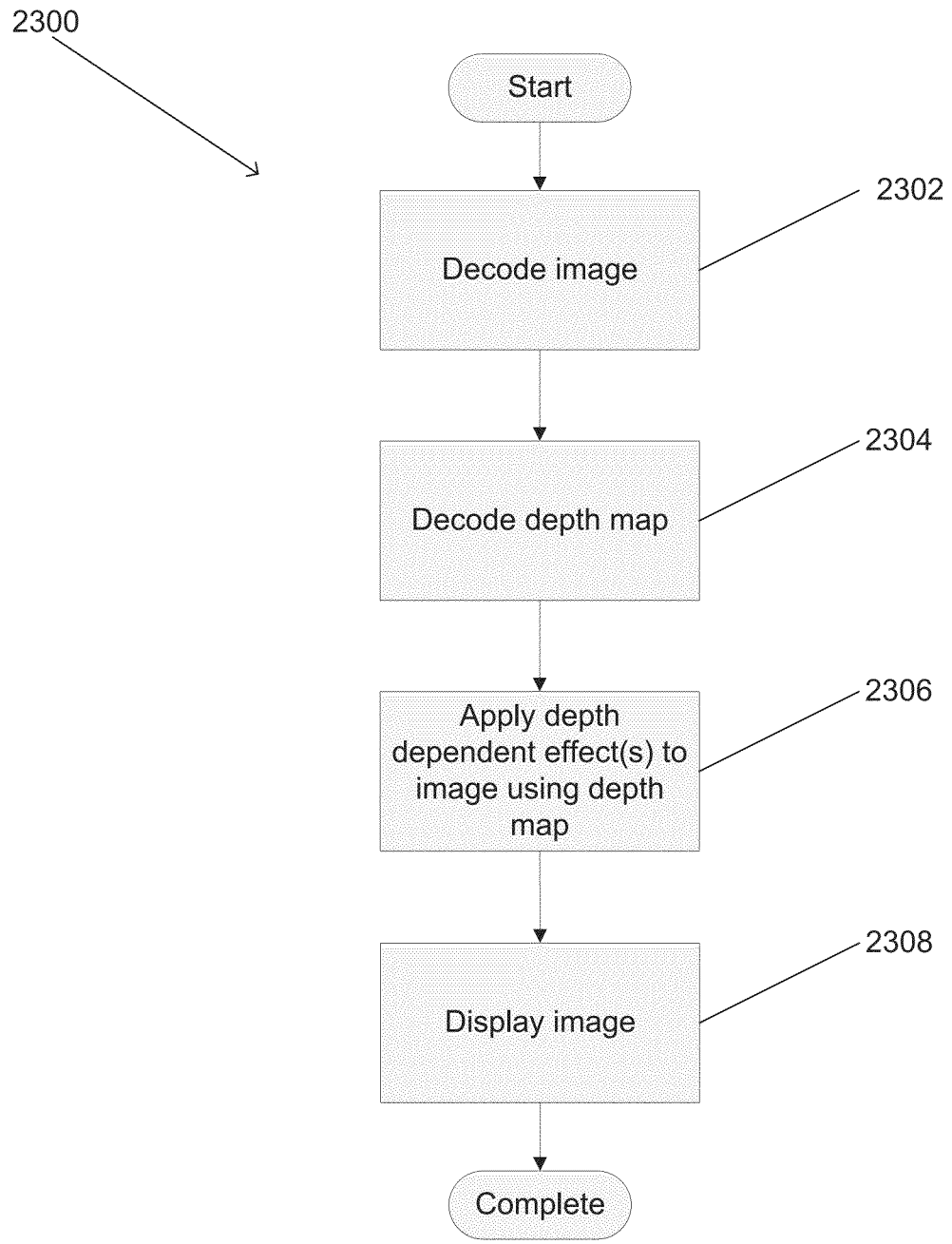
FIG. 23 is a flow chart illustrating a process applying depth dependent effects to an encoded image contained within the light field image file based upon a depth map contained within the light field image file in accordance with an embodiment of the invention.

A variety of depth based effects can be applied to an image synthesized from light field image data in accordance with embodiments of the invention including (but not limited to) applying dynamic refocusing of an image, locally varying the depth of field within an image, selecting multiple in focus areas at different depths, and/or applying one or more depth related blur model. A process for applying depth based effects to an image synthesized from light field image data and contained within a light field image file that includes a depth map in accordance with an embodiment of the invention is illustrated in FIG. 23. The process 2300 includes decoding (2302) an image synthesized from light field image data contained within a light field image file. In addition, a depth map derived from the light field image data that describes the synthesized image is also decoded (2304) from metadata contained within the light field image file. One or more depth dependent effects can then be applied (2406) to the pixels of the decoded image based upon the depths of the pixels indicated by the depth map. In a number of embodiments, the depth dependent effects are automatically determined by modifying the focal plane, and/or F number (which provides different depths of fields and degree of blur in out-of-focus regions). The image can then be displayed (2308). In many embodiments, the image is displayed on a local display. In a number of embodiments, the image is streamed to a remote display or encoded as an image and forwarded to a remote device for display.

Although specific processes for applying depth dependent effects to an image synthesized from light field image data using a depth map obtained using the light field image data are discussed above with respect to FIG. 23, any of a variety of processes can be utilized for extracting an image and a depth map from a light field image file and for using the depth map to apply one or more depth dependent effects in accordance with embodiments of the invention. Processes for rendering images from different viewpoints to the reference viewpoint of an image contained within a light field image file based upon a depth map and information concerning occluded pixels contained within the light field image file in accordance with embodiments of the invention are discussed further below.

Rendering Images Using Different Viewpoints

One of the compelling aspects of computational imaging is the ability to use light field image data to synthesize images from different viewpoints. The ability to synthesize images from different viewpoints creates interesting possibilities including the creation of stereo pairs for 3D applications and the simulation of motion parallax as a user interacts with an image. Light field image files in accordance with many embodiments of the invention can include an image synthesized from light field image data from a reference viewpoint, a depth map for the synthesized image and information concerning pixels from the light field image data that are occluded in the reference viewpoint. A rendering device can use the information concerning the depths of the pixels in the synthesized image and the depths of the occluded images to determine the appropriate shifts to apply to the pixels to shift them to the locations in which they would appear from a different viewpoint. Occluded pixels from the different viewpoint can be identified and locations on the grid of the different viewpoint that are missing pixels can be identified and hole filling can be performed using interpolation of adjacent non-occluded pixels. In many embodiments, the quality of an image rendered from a different viewpoint can be increased by providing additional information in the form of auxiliary maps that can be used to refine the rendering process. In a number of embodiments, auxiliary maps can include confidence maps, edge maps, and missing pixel maps. Each of these maps can provide a rendering process with information concerning how to render an image based on customized preferences provided by a user. In other embodiments, any of a variety of auxiliary information including additional auxiliary maps can be provided as appropriate to the requirements of a specific rendering process.

Figure 24:
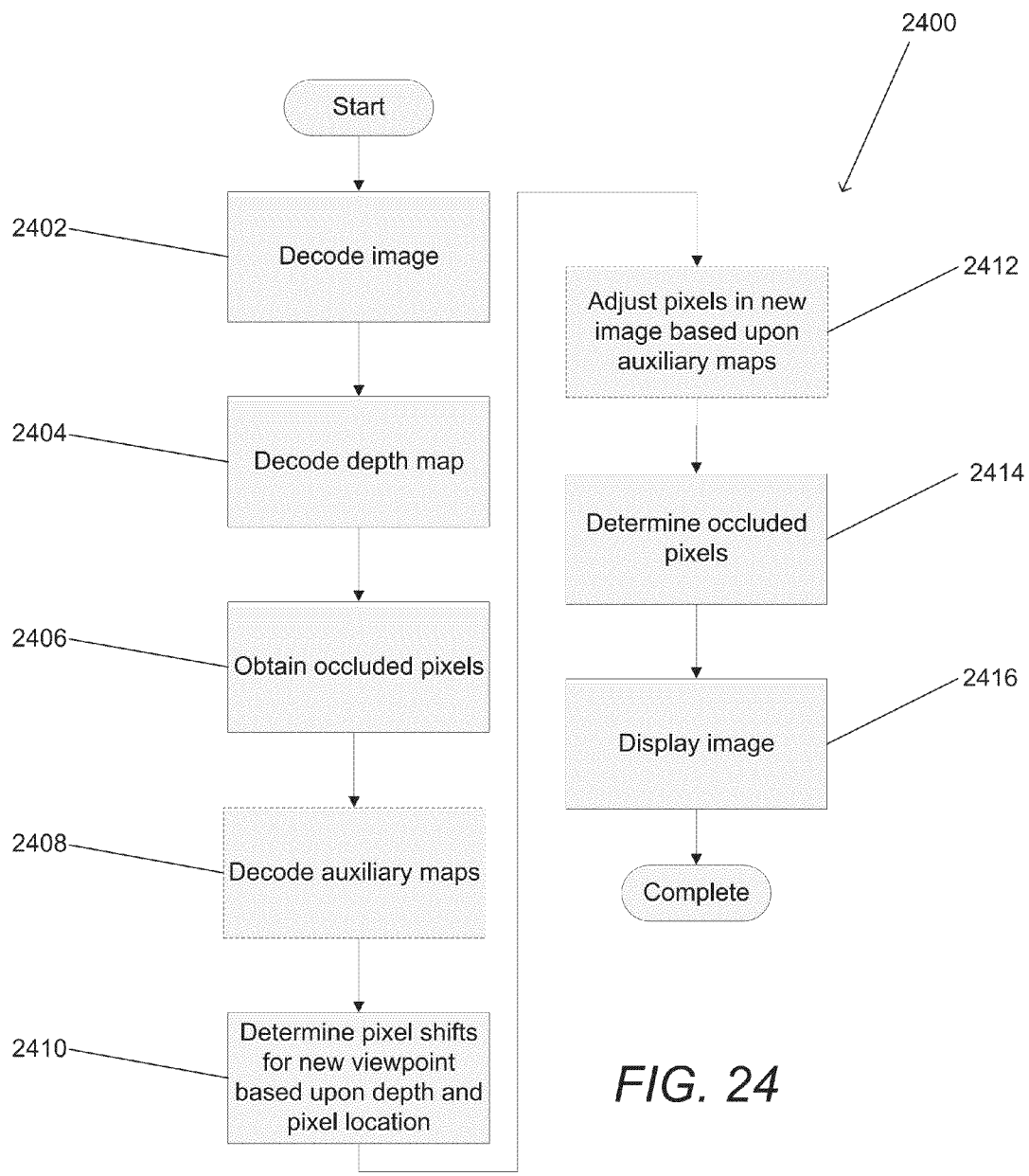
FIG. 24 is a flow chart illustrating a process for rendering an image from a different viewpoint to a reference viewpoint of an image contained within a light field image file in accordance with an embodiment of the invention.

A process for rendering an image from a different viewpoint using a light field image file containing an image synthesized using light field image data from a reference viewpoint, a depth map describing the depth of the pixels of the synthesized image, and information concerning occluded pixels in accordance with an embodiment of the invention is illustrated in FIG. 24. The process 2400 includes decoding (2402) an image contained within a light field image file, where the image is an image synthesized from light field image data. The process also includes decoding (2404) a depth map from the light field image file, where the depth map was also obtained from the light field image data used to synthesize the encoded image. Information concerning pixels from the light field image data that are occluded in the reference viewpoint is also obtained (2405) from the light field image file, where the information includes the location and depth of the occluded pixels from the reference viewpoint. In many embodiments, auxiliary information, including auxiliary maps that specify additional information concerning the pixels in the encoded image, is also contained within the light field image file and auxiliary information useful in the rendering of an image from a different viewpoint to the reference viewpoint can be extracted and decoded (2408) from the light field image file. Using the depth map and the depths of the occluded pixels, shifts in the location and depths of pixels in the different viewpoint can be determined (2410). Based upon the shifts, occluded pixels can be determined (2414) and the image displayed. Where auxiliary information is available, the auxiliary information can be utilized to adjust (2412) the pixels in the image prior to rendering. In many embodiments, the adjustments are performed prior to identifying occluded pixels and displaying the final image. In a number of embodiments, the adjustments are performed after occluded pixels are identifies.

Although specific processes for rendering an image from a different viewpoint using an image synthesized from a reference view point using light field image data, a depth map obtained using the light field image data, and information concerning pixels in the light field image data that are occluded in the reference viewpoint are discussed above with respect to FIG. 24, any of a variety of processes can be utilized for rendering images from different viewpoints using a light field image file as appropriate to the requirements of specific applications in accordance with embodiments of the invention. Processes for rendering images simulating different lens characteristics from in accordance with embodiments of the invention are discussed further below.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed:

1. A system for encoding light field image data as a light field image file, comprising:
   a processor; and
   memory containing an encoding application and light field image data, where the light field image data comprises a plurality of images of a scene captured from different viewpoints;
   wherein the plurality of images of a scene is captured using a camera array comprising a collection of imagers designed to function as a unitary component, where the collection of imagers comprises at least two heterogeneous images; and
   wherein the encoding application directs the processor to:
      create a depth map that specifies depths for pixels in a reference image in the plurality of images;
      encode the reference image; and
      create a light field image file including the encoded image and metadata describing the encoded image, wherein:
         the light field image file is structured using the Exchangable image file (Exif) format; and
         the metadata includes the depth map.

2. The system of claim 1, wherein the light field image file conforms to the JFIF standard.

3. The system of claim 1, wherein the encoded image is encoded in accordance with the JPEG standard.

4. The system of claim 1, wherein the metadata is located within an application marker segment within the light field image file.

5. The system of claim 4, wherein the application marker segment is identified using the APP9 marker.

6. The system of claim 4, wherein the application marker segment is identified using an APP1 marker that is used to identify the Exif data.

7. The system of claim 1, wherein the encoding application directs the processor to encode the depth map and the depth map included in the metadata describing the encoded image is the encoded depth map.

8. The system of claim 7, wherein the depth map is losslessly encoded.

9. The system of claim 8, wherein the encoding application directs the processor to decode the depth map using a JPEG decoder.

10. The system of claim 7, wherein the depth map is encoded using lossy compression.

11. The system of claim 1, wherein:
   encoding the reference image includes creating a confidence map for the depth map, where the confidence map indicates the reliability of the depth value for a pixel in the depth map; and
   the metadata describing the encoded image in the light field image file includes the confidence map.

12. The system of claim 1, wherein:
   encoding the reference image involves identifying pixels in the plurality images of the scene that are occluded in a reference viewpoint; and
   the metadata describing the encoded image in the light field image file includes descriptions of the occluded pixels.

13. The system of claim 12, wherein the descriptions of the occluded pixels includes data selected from the group consisting of colors, locations, and depths of the occluded pixels.

14. The system of claim 12, wherein:
   the encoding application directs the processor to generate an edge map that indicates pixels in the reference image that lie on a discontinuity; and
   the metadata describing the encoded image in the light field image file includes the edge map.

15. The system of claim 14, wherein the edge map identifies whether a pixel lies on a discontinuity selected from the group consisting of an intensity and depth discontinuity.

16. The system of claim 12, wherein:
   the encoding application directs the processor to generate a missing pixel map that indicates pixels in the reference image that do not correspond to a pixel from the plurality images of the scene and that are generated by interpolating pixel values from adjacent pixels in the reference image; and
   the metadata describing the encoded image in the light field image file includes the missing pixels map.

17. The system of claim 1, wherein the metadata also includes a focal plane.

18. The system of claim 1, wherein the encoding application directs the processor to:
   select a second reference image from the plurality of images, where the second reference image is distinct from the reference image and the reference image and the second reference image comprise a stereo pair of images;
   encode the second reference image; and
   include the second reference image in the encoded light field image file.

19. The system of claim 1, wherein each imager in the at least two heterogeneous imagers comprises at least two sensor elements and has different imaging characteristics.

20. The system of claim 1, wherein the collection of imagers is fabricated on a single chip.

21. The system of claim 1, wherein the collection of imagers comprises a one dimensional array of imagers.

22. A method for encoding light field image data as a light field image file, comprising:
- obtaining a set of light field image data comprising a plurality of images of a scene captured from different viewpoints using an encoding system, where the plurality of images of a scene is captured using a camera array comprising a collection of imagers designed to function as a unitary component, where the collection of imagers comprises at least two heterogeneous images;
- creating a depth map that specifies depths for pixels in a reference image in the plurality of images using the encoding device;
- encoding the reference image using the encoding device; and
- creating a light field image file including the encoded image and metadata describing the encoded image using the encoding device, wherein:
  - the light field image file is structured using the Exchangeable image file (Exif) format; and
  - the metadata includes the depth map.

23. A non-transitory machine readable medium containing processor instructions, where execution of the instructions by a processor causes the processor to perform a process comprising:
- obtaining a set of light field image data comprising a plurality of images of a scene captured from different viewpoints, where the plurality of images of a scene is captured using a camera array comprising a collection of imagers designed to function as a unitary component, where the collection of imagers comprises at least two heterogeneous images;
- creating a depth map that specifies depths for pixels in a reference image in the plurality of images;
- encoding the reference image; and
- creating a light field image file including the encoded image and metadata describing the encoded image, wherein:
  - the light field image file is structured using the Exchangable image file (Exif) format; and
  - the metadata includes the depth map.

* * * * *